US012440465B2

(12) United States Patent
Mastaloudis et al.

(10) Patent No.: US 12,440,465 B2
(45) Date of Patent: Oct. 14, 2025

(54) NUTRITIONAL COMPOSITIONS AND ASSOCIATED METHODS

(71) Applicant: NSE Products, Inc., Provo, UT (US)

(72) Inventors: Angela Mastaloudis, Holladay, UT (US); Steven M. Wood, Santaquin, UT (US); Mark Bartlett, Orem, UT (US); Shelly Hester, Provo, UT (US)

(73) Assignee: NSE Products, Inc., Provo, UT (US)

( * ) Notice: Subject to any disclaimer, the term of this patent is extended or adjusted under 35 U.S.C. 154(b) by 0 days.

(21) Appl. No.: 15/253,710

(22) Filed: Aug. 31, 2016

(65) Prior Publication Data

US 2018/0055802 A1   Mar. 1, 2018

(51) Int. Cl.
| | | |
|---|---|---|
| *A61K 31/202* | (2006.01) | |
| *A61K 31/015* | (2006.01) | |
| *A61K 31/05* | (2006.01) | |
| *A61K 31/122* | (2006.01) | |
| *A61K 31/352* | (2006.01) | |
| *A61K 31/353* | (2006.01) | |
| *A61K 31/385* | (2006.01) | |
| *A61K 31/593* | (2006.01) | |
| *A61K 31/7048* | (2006.01) | |
| *A61K 36/53* | (2006.01) | |
| *A61K 45/06* | (2006.01) | |

(52) U.S. Cl.
CPC .......... *A61K 31/202* (2013.01); *A61K 31/015* (2013.01); *A61K 31/05* (2013.01); *A61K 31/122* (2013.01); *A61K 31/352* (2013.01); *A61K 31/353* (2013.01); *A61K 31/385* (2013.01); *A61K 31/593* (2013.01); *A61K 31/7048* (2013.01); *A61K 36/53* (2013.01); *A61K 45/06* (2013.01)

(58) Field of Classification Search
CPC ...... A61K 31/202; A61K 31/05; A61K 45/06; A61K 31/7048; A61K 31/593; A61K 31/353
See application file for complete search history.

(56) References Cited

U.S. PATENT DOCUMENTS

| | | |
|---|---|---|
| 9,072,780 B2 | 7/2015 | Mastaloudis et al. |
| 2004/0001817 A1 | 1/2004 | Giampapa |
| 2006/0134294 A1 | 6/2006 | McKee et al. |
| 2007/0190209 A1 | 8/2007 | Sinnott |
| 2007/0248705 A1 | 10/2007 | Shimura et al. |
| 2008/0305096 A1 | 12/2008 | Verdegem et al. |
| 2009/0269322 A1 | 10/2009 | Yu et al. |
| 2010/0004344 A1 | 1/2010 | Dallas |
| 2010/0021533 A1 | 1/2010 | Mazed et al. |
| 2011/0038967 A1 | 2/2011 | Rabovsky et al. |

FOREIGN PATENT DOCUMENTS

| | | | |
|---|---|---|---|
| CN | 101361896 A | 2/2009 | |
| JP | 2003292429 A | 10/2003 | |
| JP | 2008509213 A | 3/2008 | |
| JP | 2009263333 A | 11/2009 | |
| KR | 10-2003-0055950 | 7/2003 | |
| WO | WO 2006016357 A1 | 2/2006 | |
| WO | WO 2008/147111 A2 | 12/2008 | |
| WO | WO 2009/036204 A2 | 3/2009 | |
| WO | WO-2010009478 A2 * | 1/2010 | ........... A23K 20/147 |

OTHER PUBLICATIONS

Verschuren et al. A Dietary Mixture Containing Fish Oil, Resveratrol, Lycopene, Catechins, and Vitamins E and C Reduces Atherosclerosis in Transgenic Mice. The Journal of Nutrition (2011), v141, p. 863-869. (Year: 2011).*
Agarwal et al. Resveratrol for primary prevention of atherosclerosis: Clinical trial evidence for improved gene expression in vascular endothelium. International Journal of Cardiology (2013), v1, p. 246-248. (Year: 2013).*
Ford et al. Cardiovascular disease and vitamin D supplementation: trial analysis, systematic review, and meta-analysis. American Journal of Clinical Nutrition (2014), v100, p. 746-755. (Year: 2014).*
Cialdella-Kam et al. A Mixed Flavonoid-Fish Oil Supplement Induces Immune-Enhancing and Anti-Inflammatory Transcriptomic Changes in Adult Obese and OverweightWomen—A Randomized Controlled Trial. Nutrients (May 2016), 8(277), 15 pages. (Year: 2016).*
Bakker et al. An antiinflammatory dietary mix modulates inflammation and oxidative and metabolic stress in overweight men: a nutrigenomics approach. Am J Clin Nutr (2010), 91, 1044-1059. (Year: 2010).*
Ying et al. Lipoic acid effects on established atherosclerosis. Life Sci (2010), 86, 95-102. (Year: 2010).*
Lee et al. The Impact of a-Lipoic Acid, Coenzyme Q10, and Caloric Restriction on Life Span and Gene Expression Patterns in Mice. Free Radical Biology & Medicine (2004), 36(8), 1043-1057. (Year: 2004).*
McWalter et al., "Transcription Factor Nrf2 Is Essential for Induction of NAD(P)H:Quinone Oxidoreductase 1, Glutathione S-Transferases, and Glutamate Cysteine Ligase by Broccoli Seeds and Isothiocyanates", The Journal of Nutrition, 2004, pp. 3499S-3506S, vol. 134, Suppl. 12. (retrieved from jn.nutrition.org Mar. 31, 2013).
Suh et al., "Decline in transcriptional activity of Nrf2 causes age-related loss of glutathione synthesis, which is reversible with lipoic acid", Proceedings of the National Academy of Sciences of the United States of America, Mar. 9, 2004, pp. 3381-3386, vol. 101(10).

(Continued)

*Primary Examiner* — Sean C. Barron
(74) *Attorney, Agent, or Firm* — Thorpe North & Western, LLP; David W. Osborne

(57) ABSTRACT

An oral formulation can include an omega-3 fatty acid, a stilbenoid, a flavonoid, and vitamin D, each present in an amount and weight ratio that causes the formulation to mimic a gene expression profile of caloric restriction in a tissue of a subject, when administered to the subject in a therapeutically effective amount. The oral formulation can also be used in a method of mimicking a caloric restriction gene expression profile in a tissue of a subject.

20 Claims, 36 Drawing Sheets
(36 of 36 Drawing Sheet(s) Filed in Color)

(56) References Cited

OTHER PUBLICATIONS

Bonina et al., "Protective effects of a standardized red orange extract on air pollution-induced oxidative damage in traffic police officers", Natural Product Research, Nov. 20, 2008, pp. 1544-1551, vol. 22(17).

Martin et al., "Hydroxytyrosol induces antioxidant/detoxificant enzymes and Nrf2 translocation via extracellular regulated kinases and phosphatidylinositol-3-kinases/protein kinase B pathways in HepG2 cells", Molecular Nutrition & Food Research, 2010, pp. 956-966, vol. 54(7).

Choi et al., "Inhibition of liver fibrosis by solubilized coenzyme Q10: Role of Nrf2 activation in inhibiting transforming growth factor-betal expression", Toxicology and Applied Pharmacology, 2009, pp. 377-384, vol. 240(3).

Bishayee et al., "Pomegranate-mediated chemoprevention of experimental hepatocarcinogenesis involves Nrf2-regulated antioxidant mechanisms", Carcinogenesis, doi:10.1093/carcin/bgr045, Mar. 9, 2011, pp. 888-896, vol. 32(6), Advance Access Publication, (retrieved from http://carcin.oxfordjournals.org Feb. 3, 2016).

Hwang et al., "Ginsenoside Rb1 protects against 6-hydroxydopamine-induced oxidative stress by increasing heme oxygenase-1 expression through an estrogen receptor-related P13K/Akt/Nrf2-dependent pathway in human dopaminergic cells", Toxicology and applied Pharmacology, 2010, pp. 18-28, vol. 242(1).

Kanazawa, "Functional Non-nutrient Polyphenols in Plant Foods", Oleoscience, 2007, pp. 317-325, vol. 7(8), (No English counterpart could be located).

Naturalways, "Orac+ Anti-aging", http://www.naturalways.com/orac.html, Apr. 19, 2001, 4 pages, (retrieved from internet Feb. 12, 2017).

Get Healthy Again, "My Top Choices In Nutritional Supplements", http://www.gethealthyagain.com/supplementreport.html , Nov. 8, 2002, 36 pages, (retrieved from internet Feb. 12, 2017).

Farnham et al., "Glucoraphanin Level in Broccoli Seed is Largely Determined by Genotype", HortScience, Feb. 2005, pp. 50-53, vol. 40(1).

Tabino, "Vital Immunity", https://www.mynutrionalsolutions.com/product/vital-immunity~ns-311-159, 1992, 3 pages, (retrieved from internet Feb. 12, 2017).

Rao et al., "The Antioxidant Transcription Factor Nrf2 Negatively Regulates Autophagy and Growth Arrest Induced by the Anticancer Redox Agent Mitoquinone", Journal of Biological Chemistry, Nov. 5, 2010, pp. 34447-34459, vol. 285(45), (retrieved from www.jbc.org Oct. 25, 2012).

Balu et al. "Rejuvenation of antioxidant system in central nervous system of aged rats by grape seed extract", Science Direct, Apr. 13, 2005, pp. 295-300, Neuroscience Letters 383, Elsevier Ireland.

Saw et al., "Anti-cancer and potention chemopreventive actions of ginseng by activating Nrf2 (NFE2L2) anti-oxidative stress/anti-inflammatory pathways", Chinese Medicine, 2010, 7 pages, vol. 5(37).

Bonina et al., "Oxidative stress in handball players: effect of supplementation with a red orange extract", Science Direct, Sep. 13, 2005, pp. 917-924, Nutrition Research 25, Elsevier.

Bruno, Building Immunity & Promoting Wellness with Botanicals & Antioxidants, Literature Education Series on Dietary Supplements, Hunting College of Health Sciences, 2004, 3 pages.

Damak et al., "Effect of the Maturation Process on the Phenolic Fractions, Fatty Acids, and Antioxidant Activity of the Chetoui Olive Fruit Cultivar", Journal of Agricultural and Food Chemistry, 2008, pp. 1560-1566, vol. 56(5), American Chemical Society.

Littarru et al., "Bioenergetic and Antioxidant Properties of Coenzyme Q10: Recent Developments", Mol Biotechnol, DOI 10.1007/s12033-007-0052-y, Aug. 1, 2007, p. 31-37, vol. 37, Humana Press Inc., Italy.

Good Cause Wellness, "Antioxidant Defense System® Red, 30 servings—Antioxidant Defense System Drink Mixes" http://www.goodcausewellness.com/http-www-goodcausewellness-com-servlet-the-10-antioxidant-defense-system-red-detail, 4 pages, (retrieved from internet Feb. 12, 2017).

Adams, "Breakthrough wellness supplements, part one: Good Cause Wellness", NaturalNews.com, http://www.naturalnews.com/020442.html, Sep. 17, 2006, 8 pages, (retrieved from internet Feb. 12, 2017).

Strand, "Description of Nutritional Supplements", Specialist in Nutritional Medicine, http://www.raystrand.com/showantioxidant.asp, 6 pages, (retrieved from internet Feb. 12, 2017).

Sixwise.com, "Six Disease-Fighting Super Antioxidants You are Likely Not Getting Enough of", http://www.sixwise.com/newsletters/05/03/15/six-disease-fighting-super-antioxidants-you-are-likely-not-getting-enough-of.btm, 3 pages, (retrieved from internet Feb. 12, 2017).

Zhang et al.; "Activation of the Nrf2/antioxidant response pathway increases IL-8 expression"; European Journal of Immunology; (Nov. 2005); pp. 3258-3267; vol. 35, Issue 11; <doi: 10.1002/eji.200526116 >.

Cheng et al.; "Anti-Amnestic and Anti-Aging Effects of Ginsenoside Rg1 and Rb1 and its Mechanism of Action;" Acta Pharmacologica Sinica; (Feb. 2005); pp. 143-149; vol. 26, No. 2; <doi: 1.111/j.1745-7254.2005.00034.x>.

Frasca et al.; "Involvement of Inducible Nitric Oxide Synthase and Cyclooxygenase-2 in the Anti-Inflammatory Effects of a Red Orange Extract in Human Chondrocytes;" Natural Product Research; (20 Sep. 2010); pp. 1469-1480; vol. 24, No. 15; <doi: 10.1080/14786410903169987 >.

Jemai et al.; "Antidiabetic and Antioxidant Effects of Hydroxytyrosol and Oleuropein from Olive Leaves in Alloxan-Diabetic Rats;" Journal of Agricultural and Food Chemistry; (2009); pp. 8798-8804; vol. 57, No. 19; <doi: 10.1021/jf901280r>.

Li et al.; " 石榴的生物活性成分及其吞可理作用研究遊展 ;" Modern Chinese Medicine; (Sep. 2009); pp. 7-10; vol. 11, Issue 9; <doi: 10.13313/j.issn.1673-4890.2009.09.003 >; non-official translation (Li et al.; "Advances in Studies on Bioactive Components and Pharmacological Effects of Pomegranate"); [no English counterpart could be located].

Liu;" 3种常见中草药的抗衰老作用研究 ;" Journal of Changchun University of Traditional Chinese Medicine; (Oct. 2009); p. 785, vol. 25, Issue 5; <doi: 10.13463/j.cnki.cczyy.2009.05.073 >; non-official translation (Liu; "Anti-Aging Effects of Three Common Chinese Herbal Medicines"); [No English counterpart could be located].

Zhang et al.; "Hydroxytyrosol Inhibits Pro-Inflammatory Cytokines, iNOS, and COX-2 Expression in Human Monocytic Cells;" Naunyn-Schmiedeberg's Archives of Pharmacology; (Jun. 2009); pp. 581-586; vol. 379, No. 6; <doi: 10.1007/s00210-009-0399-7>.

Zhu et al.; "Hydroxytyrosol Protects Against Oxidative Damage by Simultaneous Activation of Mitochondrial Biogenesis and Phase II Detoxifying Enzyme Systems in Retinal Pigment Epithelial Cells;" Journal of Nutritional Biochemistry; (2010); pp. 1089-1098; vol. 21, No. 11; < doi: 10.1016j.nutbio.2009.09.006 >.

Cruciferous Extracts™; "Broccoli;" www.procapslabs.com; (2009); 9 pages. [retrieved on Jun. 7, 2019]; Retrieved from <URL: https://www.procapslabs.com/Products/Details/268445995/Cruciferous-Extracts >.

Puetter, Rick & Rosalinda; "Vitamins, Supplements & Their Uses;" Personal Vitamin/Supplement Use and Practice; (Feb. 6, 2000); 12 pages.

Dallas, Constantin et al. "Lipolytic effect of a polyphenolic citrus dry extract of red orange, grapefruit, orange (Sinetrol) in human body fat adipocytes. Mechanism of action by inhibition of cAMP-phosphodiesterase (PDE)" Phytomedicine, vol. 15, Issue 10, 2008, pp. 783-792, ISSN 0944-7113, https://doi.org/10.1016/j.phymed.2008.05.006.

Yanaka, Akinori et al. "Dietary Sulforaphane-Rich Broccoli Sprouts Reduce Colonization and Attenuate Gastritis in Helicobacter pylori-Infected Mice and Humans" Cancer Prev Res (Phila) Apr. 1, 2009; 2 (4): 353-360. https://doi.org/10.1158/1940-6207.CAPR-08-0192.

Han, Xiuzhen et al.; "Dietary polyphenols and their biological significance," International journal of molecular sciences 8.9; (2007); pp. 950-988.

(56) References Cited

OTHER PUBLICATIONS

Fujishita, Kayoko et al.; "Grape seed extract acting on astrocytes reveals neuronal protection against oxidative stress via interleukin-6-mediated mechanisms," Cellular and molecular neurobiology, 29.8; (2009); pp. 1121-1129.

* cited by examiner

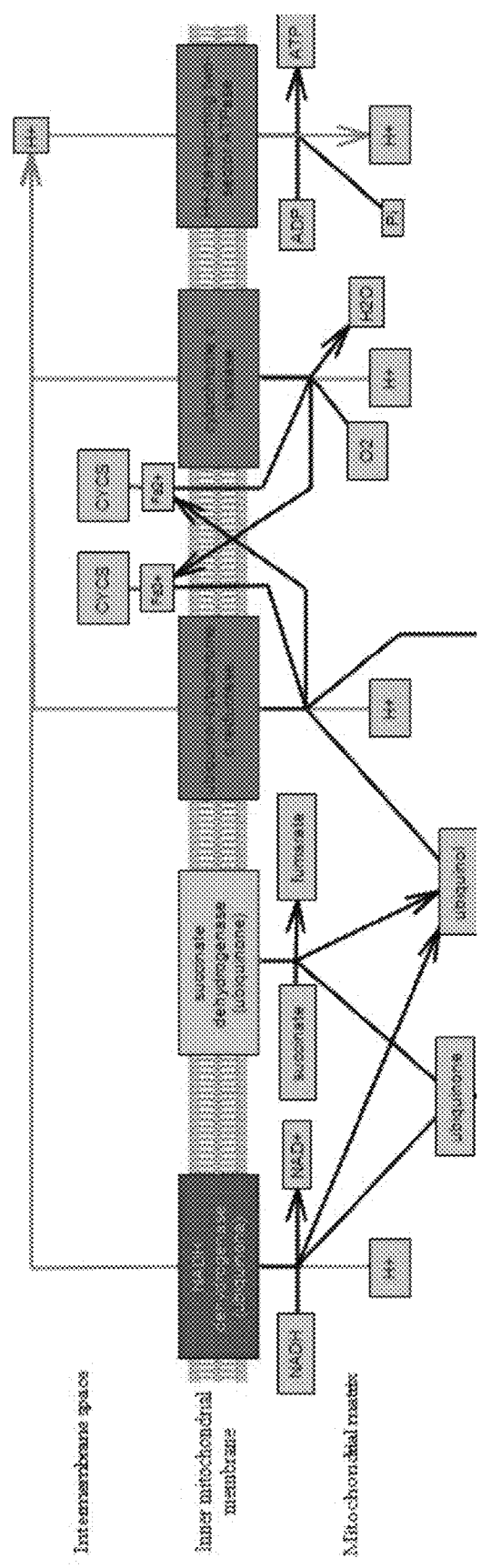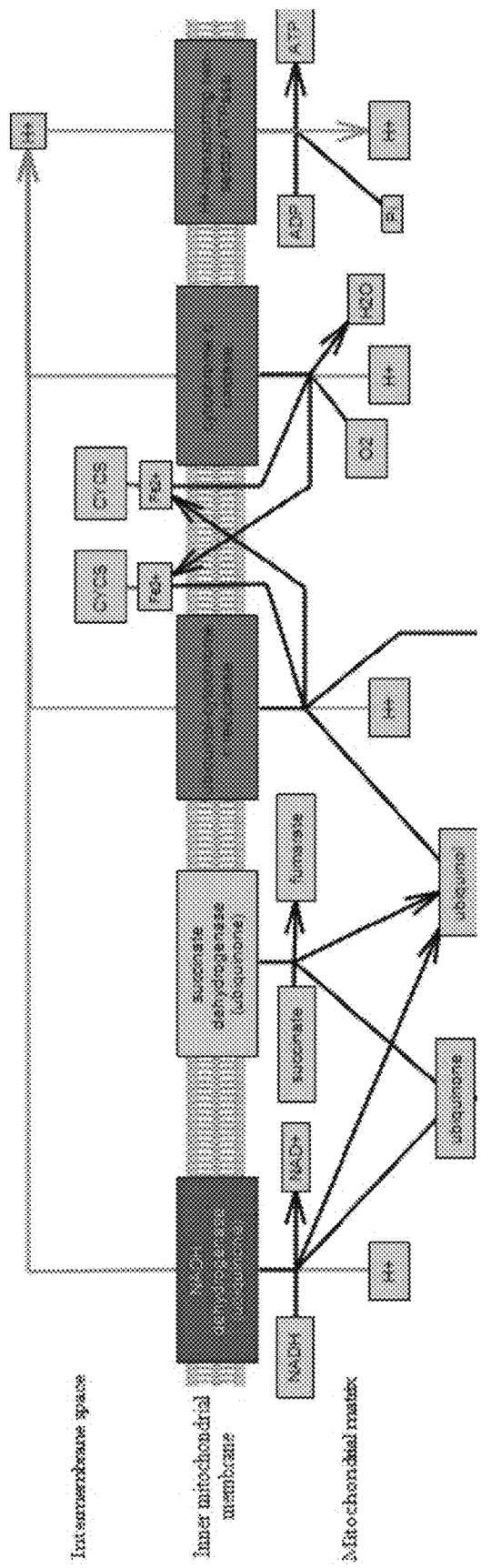
FIG. 12A
FIG. 12B

NUTRITIONAL COMPOSITIONS AND ASSOCIATED METHODS

BACKGROUND

To date, Caloric Restriction (CR), typically a 30-40% reduction in caloric intake compared to ad libitum fed controls, is the only intervention consistently demonstrated to increase both average and maximal lifespan across a broad range of species including yeast, rodents, dogs, and non-human primates. CR is characterized not only by increased longevity, but also retardation of the aging process or 'compression of morbidity,' including delaying disease onset, characteristics that are included in the definition of "youthspan."

Due to the lifespan extension and compression of morbidity properties of CR, it has been studied extensively as a model to better understand the mechanisms that contribute to healthy aging or the extension of youthspan. Some of the mechanisms underlying the functional health benefits elicited by CR involve metabolic reprogramming, characterized by factors such as enhanced insulin sensitivity and glucose regulation, optimal mitochondrial respiratory control, healthy lipid levels, and metabolic balance. While well-controlled CR studies in humans are limited, there is data to suggest that humans experience a similar compression of morbidity as non-human primates in response to CR. Similarly, CR has been demonstrated to reduce cardiovascular risk and improve glycemic control in studies involving non-obese humans. This and other evidence from CR studies in non-obese human subjects indicates that CR influences markers that would indicate youthfulness or a promotion of youthspan in humans. Further, the mechanisms underlying the functional health benefits elicited by CR include positive modulation of gene expression. Thus, CR leads to a modulation of gene expression in a direction (up or down) that is consistent with healthy functional or youthful outcomes.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Invention features and advantages will be apparent from the detailed description which follows, and are further enhanced in conjunction with the accompanying figures, which together illustrate, by way of example, various invention embodiments; and, wherein:

FIGS. 12A and 12B illustrate the Respiratory Chain and Oxidative Phosphorylation Gene Ontology Pathway in muscle tissue as regulated by both CR and AL groups, respectively, as compared to the C group.

FIG. 33A represents group averages for changes in connectivity between 6 weeks post treatment in the supplement group relative to subjects' baseline connectivity. FIG. 33B represents group averages for changes in connectivity at 6 weeks post treatment for the supplement group relative to the connectivity in the placebo treated group at 6 weeks.

FIG. 35A represents group averages for changes in connectivity between 6 weeks post treatment in the supplement group relative to subjects' baseline connectivity. FIG. 35B represents group averages for changes in connectivity at 6 weeks post treatment for the supplement group relative to the connectivity in the placebo treated group at 6 weeks.

Figure 1A:
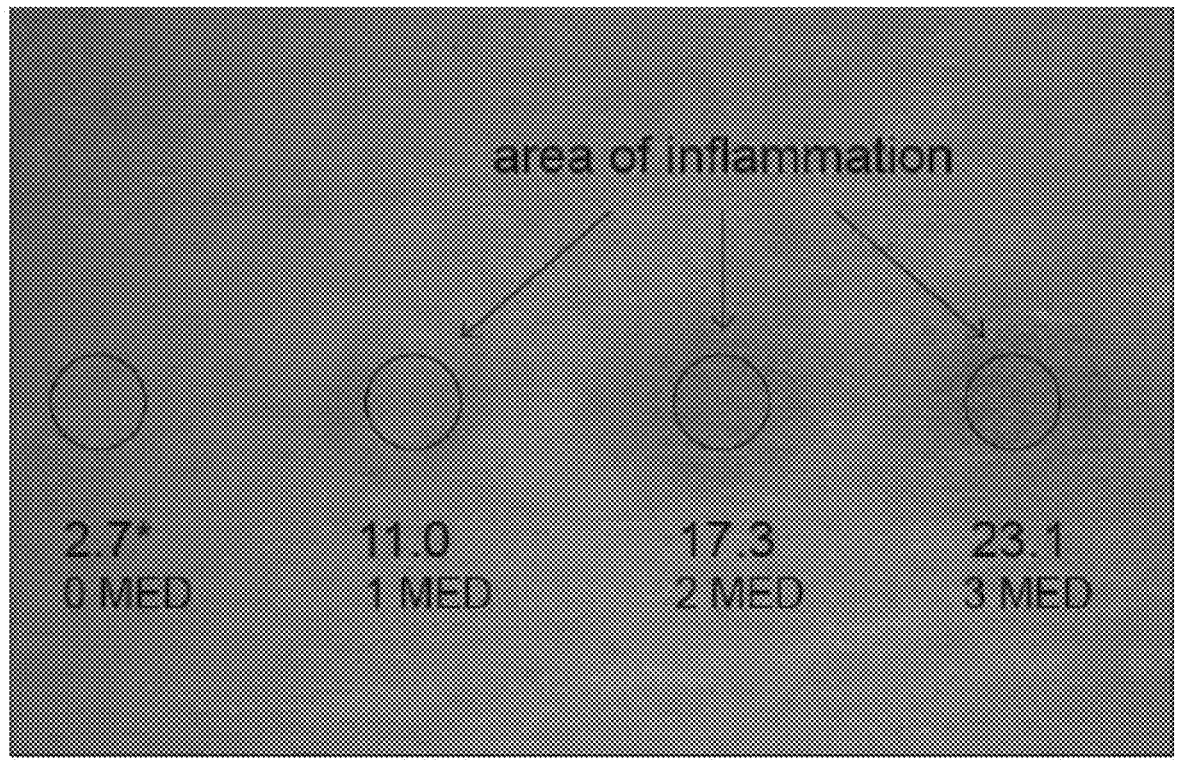
FIG. 1A illustrates a photograph of skin erythema from Ultraviolet Radiation (UVR) exposure in one representative study participant at baseline. The photograph illustrates erythema and inflammation at all UVR minimal erythema doses (MED). The Black circles indicate UVR exposure area. *=Erythema Score.

These figures are provided to illustrate various aspects of certain examples and is not intended to be limiting in scope unless otherwise limited by the claims.

DESCRIPTION OF EMBODIMENTS

Although the following detailed description contains many specifics for the purpose of illustration, a person of ordinary skill in the art will appreciate that many variations and alterations to the following details can be made and are considered to be included herein. Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

As used in this written description, the singular forms "a," "an" and "the" include support for plural referents unless the context clearly dictates otherwise. Thus, for example, reference to "a subject" includes a plurality of subjects.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the compositions nature or characteristics would be permissible if present under the "consisting essentially of" language, even though not expressly recited in a list of items following such terminology. When using an open ended term, like "comprising" or "including," in this written description, it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

Occurrences of the phrase "in one embodiment," or "in one aspect," herein do not necessarily all refer to the same embodiment or aspect.

As used herein, "subject" refers to a mammal that may benefit from the administration of composition described herein. In one aspect the mammal may be a human.

As used herein, the terms "formulation" and "composition" are used interchangeably and refer to a mixture of two or more compounds, elements, or molecules. In some aspects the terms "formulation" and "composition" may be used to refer to a mixture of one or more active agents with a carrier or other excipients. Compositions can take nearly any physical state, including solid and/or liquid (i.e. solution). Furthermore, the term "dosage form" can include one or more formulation(s) or composition(s) provided in a format for administration to a subject.

As used herein, "effective amount" refers to an amount of an ingredient which, when included in a composition, is sufficient to achieve an intended compositional or physiological effect. Thus, a "therapeutically effective amount" refers to a non-toxic, but sufficient amount of an active agent, to achieve therapeutic results in treating or preventing a condition for which the active agent is known to be effective. It is understood that various biological factors may affect the ability of a substance to perform its intended task. Therefore, an "effective amount" or a "therapeutically effective amount" may be dependent in some instances on such biological factors. Additionally, in some cases an "effective amount" or a "therapeutically effective amount" may not be achieved in a single dose. Rather, in some examples, an "effective amount" or a "therapeutically effective amount" can be achieved after administering a plurality of doses over a period of time, such as in a pre-designated dosing regimen. Further, while the achievement of therapeutic effects may be measured by a physician or other qualified medical personnel using evaluations known in the art, it is recognized that individual variation and response to treatments may make the achievement of therapeutic effects a subjective decision. The determination of an effective amount is well within the ordinary skill in the art of pharmaceutical and nutritional sciences as well as medicine.

As used herein, "mimic," "mimicking," or "mimic a gene expression profile of caloric restriction" refer to the ability of a therapeutically effective amount of the oral formulations described herein to illicit or induce a gene expression profile in a tissue of a subject that closely resembles a gene expression profile resulting from caloric restriction in a tissue of the subject as compared to a control subject. In some examples, "mimic," "mimicking," or "mimic a gene expression profile of caloric restriction" can mean that at least 1000 genes, 2000 genes, or 3000 genes in a tissue that are up-regulated or down-regulated in response to caloric restriction in a subject as compared to a control subject (i.e. a subject not calorically restricted or administered the oral formulation or a similar supplement) are also up-regulated or down-regulated in the tissue in response to a therapeutically effective amount of the oral formulation as compared to a control subject. In some examples, "mimic," "mimicking," or "mimic a gene expression profile of caloric restriction" means that at least 20%, 30%, or 40% of the genes in a tissue that are up-regulated or down-regulated in response to caloric restriction in a subject as compared to a control subject are also up-regulated or down-regulated in the tissue in response to a therapeutically effective amount of the oral formulation as compared to a control subject.

As used herein, a "dosage regimen" or "regimen" refers to how, when, how much, and for how long a dose of a composition can or should be administered to a subject in order to achieve an intended treatment or effect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. Unless otherwise stated, use of the term "about" in accordance with a specific number or numerical range should also be understood to provide support for such numerical terms or range without the term "about". For example, for the sake of convenience and brevity, a numerical range of "about 50 ml to about 80 ml" should also be understood to provide support for the range of "50 ml to 80 ml." Furthermore, it is to be understood that in this specification support for actual numerical values is provided even when the term "about" is used therewith. For example, the recitation of "about" 30 should be construed as not only providing support for values a little above and a little below 30, but also for the actual numerical value of 30 as well.

As used herein, a plurality of items, structural elements, compositional elements, and/or materials may be presented in a common list for convenience. However, these lists should be construed as though each member of the list is individually identified as a separate and unique member.

Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Reference in this specification may be made to compositions or methods that provide "improved" performance and/or health conditions in a subject. It is to be understood that unless otherwise stated, such "improvement" is a measure of a benefit obtained based on a comparison to the performance and/or health condition of the subject prior to and/or without administration of a similar composition or method.

Example Embodiments

Caloric Restriction (CR) is the only intervention consistently demonstrated to increase both average and maximal lifespan across a broad range of species. However, because CR typically requires a 30-40% reduction in caloric intake compared to an ad libitum diet, it is impractical for most humans to sustain CR over their lifetime.

Therefore, the current disclosure provides oral formulations that can mimic the beneficial health-promoting and anti-aging effects of CR without restricting calories or energy. It is anticipated that the oral formulations can provide "youthspan" benefits, and potentially extend lifespan. Further, the oral formulations described herein have been formulated to provide nutritional benefits not known to be provided by CR alone. Thus, the oral formulations described herein can both mimic CR health benefits and provide additional health benefits beyond CR.

In one example, the oral formulation can include an omega-3 fatty acid, a stilbenoid, a flavonoid, and vitamin D. Each of these ingredients can be present in an amount and weight ratio that causes the formulation to mimic a gene expression profile of caloric restriction in a tissue of a subject, when administered in a therapeutically effective amount.

Omega-3 fatty acids are polyunsaturated fatty acids, meaning they contain more than one cis double bond. In some examples, Omega-3 fatty acids can provide a number of benefits related to inflammation, DNA protection, antioxidant protection, cardiovascular benefits, brain structure, cognition, mood and memory, bone and joint health, skin health, eye health and vision support, physical performance in strength training, metabolism, immune health, and associated gene expression.

A variety of omega-3 fatty acids can be included in the oral formulation. For example, the omega-3 fatty acids can include eicosapentaenoic acid (EPA), docosahexaenoic acid (DHA), alpha linolenic acid (ALA), or a combination thereof. The parent fatty acid of the omega-3 series is ALA and humans can synthesize EPA and DHA from ALA, but the conversion is very inefficient and as such, EPA and DHA are often considered 'conditionally essential' fatty acids. In some examples, the oral formulation described herein can include EPA and optionally one or more additional omega-3 fatty acids. In some examples, the EPA can be present in an amount from about 5 wt % or 10 wt % to about 20 wt % or 30 wt %. In some examples, the oral formulation can include DHA and optionally one or more additional omega-3 fatty acids. In some examples, the DHA can be present in an amount from about 3 wt % or 7 wt % to about 13 wt % or 18 wt %. In some examples, the omega-3 fatty acid can include a combination of EPA and DHA, and optionally ALA. In some examples, the omega-3 fatty acid can include substantially no ALA. In some examples, where the omega-3 fatty acid includes a combination of EPA and DHA, the EPA and DHA are present in the formulation in a weight ratio of from 1:1 to 3:1, or from 3:1 to 1:2, or from 2:1 to 1:1. In some examples, where the omega-3 fatty acid includes a combination of EPA and DHA, the EPA and DHA can be provided by fish oil.

Thus, in some examples, the oral formulation can include fish oil. The fish oil can be derived from a number of fish sources, such as salmon, tuna, sardines, mackerel, anchovies, halibut, shark, cod, swordfish, etc., or combinations thereof. In some examples, the fish oil can be ultra-pure fish oil that is derived from anchovies, mackerel, sardines, or a combination thereof. In some examples, the fish oil can include from 24 wt % or 26 wt % to 31 wt % or 35 wt % EPA. In other examples, the fish oil can include from 14 wt % or 16 wt % to 21 wt % or 25 wt % DHA. In some examples, the triglyceride form of fish oil is used rather than the ethyl ester form. In some cases, the triglyceride form of fish oil can be better absorbed and/or tolerated than the ethyl ester form of fish oil.

Additionally, the oral formulations described here can include a stilbenoid. Stilbenoids can be found in berries, nuts, roots, and vegetable sources and can provide a variety of health related benefits. For example, in some cases stilbenoids can provide health benefits related to inflammation, DNA protection, cellular detoxification and purification, cardiovascular benefits, metabolism, and associated gene expression.

A variety of stilbenoids can be included in the oral formulations described herein. Non-limiting examples can include resveratrol, vitisin A, pterostilbene, piceatannolin, astringin, piceid, the like, or combinations thereof. In some specific examples, the stilbenoid can include resveratrol. Resveratrol can be obtained from a number of sources, such as *Polygonum cuspidum, Gnetum gnemon* L., lingonberry extract, yeast fermentation, grape or grape seed extract, red wine extract, synthetic resveratrol, the like, or a combination thereof. Any one of these sources of resveratrol can be included in the oral formulation. In some specific examples, the resveratrol can be provided as *Polygonum cuspidum* root having from 40 wt % or 45 wt % to 55 wt % or 60 wt % resveratrol. In some other specific examples, the stilbenoid can include pterostilbene.

In some specific examples, the stilbenoid can be present in the oral formulation in an amount of from about 0.1 wt % or 0.5 wt % to about 2 wt % or 4 wt %. In some examples, the stilbenoid can be present with the omega-3 fatty acid at a weight ratio of from 1:50 to 1:20 or from 1:40 to 1:30 stilbenoid to omega-3 fatty acid.

The oral formulation can also include a flavonoid. In some examples, the flavonoid can provide a variety of benefits. For example, in some cases, the flavonoid can increase the bioavailability of the stilbenoid. Additionally, in some examples, the flavonoid can provide health benefits related to inflammation, DNA protection, cellular detoxification and purification, antioxidant protection, cardiovascular benefits, brain health and cognition, metabolism, and associated gene expression.

A variety of flavonoids can be included in the oral formulation. Non-limiting examples can include a flavonol, a flavanone, an anthocyanin, the like, or combinations thereof. In some examples the flavonoid can include a flavonol. Non-limiting examples of flavonols can include fisetin, galangin, gossypetin, kaempferol, morin, myricetin, natsudaidain, quercetin, the like, or combinations thereof. In some specific examples, the flavonol can be quercetin. Quercetin can be obtained from a variety of sources, such as quercetin dihydrate, onion extract, rutin, *Sophora japonica* L., Fava D'anta, the like, or a combination thereof. Any one of these sources of quercetin can be included in the oral formulation. Where the flavonoid includes quercetin, the quercetin can be present in the oral formulation with the stilbenoid at a weight ratio of from 4:1 to 1:2 or from 3:1 to 1:1 quercetin to stilbenoid. In some specific examples, the quercetin can be present in the oral formulation in an amount from about 0.5 wt % or 1 wt % to about 3 wt % or 5 wt %.

In other examples, the flavonoid can include a flavanone. Non-limiting examples of flavanones can include butin, eriodictyol, hesperetin, hesperidin, homoeriodictyol, isosakuranetin, naringenin, naringin, pinocembrin, poncirin, sakuranetin, sakuranin, sterubin, the like, and combinations thereof. In some specific examples, the flavanone can include naringin. Where the flavonoid includes naringin, the naringin can be present in the oral formulation with the stilbenoid at a weight ratio of from 5:1 to 1:1 or from 4:1 to 2:1 naringin to stilbenoid. In some specific examples, the naringin can be present in the oral formulation in an amount from about 1 wt % or 2 wt % to about 4 wt % or 6 wt %. In some specific examples, the flavanone can include hesperidin. Where the flavonoid includes hesperidin, the hesperidin can be present in the oral formulation with the stilbenoid at a weight ratio of from 5:1 to 1:1 or from 4:1 to 2:1 hesperidin to stilbenoid. In some specific examples, the hesperidin can be present in the oral formulation in an amount from about 1 wt % or 2 wt % to about 4 wt % or 6 wt %. In some examples, the flavonoid can include a combination of naringin and hesperidin in a weight ratio of about 1:2 to about 2:1.

In other examples, the flavonoid can include anthocyanins. In some examples, the anthocyanins can be provided by Purple Corn (*Zea mays* L.) cob extract. Thus, in some examples, the oral formulation can include Purple Corn cob extract. In some examples, the Purple Corn cob extract can include from about 5 wt % to about 10 wt % anthocyanins. In some examples, the anthocyanins can be present in the oral formulation with the stilbenoid at a weight ratio of from 1:1 to 1:6 or from 1:2 to 1:4. In some specific examples, the anthocyanins are present in the oral formulation in an amount from about 0.05 wt % or 0.1 wt % to about 0.5 wt % or 1 wt %.

It is noted that in some examples the flavonoid can include a combination of flavonoids. However, whether the flavonoid includes a single flavonoid or a combination of flavonoids, the flavonoid can be present in the oral formulation with the stilbenoid in a weight ratio of from 15:1 to 1:10 or from 12:1 to 1:5 flavonoid to stilbenoid. Further, in some specific examples, the total amount of flavonoid, whether a single component or a combination of components, can be from about 3 wt % or about 5 wt % to about 10 wt % or about 15 wt %.

The oral formulation can also include vitamin D. Vitamin D is a fat-soluble vitamin that can be synthesized by the human body in response to UV exposure. For example, unimpeded mid-day sun exposure can lead to the endogenous production of the equivalent of ingesting 10,000 international units (IU) of vitamin D. However, there are a number of factors that can affect an individual's ability to derive adequate vitamin D in response to UV exposure, such as sunscreen, geographical location, time of year, working conditions, etc. Thus, it can be beneficial to supplement vitamin D as part of the diet.

It is noted that there are various sources of dietary vitamin D, such as ergocalciferol (vitamin $D_2$), cholecalciferol (vitamin $D_3$), the like, or a combination thereof. Any of these sources of vitamin D can be used in the oral formulation. However, in some cases the vitamin D can include vitamin $D_3$. In some examples, the vitamin D and the omega-3 fatty acid can be present at a ratio of from 1 IU of vitamin D per 2 milligrams (mg) of omega-3 fatty acid to 2 IU vitamin D per 1 mg of omega-3 fatty acid or from 1 IU vitamin D per 1.5 mg of omega-3 fatty acid to 1.5 IU vitamin D per 1 mg of omega-3 fatty acid. In some specific examples, the oral formulation can include from 100 IU or 200 IU to about 1500 IU or 2000 IU vitamin D.

In some examples, the oral formulation can include a number of ingredients in addition to the omega-3 fatty acid, the stilbenoid, the flavonoid, and vitamin D. In some examples, the oral formulation can also include rosemary leaf extract, coenzyme $Q_{10}$, alpha lipoic acid (LA), a carotenoid, vitamin K and/or other fat-soluble vitamins, water-soluble vitamins, d-limonene, grape seed extract, *Panax ginseng* extract, *Cordyceps sinensis* (c. *sinensis*), pomegranate extract, broccoli seed extract, Schizandra berry extract, Tart cherry extract, *Rhodiola* rosacea extract, L-carnitine tartrate, red orange extract, olive leaf extract, olive fruit extract, curcumin, the like, or combinations thereof.

In one specific example, the oral formulation can include rosemary (*Rosmarinus officinalis* L.) leaf extract. In some examples, rosemary leaf extract can provide a number of health benefits related to inflammation, cardiovascular benefits, brain structure, cognition, mood and memory, and others. In some examples, the rosemary leaf extract in the oral formulation can include from about 2 wt % or 3 wt % to about 6 wt % or 8 wt % carnosic acid. In some additional examples, the rosemary leaf extract and the stilbenoid can be present at a weight ratio of from 2:1 to 1:2, 2:1 to 1:1, or 1:1 to 2:1. In some specific examples, the oral formulation can include from about 0.1 wt % or 0.5 wt % to about 2 wt % or 3 wt % rosemary leaf extract.

In yet another example, the oral formulation can include coenzyme $Q_{10}$. Coenzyme $Q_{10}$ is also known as ubiquinone and is a compound synthesized by humans. It is a fat-soluble antioxidant enzyme that plays a significant role in energy production. Further, coenzyme $Q_{10}$ is involved in cellular respiration and ATP production. Moreover, it can provide a number of health benefits related to DNA protection, cellular detoxification and purification, antioxidant protection, cardiovascular benefits, physical performance, and metabolism. However, coenzyme $Q_{10}$ production in the body can decline with age. As such, it can be beneficial to supplement coenzyme $Q_{10}$ as part of the diet. In some examples, the coenzyme $Q_{10}$ and the stilbenoid can be present in the oral formulation at a weight ratio of from about 2:1 to 1:2, 2:1 to 1:1, or 1:1 to 2:1. In some specific examples, coenzyme $Q_{10}$ can be present in the oral formulation in an amount from about 0.1 wt % or 0.5 wt % to about 2 wt % or 5 wt %.

In another specific example, the oral formulation can include LA. LA is an antioxidant compound synthesized by humans that has amphiphilic properties. LA can provide a number of health benefits related to DNA protection, cellular detoxification and purification, antioxidant protection, brain structure, cognition, mood and memory, and metabolism. However, like coenzyme $Q_{10}$, endogenous LA production can decline with age. In some examples, LA and the stilbenoid can be present in the oral formulation at a weight ratio of from 5:1 to 1:2 or from 4:1 to 1:1. In some specific examples, the LA can be present in the oral formulation in an amount from about 1 wt % or 2 wt % to about 5 wt % or 10 wt %.

In another example, the oral formulation can include a carotenoid. Carotenoids can provide a number of health benefits related to inflammation, DNA protection, antioxidant protection, eye health and vision support, cardiovascular benefits, skin health, brain structure, cognition, and mood and memory. There are various types of carotenoids, such as xanthophylls and carotenes. Where the oral formulation includes carotenoids the carotenoid can include a xanthophyll, a carotene, or a combination thereof.

In some examples, the carotenoid can include a xanthophyll. Non-limiting examples of xanthophylls can include astaxanthin, α-cryptoxanthin, β-cryptoxanthin, flavoxanthin, lutein, neoxanthin, violaxanthin, zeaxanthin, the like, or combinations thereof. In some examples, the oral formulation can include astaxanthin. In some examples, the astaxanthin can be provided in an oil vehicle (e.g. olive oil, canola oil, vegetable oil, coconut oil, etc.). The astaxanthin can be obtained from a variety of sources, such as algae, krill oil, the like, or combinations thereof. In some examples, the astaxanthin can be derived from *Haematococcus pluvialis* algae. The astaxanthin can be present with the stilbenoid in the oral formulation at a weight ratio of from 1:40 to 1:1 or from 1:30 to 1:10. In some specific examples, the astaxanthin can be present in the oral formulation in an amount from about 0.005 wt % or 0.01 wt % to about 0.1 wt % or 1 wt %.

In additional examples, the oral formulation can include the xanthophyll lutein. Lutein can be synthetic lutein or can be derived from a natural source, such as marigold flowers, for example. In some examples, lutein can be derived from marigold flowers. In some examples, lutein can be provided in a beadlet vehicle. The beadlet can be made of a starch, a cellulosic compound, gelatin, the like, or a combination thereof. The beadlet can include from about 1 wt % or 3 wt % to about 15 wt % or 20 wt % lutein. In some examples, the lutein can be present with the stilbenoid in the oral formulation in a weight ratio of from about 1:15 to 1:1 or from about 1:10 to 1:5. In some specific examples, the lutein can be present in the oral formulation in an amount from about 0.01 wt % or 0.05 wt % to about 0.5 wt % or 1 wt %. In some examples, the oral formulation can include both astaxanthin and lutein in a weight ratio of from about 1:10 to 1:1 or from about 1:6 to 1:2.

In some examples, the carotenoid can include a carotene. Non-limiting examples of carotenes can include lycopene, α-carotene, β-carotene, δ-carotene, ε-carotene, γ-carotene, the like, or combinations thereof. In one specific example, the oral formulation can include lycopene. Lycopene can be synthetic lycopene or it can be derived from a natural source, such as tomato or gac fruit, for example. In one example, the lycopene can be a synthetic lycopene rather than a naturally isolated or extracted lycopene. In another example, the lycopene can be provided in an oil vehicle (e.g. olive oil, canola oil, vegetable oil, coconut oil, etc.). Where the lycopene is provided in an oil vehicle, it can be present in the oil vehicle in an amount from about 3 wt % or 5 wt % to about 15 wt % or 20 wt %. In one example, the lycopene and the stilbenoid are present in the oral formulation in a weight ratio of about 1:10 to about 1:1 or about 1:8 to about 1:4. In one specific example, lycopene can be present in the oral formulation in an amount from about 0.05 wt % or 0.1 wt % to about 0.5 wt % or 1 wt %.

In some examples, both lycopene and astaxanthin are present in the oral formulation in a weight ratio of from 10:1 to 1:2 or from 8:1 to 3:1. In some examples, both lycopene and lutein are present in the oral formulation in a weight ratio of from about 2:1 to 1:2, 2:1 to 1:1, or 1:1 to 2:1.

It is noted that in some examples the carotenoid can include a combination of carotenoids. However, whether the carotenoid includes a single carotenoid or a combination of carotenoids, the carotenoid can be present in the oral formulation with the stilbenoid in a weight ratio of from 1:5 to 2:1 or from 1:4 to 1:2. Further, in some specific examples, the total amount of carotenoid, whether a single component or a combination of components, can be from about 0.005 wt % or about 0.1 wt % to about 0.5 wt % or about 2 wt %.

In another example, the oral formulation can include vitamin K. Vitamin K is an essential fat-soluble vitamin that can be challenging to obtain in the normal diet. Yet, vitamin K can provide a number of health benefits related to cardiovascular health, bone and joint health, among others. Thus, it can be beneficial to supplement vitamin K with a regular diet.

There are various forms of vitamin K, such as vitamin $K_1$ and vitamin $K_2$. The oral formulation can include vitamin $K_1$, vitamin $K_2$, or a combination thereof. In some examples, vitamin K can include vitamin $K_2$. Vitamin $K_2$ can include a variety of compounds, such as menaquinone (MK)-4, MK-5, MK-6, MK-7, MK-8, MK-9, MK-10, MK-11, or combinations thereof, any one of which can be used in the oral formulation. However, in some examples, vitamin $K_2$ can include MK-7. In some examples, vitamin K can be provided in an oil vehicle, such as olive oil, canola oil, vegetable oil, coconut oil, etc. Where vitamin K is provided in an oil vehicle, it can be present in the oil vehicle in an amount from about 800 ppm to about 3000 ppm or from about 1000 ppm to about 2000 ppm. In some examples, vitamin K and vitamin D can be present in the composition in a weight ratio of from 3:1 to 1:2 or from 2:1 to 1:1. In some specific examples, vitamin K can be present in the oral formulation in an amount of about 0.0001 wt % or 0.0005 wt % to about 0.005 wt % or about 0.01 wt %.

In other examples the oral formulation can include d-limonene. D-limonene can provide a number of health benefits related to inflammation, DNA protection, and skin health. In some examples, d-limonene can be included in the oral formulation with the stilbenoid at a weight ratio of from 4:1 to 1:2 or 3:1 to 1:1. In some specific examples, d-limonene can be included in the oral formulation in an amount from about 0.1 wt % or 0.5 wt % to about 2 wt % or 5 wt %.

The oral formulation can also include a pharmaceutically acceptable carrier. The pharmaceutically acceptable carrier can include any suitable carrier components and excipients. Non-limiting examples can include a carrageenan, a cellulose derivative, a starch derivative, gelatin, water, a polyol, an oil (e.g. olive oil, canola oil, vegetable oil, coconut oil, etc.), fumed silica, carbohydrates (i.e. sucrose, lactose, glucose, fructose, etc.), or a combination thereof. A cellulose derivative can include any suitable cellulosic compound, such as hydroxyethyl cellulose, hydroxypropyl cellulose, carboxymethyl cellulose, microcrystalline cellulose, the like, or combinations thereof. Starch derivatives can include starch, dextrin, hydroxypropylated starch, acetylated starch, oxidized starch, other modified starches, or combinations thereof. Polyols can include glycerin, propylene glycol, polyethylene glycol, sorbitol, mannitol, other polyols, and combinations thereof. As will be apparent to one skilled in the art, a number of other carriers and associated excipients can also be used with the oral formulation.

Further, the oral formulation can be formulated as an oral dosage form such as a capsule, gel capsule, tablet, powder, beverage, wafer, confectionary, chewable, gel, paste, elixir, syrup, drop, lozenge, or a combination thereof. In one specific example, the oral dosage form can be a capsule or gel capsule.

In some examples, the oral dosage form can include from about 100 mg or 200 mg to about 1200 mg or 1500 mg of omega-3 fatty acids. In some specific examples, the oral dosage form can include from about 100 mg to about 400 mg omega-3 fatty acids. In some examples, the oral dosage form can include from about 3 mg or 5 mg to about 40 mg or 50 mg stilbenoids. In some specific examples, the oral dosage form can include from about 5 mg to about 10 mg stilbenoids. In some examples, the oral dosage form can include from about 2 mg or 10 mg to about 90 mg or 120 mg flavonoids. In some specific examples, the oral dosage form can include from about 60 mg to about 90 mg flavonoids. In some examples, the oral dosage form can include from about 100 IU or 200 IU to about 1500 IU or 2000 IU vitamin D. In some specific examples, the oral dosage form can include from about 200 IU to about 300 IU vitamin D.

In some examples, where the oral dosage form includes rosemary leaf extract, the oral dosage form can include from about 5 mg or 8 mg to about 50 mg or about 60 mg rosemary leaf extract. In some specific examples, the oral dosage form can include from about 5 mg to about 15 mg rosemary leaf extract. In some examples, where the oral dosage form includes coenzyme $Q_{10}$, the oral dosage form can include from about 2 mg or 5 mg to about 40 mg or 50 mg coenzyme $Q_{10}$. In some specific examples, the oral dosage form can include from about 5 mg to about 10 mg coenzyme $Q_{10}$. In some examples, where the oral dosage form includes LA, the oral dosage form can include from about 10 mg or 20 mg to about 120 mg or 150 mg LA. In some specific examples, the oral dosage form can include from about 20 mg to about 30 mg LA. In some examples, where the oral dosage form includes a carotenoid, the oral dosage form can include from about 1 mg or 2 mg to about 15 mg or 20 mg carotenoids. In some specific examples, the oral dosage can include from about 1 mg to about 5 mg carotenoids. In some examples, where the oral dosage form includes vitamin K, the oral dosage form can include from about 3 micrograms or 5 micrograms to about 50 micrograms or 60 micrograms vitamin K. In some specific examples, the oral dosage form can include from about 5 micrograms to about 15 micrograms of vitamin K. In some examples, where the oral dosage form includes d-limonene, the oral dosage form can include from about 5 mg or 10 mg to about 60 mg or 75 mg d-limonene. In some specific examples, the oral dosage form can include from about 8 mg to about 15 mg d-limonene.

The oral dosage form can be used to provide an effective daily dosage of the oral formulation to a subject. This can be referred to as an effective daily dosage regimen. In some examples, the effective daily dosage regimen can be used to administer a therapeutically effective amount of the oral formulation to a subject. The effective daily dosage regimen can include a single administration or a plurality of administrations of the oral dosage form per day. In some examples, an effective daily dosage regimen of the oral dosage form can provide from about 700 mg or 800 mg to about 1200 or 1500 mg omega-3 fatty acids per day. In some examples, an effective daily dosage regimen of the oral dosage form can provide from about 20 mg or 25 mg to about 40 mg or 50 mg of the stilbenoid per day. In some examples, an effective daily dosage regimen of the oral dosage form can provide from about 100 mg or 200 mg to about 300 mg or 400 mg of flavonoids per day. In some specific examples, the effective daily dosage regimen of the oral dosage form can provide from about 60 mg or 70 mg to about 80 mg or 90 mg of quercetin per day, from about 5 mg or 8 mg to about 12 mg or 15 mg anthocyanins per day, from about 80 mg or 90 mg to about 120 or about 130 mg of naringin per day, from about 80 mg or 90 mg to about 120 or about 130 mg of hesperidin per day, or a combination thereof. In some examples, an effective daily dosage regimen of the oral dosage form can provide from about 700 IU or 900 IU to about 1500 IU or 2000 IU vitamin D per day.

Where the oral dosage form includes rosemary-leaf extract, in some examples the effective daily dosage regimen of the oral dosage form can provide from about 25 mg or 30 mg to about 50 mg or 60 mg rosemary leaf extract per day. Where the oral dosage form includes coenzyme $Q_{10}$, in some examples the effective daily dosage regimen of the oral dosage form can provide from about 20 mg or 25 mg to about 35 mg or 40 mg of coenzyme $Q_{10}$ per day. Where the oral dosage form includes LA, in some examples the effective daily dosage regimen of the oral dosage form can provide from about 80 mg or 90 mg to about 110 mg or 120 mg LA per day. Where the oral dosage form includes a carotenoid, in some examples the effective daily dosage regimen of the oral dosage form can provide from about 7 mg or 8 mg to about 12 mg or 15 mg carotenoids per day. In some specific examples, the effective daily dosage regimen of the oral dosage form can provide from about 0.5 mg or 0.75 mg to about 1.25 mg or 1.5 mg astaxanthin per day, from about 2 mg or 3 mg to about 5 mg or 6 mg lutein per day, from about 3 mg or 4 mg to about 6 mg or 8 mg lycopene per day, or a combination thereof. Where the oral dosage form includes vitamin K, in some examples the effective daily dosage regimen of the oral dosage form can provide from about 25 micrograms or 30 micrograms to about 50 micrograms or 60 micrograms vitamin K per day. Where the oral dosage form includes d-limonene, in some examples the effective daily dosage regimen of the oral dosage form can provide from about 30 mg or 40 mg to about 60 mg or 75 ing d-limonene per day.

Further, the oral formulation can be used in a method of mimicking a caloric restriction gene expression profile in a tissue of a subject. This method can include administering a therapeutically effective amount of the oral formulation to the subject. In some examples, the therapeutically effective amount can be administered via the effective daily dosage regimen to provide daily dosage amounts as described above, or similar, over a period of days or at least 1, 2, 4, 6, or 8 weeks. In some examples, the oral formulation can be administered with a meal. The meal can include at least 1 gram or at least 5 grams of fat. The amount of fat in the meal can increase the bioavailability of some of the components of the oral formulation and can be advantageous in some examples.

As described above, mimicking a gene expression profile of caloric restriction can refer to the ability of a therapeutically effective amount of the oral formulations described herein to illicit or induce a gene expression profile in a tissue of a subject that closely resembles a gene expression profile resulting from caloric restriction in a tissue of the subject as compared to a control subject. In some examples, mimicking a caloric restriction gene expression profile can mean that at least 1000 genes, 2000 genes, or 3000 genes in a tissue that are up-regulated or down-regulated in response to caloric restriction in a subject as compared to a control subject are also up-regulated or down-regulated in the tissue in response to a therapeutically effective amount of the oral formulation as compared to a control subject. In some examples, mimicking a caloric restriction gene expression profile can mean that at least 20%, 30%, or 40% of the genes in a tissue that are up-regulated or down-regulated in response to caloric restriction in a subject as compared to a control subject are also up-regulated or down-regulated in the tissue in response to a therapeutically effective amount of the oral formulation as compared to a control subject. In some examples, the tissue can be brain tissue, muscle tissue, heart tissue, adipose tissue, or a combination thereof. In some specific examples, the tissue can be brain tissue. In other specific examples, the tissue can be muscle tissue. In some examples, the genes modified in these tissues in response to caloric restriction or a therapeutically effective amount of the oral formulation can include genes directly related to learning and memory, energy metabolism, mitochondrial function, immune function, cell cycle regulation, tumor suppression, steroid synthesis, longevity, red blood cell production, or a combination thereof.

The current disclosure also describes a method of protecting a subject's skin cells against ultraviolet radiation (UVR). In some examples, this method can include administering to a subject an oral formulation as described above, but that includes an omega-3 fatty acid, a stilbenoid, a flavonoid, and vitamin D in amounts and weight ratios that cause the formulation to protect the subject's skin cells against ultraviolet radiation, when administered to the subject in a therapeutically effective amount. By protecting the subject's skin cells, it is meant that the formulation can provide health benefits to the skin that help protect the skin against ultraviolet radiation. For example, in addition to other health benefits, in some cases the oral formulation can increase carotenoid levels in skin cells.

In some examples, the oral formulation that is used in this particular method includes an omega-3 fatty acid, a stilbenoid, a carotenoid, and vitamin D in amounts and weight ratios that cause the formulation to protect the subject's skin cells against ultraviolet radiation, when administered to the subject in a therapeutically effective amount. With respect to this example of the oral formulation, the omega-3 fatty acid, the stilbenoid, and the vitamin D can be the same as described above. The carotenoid can also be the same as described above, but is required to be part of the oral formulation in this particular example of the oral formulation. In contrast, the flavonoid, which can also be the same as described above, can be optional in this particular example. All other optional ingredients described above can also optionally be included in this formulation as well. Further, this formulation can also be configured in an oral dosage form as described above and can be formulated to provide the therapeutically effective amounts and administered in the effective daily dosage regimens as described above.

In this particular method, the oral formulation can, in some examples, also be administered as part of a meal that includes at least 1 gram or at least 5 grams of fat. In some examples, the therapeutically effective amount can increase carotenoid levels in skin cells by at least 5% or 10% within a 2 week period as compared to carotenoid levels in skin cells prior to administering the oral formulation. In some examples, the therapeutically effective amount can increase carotenoid levels in skin cells by at least 10% or 20% within an 8 week period compared to carotenoid levels in skin cells prior to administering the oral formulation. In yet other examples, the therapeutically effective amount can decrease erythema, apoptosis of skin cells, or a combination thereof in response to UVR within an 8 week period as compared to erythema or apoptosis of skin cells in response to UVR prior to administering the oral formulation.

EXAMPLES

Example 1—Toxicity Study

This study was performed to assess the safety effects of a Novel Nutritional Blend in Wistar Rats, when administered orally for ninety consecutive days. Sixty healthy male and sixty healthy female Wistar rats were divided into various groups as follows: Control (10 males and 10 females at 0 mg/kg body weight), vehicle control (10 males and 10 females at 0 mg/kg body weight), low dose (10 males and 10 females at 54.5 mg/kg body weight), mid dose (10 males and 10 females at 273 mg/kg body weight), high dose (10 males and 10 females at 546.0 mg/kg body weight), recovery control (5 males and 5 females at 0 mg/kg body weight), and recovery high dose (5 males and 5 females at 546.0 mg/kg body weight) groups. The rats had a body weight of from 154.7 to 221.0 grams for males and from 149.4 to 201.0 grams for females at initial dosing and were 8-12 weeks old.

Rats were allowed to acclimatize to the experimental room conditions for a period of five days prior to commencement of dosing. During the acclimatization period, the rats were observed daily twice for clinical signs of disease. Prior to randomization, a detailed physical examination was performed on all animals.

Rats were maintained in an environment-controlled room. The experimental room temperature and humidity were recorded daily. The temperatures recorded were in the range of 22.0-25.0° C. respectively. The relative humidity recorded was in the range of 46.0-58.0%. In the experimental room, 12 hours of artificial lighting and 12 hours darkness were maintained, light hours being 6.00 to 18.00. The experimental room was cleaned and mopped with a disinfectant daily.

The animals were housed in group of two mice of the same gender per cage in solid floor polypropylene cages. Each cage was fitted with a stainless steel top grill and a polypropylene water bottle with a stainless steel drinking nozzle. A sterilized paddy husk was used as bedding material. The cages were kept on two and three tier racks and their positions were rotated weekly. Cages and bedding material were changed twice a week. Cages and water bottles were cleaned and sterilized in an autoclave.

The animals were fed with laboratory rodent pellet feed. The pellet feed contains ingredients such as crude proteins, fat, fiber, calcium and phosphorus. Feed and Charcoal filtered, UV sterilized water (Aqua guard water filter system) were provided ad libitum.

Fresh feed was supplied at least once a week and water bottles were refilled daily or whenever required Individual animals were identified with a number marked on the base of the tail using permanent marker pen and the cages were attached with colored cage card showing study N°, study code, test item code, group N°, N° of animals, sex, species, strain, dose, cage N°, and animal N°.

The Novel Nutritional Blend was prepared as a suitable suspension for dosing in 1% carboxymethyl cellulose (CMC). The Blend included effective weight ratios of ultrapure fish oil concentrate (including EPA and DHA), resveratrol (from *Polygonum cuspidatum* root), quercetin (from *Dimorphandra mollis* fruit extract), purple corn (*Zea mays* L.) cob extract with anthocyanins, rosemary (*Rosmarinus officinalis* L.) leaf extract with carnosic acid, naringin (a citrus bioflavonoid), hesperidin (a citrus bioflavonoid), coenzyme $Q_{10}$, alpha lipoic acid, astaxanthin (a carotenoid from *Haematococcus pluvialis* algae), the carotenoid lycopene, lutein (a carotenoid from Marigold flower (*Targetes erecta*)), vitamin $D_3$ (as cholecalciferol), vitamin $K_2$ (as menaquinone-7), and d-limonene (from *Citrus sinensis* peel).

Fresh solution of Novel Nutritional Blend in carboxy methyl cellulose was prepared every day one hour before dosing. All the animals were observed twice daily for visible clinical symptoms, morbidity, and mortality. Body weights were recorded individually for all animals on day 1, at weekly intervals, and on the day of sacrifice. No mortalities or clinical symptoms were observed in animals treated with the Novel Nutritional Blend. No significant changes in mean weekly body weights of animals were observed between the control and treated groups during the treatment period.

All the animals were euthanized by $CO_2$ asphyxiation and subjected to a complete necropsy under the direct supervision of a veterinary pathologist at the end of the treatment period. The animals were examined carefully for external abnormalities before the necropsy. The thoracic, abdominal and cranial cavities were then cut open and thorough examinations of the organs were carried out to detect changes or abnormalities, if any. Organs like adrenals, brain, uterus, ovaries, testes, epididymides, heart, kidneys, liver, spleen and thymus were collected. Absolute wet organ weights were recorded for all the animals after trimming of adherent fat tissue. Paired organs were weighed together. Relative weights of these organs were calculated later. Histopathological observations were performed in all groups.

The external examination of the carcasses of animals did not reveal any treatment related changes or abnormalities in any of the treated groups. After the external examination of the animal, the carcass was cut open and examined for gross pathology of visceral organs. The liver lobes were examined for changes and collected. The spleen and pancreas were examined for any treatment related changes and collected. The small intestine and large intestine were observed and samples of jejunum, ileum, cecum, colon and rectum were collected. The kidneys were examined for changes and removed. The larynx, trachea, esophagus, thymus and thyroids were collected along with lungs. The brain was collected and examined. There were no significant lesions or abnormalities like changes in size, color, congestion, hemorrhage, inflammation and necrosis were detected in any of the organs. Microscopical examination of organs revealed that there were no abnormal changes noticed in animals of all dose levels tested.

Therefore, oral administration of Novel Nutritional Blend for 90 consecutive days at 54.5, 273.0 and 546.0 mg/kg body weight did not reveal any treatment related adverse/toxic effects in Wistar rats under the experimental conditions.

Example 2—Clinical Dermatology Evaluation After Supplementation

Healthy, nonsmoking women between the ages of 40 and 75 years and body mass index (BMI) between 19 and 30 ($kg/m^2$) with Fitzpatrick skin types I and II were recruited to participate. Participants had to present with moderate signs of skin aging based on a dermatologist assessment. Exclusion criteria included: 1) history of chronic diseases, skin diseases or abnormalities; 2) regular consumption of dietary supplements containing carotenoids, vitamin D, eicosapentaenoic acid (EPA), docosahexaenoic acid (DHA), or resveratrol; 3) consumption of more than 1 serving of fatty fish per week; or 4) had used an anti-aging topical skin care treatment within 30 days of study enrollment. Participants who were pregnant, nursing, or planning to become pregnant were also excluded.

In all, thirty-six healthy female participants were enrolled and completed the study. Average age of participants was 58 years (range of 43 to 75). Average BMI was 27 $kg/m^2$ (range of 19 to 30). No participants withdrew from the study and average supplement compliance was 97.3% (range of 87% to 100%).

This was an open label study designed to investigate effects pre- and post-8 weeks oral supplementation with a novel nutritional and phytoiutrient blend against UVR-induced tissue damage of non-sun exposed skin (buttock), skin carotenoid levels (palm) and facial skin characteristics. The primary endpoint was UVR-induced cellular damage assessed by erythema and the number of apoptotic cells at the highest damaging dose of UVR. Secondary variables included facial skin attributes (i.e. elasticity and water loss), dermatologist- and self-assessed facial skin characteristics (lines, firmness, radiance, texture, and overall appearance) and skin carotenoid levels.

Each daily dose (4 capsules) of the oral supplement contained: 1,000 mg EPA+DHA from ultra-pure fish oil concentrate (2,110 mg), 30 mg resveratrol (from *Polygonum cuspidatum* root), 75 mg quercetin (from *Dimorphandra mollis* fruit extract), 140 mg purple corn (*Zea mays* L.) cob extract (delivering 10 mg anthocyanins), 37.5 mg rosemary (*Rosmarinus officinalis* L.) leaf extract (delivering 1.5 mg carnosic acid), 200 mg citrus bioflavonoids (which contains 100 mg naringin and 100 mg hesperidin), 30 mg Coenzyme Q10, 100 mg alpha lipoic acid, 1 mg astaxanthin (a carotenoid from *Haematococcus pluvialis* algae), 5 mg lycopene (a carotenoid), 4 mg lutein (a carotenoid from Marigold flower (*Targetes erecta*)), 1,000 IU vitamin D3 (as cholecalciferol), 40 µg vitamin K2 (as menaquinone-7), and 50 mg d-limonene (from *Citrus sinensis* peel oil).

Participants were instructed to consume 4 capsules per day, 2 capsules with breakfast and 2 capsules with dinner daily for 8 weeks. Participants were encouraged to consume a minimum of 5 g fat with meals to facilitate absorption of fat-soluble nutrients. Compliance was determined by the number of capsules distributed and the number returned by participants at 8 weeks. Adverse reactions as defined as any untoward medical occurrence (sign, symptom, or laboratory finding), regardless of severity and whether or not attributed to the supplements were reported to the physician/researcher.

Ultraviolet Radiation-Induced Cell Damage and Erythema. At baseline (pre) and at 8 weeks post-supplementation, previously non-sun exposed buttock skin was exposed to three solar minimal erythema doses (1 MED, 2 MED, and 3 MED) on 1 cm diameter circles by simulated radiation (model 16S-150v.3 powered by a xenon lamp power supply model XPS 200, Solar Light Co. Glenside, PA). One MED was defined as the lowest dose of UVR (mJ/cm$^2$) causing a visually perceptible erythema at 24 hours post-UVR exposure. The same procedure was repeated on each subject the end of the study, but on the opposite buttock. Erythema was determined by dermospectrophotometer measurement of the three irradiates sites 24-hours post-exposure and compared to non-exposed skin in the same area.

Figure 1B:
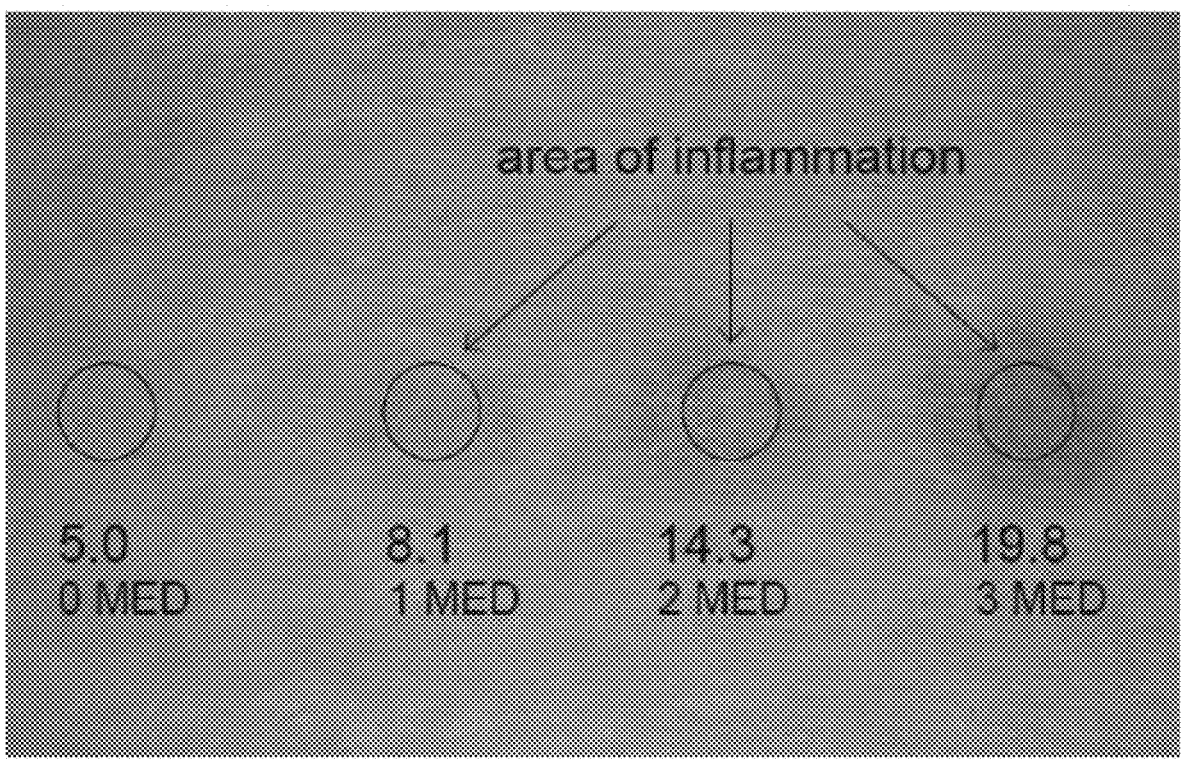
FIG. 1B illustrates a photograph of skin erythema from UVR exposure in the same participant as FIG. 1A at 8 weeks. The photograph illustrates erythema and inflammation at all UVR minimal erythema doses (MED). The Black circles indicate UVR exposure area. *=Erythema Score.
Figure 2A:
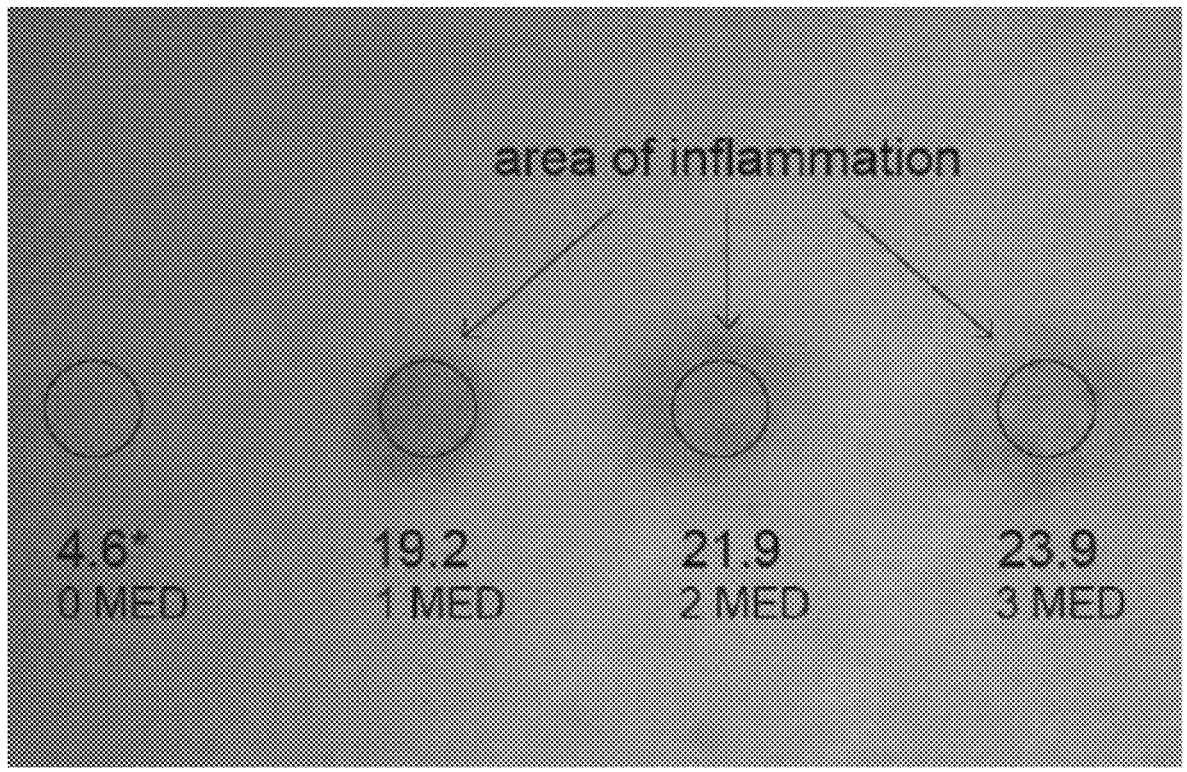
FIG. 2A illustrates a photograph of skin erythema from UVR exposure in another representative study participant at baseline. The photograph illustrates erythema and inflammation at all UVR minimal erythema doses (MED). The Black circles indicate UVR exposure area. *=Erythema Score.
Figure 2B:
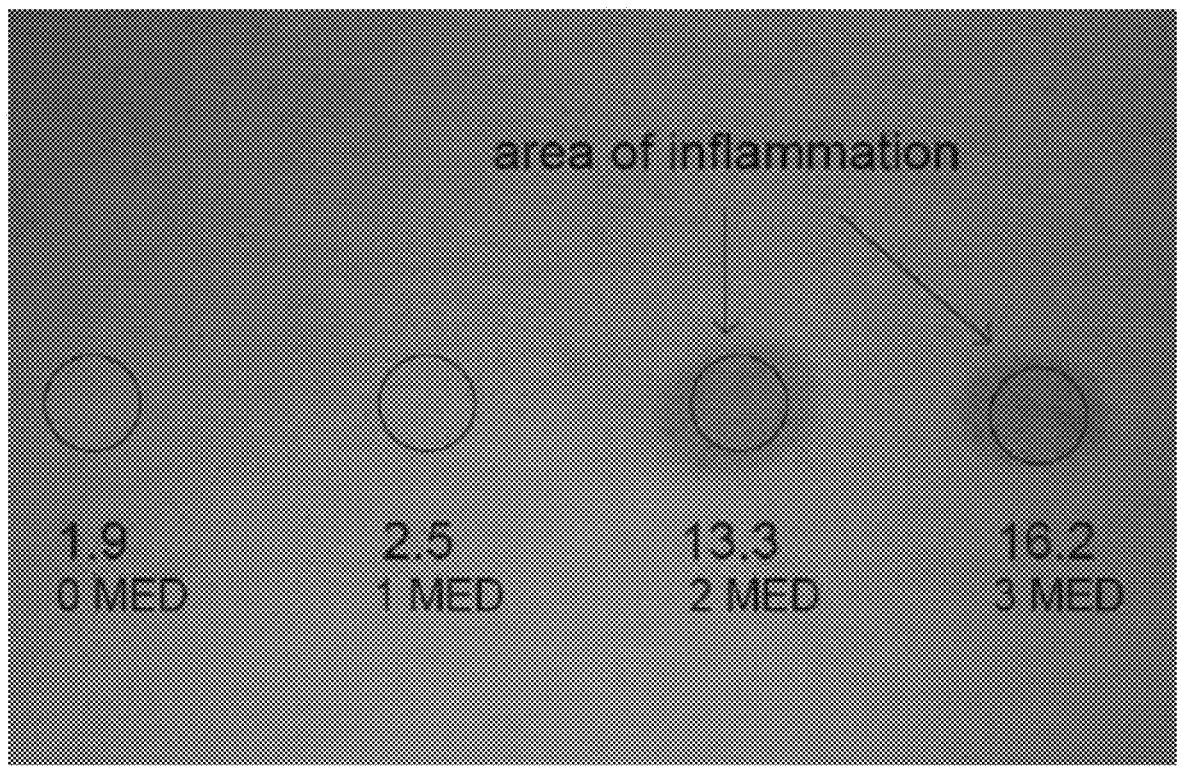
FIG. 2B illustrates a photograph of skin erythema from UVR exposure in the same participant as FIG. 2A at 8 weeks. The photograph illustrates erythema and inflammation at all UVR minimal erythema doses (MED). The Black circles indicate UVR exposure area. *=Erythema Score.

There were no differences between baseline and 8 weeks of supplementation with the novel nutritional and phytonutrient blend in the normal skin readings at the non-exposed, 0 MED site (p=0.75). However, there was a trend towards less erythema between baseline and 8 weeks at the 1 MED site (p=0.10) and significantly less erythema at 8 weeks compared to baseline at the 2 MED (p=0.02) and 3 MED exposure sites (p=0.01, Table 1). FIGS. 1A and 2A illustrate images of erythema resulting from 0 MED, 1 MED, 2 MED, or 3 MED doses at baseline for two respective study participants. FIGS. 1B and 2B illustrate images of erythema resulting from 0 MED, 1 MED, 2 MED, or 3 MED doses after 8 weeks of supplementation for each of the two respective study participants. As can be seen for Participant 1 in FIGS. 1A and 1B, the area of inflammation after exposure to UV radiation after 8 weeks of supplementation was diminished as compared to baseline prior to supplementation. Similarly, Participant 2 in FIGS. 2A and 2B, the area of inflammation after exposure to UV radiation after 8 weeks of supplementation was also diminished as compared to baseline prior to supplementation.

Apoptosis. Twenty-four hours post-UVR exposure a skin punch biopsy (2 mm) was taken at the 3 MED site after measurement of erythema. The tissue collected from the punch biopsy was immediately placed in formalin. Samples were sectioned (thinly sliced) and mounted on slides. Six stained sections were mounted on slides and then stained with hematoxylin and eosin (Cockerell Laboratories, Dallas, TX). Each section was examined under light microscopy and the sum of apoptotic cells for all 6 sections were recorded. The slides were read in a blinded fashion by a board certified dermatologist and the average number of apoptotic cells were recorded at baseline and after 8 weeks supplementation.

There were significantly fewer apoptotic cells following 8 weeks of supplementation compared to baseline, 11.3±0.9 cells/mm$^2$ SE (range of 3 to 31) at baseline; 5.3±1.0 cells/mm$^2$ SE (range of 0 to 13) at 8 weeks (p<0.0001), representing a 50% reduction in the number of apoptotic cells following 8 weeks supplementation (Table 1). As two specific examples, Participant 1, whose erythema images are illustrated in FIGS. 1A-1B, had an average of 27.8 apoptotic cells per mm$^2$ at baseline and 9.7 apoptotic cells per mm$^2$ after 8 weeks of supplementation. Participant 2, whose erythema images are illustrated in FIGS. 2A-2B, had an average of 12.3 apoptotic cells per mm$^2$ at baseline and 3.3 apoptotic cells per nmm$^2$ after 8 weeks of supplementation. In both cases, the study participant experienced a significant decrease in apoptotic cells per unit area at the 3 MED site.

TABLE 1

Erythema and Apoptotic Cell Counts

|  | 0 MED | 1 MED | 2 MED | 3 MED | Apoptotic Cell Count cells/mm$^2$ |
|---|---|---|---|---|---|
| Baseline | 6.2 ± 0.6 | 9.1 ± 0.6 | 15.8 ± 0.6 | 19.6 ± 0.6 | 11.3 ± 0.9 (3-31) |
| 8 weeks | 6.1 ± 0.6 | 7.4 ± 0.6* | 13.6 ± 0.6$^t$ | 17.3 ± 0.6$^§$ | 5.3 ± 0.9$^\#$ (0-13) |

*p = 0.10;
$^t$p = 0.02,
$^§$p = 0.01;
$^\#$p < 0.0001 compared to baseline and after 8 weeks of supplementation Skin Carotenoid Levels. Skin carotenoids levels were measured non-invasively in the palm of the hand using Raman spectroscopy (BioPhotonic Scanner, Nu Skin Enterprises, Provo, UT) as described in other clinical studies. Each subject was measured twice at each visit and measurements were recorded in Raman Intensity Units (RIUs). In the event the two measurements had a difference greater than 3,000 RIUs, a third measurement was taken and the values were averaged.

Skin carotenoid levels increased from baseline 28,111 RIUs mean±1,787 SE to 38,472±1,787 (p<0.0001) following 8 weeks supplementation (Table 2).

Skin Elasticity. Skin elasticity was measured on facial skin 3 cm below the outer corner of the eye using an elasticity cutometer (Dermalab, Cortex Technologies, Hadslund, Denmark). Significant increases in skin elasticity (p<0.005) following 8 weeks supplementation were observed (Table 2).

Epidermal Water Loss. Transepidermal water loss (TEWL) was measured on the face by an Evaporimeter (Dermalab, Cortex Technologies, Hadslund, Denmark). Significant increases in transepidermal water loss (p<0.005) following 8 weeks supplementation were observed (Table 2).

TABLE 2

General Skin Attributes

|  | Skin Carotenoid Concentration RIU | Elasticity MPa | Transepidermal Water Loss g/h/m$^2$ |
|---|---|---|---|
| Baseline | 28111 ± 1787 (12,000-63,000) | 32.8 ± 2.7 (10-64) | 10.2 ± 0.5 (6-17) |
| 8 weeks | 38472 ± 1,787$^§$ (20,000-63,000) | 41.4 ± 2.7* (17-73) | 11.7 ± 0.5* (8-18) |

*p < 0.005;
$^§$p < 0.0001 compared to baseline and after 8 weeks of supplementation Facial Skin Characteristics. Facial skin characteristics were evaluated by a board certified dermatologist at each visit. In order to minimize bias, the dermatologist was blinded as to participants' visit when making the assessments. Skin characteristics included: lines/wrinkles, firmness, radiance, texture/smoothness, and overall appearance using a 5-point ordinal scale (1=youthful and 5=aged). Participants also completed a self-assessment survey of facial skin characteristics (lines/wrinkles, firmness, radiance, texture/smoothness, and overall appearance) at baseline and 8 weeks post supplementation using a similar 5-point ordinal scale (1=youthful and 5=aged).

Evaluation of skin characteristics by a dermatologist noted significant improvements in skin radiance (p<0.0001), texture (p<0.0001), and overall appearance (p<0.0001) following 8 weeks supplementation; no differences in firmness or fine lines were detected (Table 3). Based on participants' self-assessments, significant improvements in skin firmness (p<0.05) and radiance (p<0.05) were reported following 8 weeks supplementation yet no changes in texture, lines, or overall appearance were noted (Table 3).

TABLE 3

Facial Skin Characteristics

| | | Radiance | Texture | Firmness | Lines | Overall Appearance |
|---|---|---|---|---|---|---|
| Dermatologist-Assessment | Baseline | 3.5 ± 0.09 | 3.4 ± 0.10 | 3.6 ± 0.08 | 3.4 ± 0.04 | 3.5 ± 0.10 |
| | 8 weeks | 2.8 ± 0.09§ | 2.7 ± 0.10§ | 3.5 ± 0.08 | 3.4 ± 0.04 | 3.0 ± 0.10§ |
| Self-Assessment | Baseline | 2.6 ± 0.14 | 2.4 ± 0.21 | 2.7 ± 0.12 | 2.6 ± 0.12 | 2.6 ± 0.12 |
| | 8 weeks | 2.3 ± 0.14* | 2.3 ± 0.21 | 2.3 ± 0.12* | 2.5 ± 0.12 | 2.5 ± 0.12 |

*p < 0.05,
§p < 0.0001 compared to baseline and after 8 weeks of supplementation Supplement Tolerance. Six participants reported adverse events that were mild and transitory: mild stomach upset (n=2), flatulence (n=2), and polyphagia (n=2). All of them were considered possibly related to the supplement, but no subject stopped consumption of the supplement as a result of an adverse event.

Statistical Methods. Erythema and apoptotic cell counts were analyzed by repeated measures ANOVA. The linear model fit to the skin carotenoid concentration, elasticity, and TEWL metrics included a random participants' effect (making the analysis equivalent to a multi-factor paired t-test), main effects for time. The analysis performed on the dermatologist and participants' assessments on skin characteristics was a non-parametric Wilcoxon Sign-Rank Test. P-values less than or equal to 0.05 were considered significant.

Synergistic Effects and Additional Observations. While CR can confer diverse anti-aging benefits in some tissues, it is believed that skin is a tissue in which CR has not been observed to elicit benefits. Nonetheless, one purpose of the present study was to use skin as a model to investigate the effects of the supplement on parameters believed to be affected by CR, parameters known as aging defense mechanisms (ADMs) including DNA damage response, inflammatory balance, and antioxidant protection. In the present study, 8 weeks of supplementation with the novel nutritional and phytonutrient blend provided cellular protection against UVR-induced cellular damage by bolstering ADMs in a manner similar to that which would be expected with CR. Furthermore, participants experienced significant and noticeable facial skin benefits including increases in skin elasticity and transepidermal water loss and improvements in skin radiance, texture and overall appearance based on dermatologist assessment. These improvements in facial skin appearance elicited by the supplement, would not be an expected outcome of CR, but reflect an anti-aging benefit nonetheless.

Short-term supplementation with the novel nutritional and phytonutrient blend protected against UVR-induced cellular damage as evidenced by an attenuation of erythema at all doses of UVR exposure (1 MED −19%; p=0.10, 2 MED −14%; p=0.02, and 3 MED −12%; p=0.01) and a reduction in the number of apoptotic cells by −50% (p<0.0001). The dramatic protective effects of the novel nutritional and phytonutrient blend in such a short period of time and at such low doses in the present study, suggest synergistic effects of the novel nutritional and phytonutrient blend. More specifically, the fact that such dramatic effects were observed with a formulation containing such low levels and supplemented for such a short period of time, indicates that it is the total blend of ingredients, not just the contribution of one or two individual ingredients, conferring the protective effects of the novel nutrient and phytonutrient blend.

Regulation of inflammatory balance is an important ADM, which contributes to cellular response and repair. However, if the inflammatory response is unregulated and is allowed to persist, it becomes a negative event in the aging process. In this study, cellular injury was induced by UVR exposure and erythema (skin redness) a marker of inflammation was quantified. Following supplementation for 8 weeks there was a marked reduction in erythema at the site of UVR exposure (Table 1) with a corresponding reduction in erythema outside of the UVR exposed area. FIGS. 1A-2B show photographs of two representative participants' skin erythema 24 hours post-UVR exposure with 0 MED, 1 MED, 2 MED, and 3 MED doses. The marked reduction in erythema outside the injury site (inflammation) after 8 weeks supplementation is positive evidence that the novel nutritional and phytonutrient blend provided benefits beyond the UVR exposure site by attenuating damage and modulating the inflammatory response.

It is assumed that inflammatory balance was modulated by several of the ingredients included in the novel nutritional and phytonutrient blend. For example, eicosapentaenoic acid (EPA) and docosahexaenoic acid (DHA) give rise to anti-inflammatory prostaglandins, eicosanoids, and resolvins. Changing the fatty acid composition of cells involved in the inflammatory response also effects production of peptide mediators of inflammation (adhesion molecules, cytokines, etc.). Other ingredients such as resveratrol and astaxanthin can also be effective in positively modulating inflammatory balance, even in healthy populations. For example, resveratrol can decrease inflammatory cytokine signaling in mononuclear cells following supplementation and astaxanthin can prevent the inflammatory process by blocking the expression of pro-inflammatory genes by suppressing the nuclear factor kappa B (NF-κB) activation. Astaxanthin (a carotenoid) can also inhibit the production of nitric oxide, prostaglandin E2, and the pro-inflammatory cytokines, TNF-α and IL-1β.

It is noted that human skin has an inherent antioxidant capacity, an ADM, to attenuate the potential damage caused by reactive species. However, this inherent capacity can be significantly depleted by moderate UV light exposure. It is noted that carotenoids are pigments with antioxidant function that are responsible for many of the bright colors (reds, oranges, yellows, etc.) in fruits and vegetables. Skin carotenoids are an excellent biomarker of fruit and vegetable intake. Carotenoid antioxidants have the unique ability to quench singlet oxygen generated in response to UV exposure. As such, carotenoids are known to accumulate in tissues commonly exposed to sunlight including the skin and the macula of the eye. The supplement used in this example contained at least approximately 10 mg of carotenoids (lutein, lycopene, and astaxanthin).

In the current study there was a dramatic increase in skin carotenoids from 28,111±1,787 to 38,472±1,787 RIUs (Table 2) indicating increased antioxidant protection in the skin and supporting antioxidant ADMs. Yet, not all of the protection observed in the present study can be attributed to the carotenoid content of the novel nutritional and phytonutrient blend (lutein, lycopene, and astaxanthin) as skin carotenoid levels were not correlated with erythema or apoptosis (data not shown), further suggesting that it was the novel, synergistic blend of ingredients, rather than individual ingredients, responsible for the protective effects observed. Furthermore, the study participants started out with an average skin carotenoid level of approximately 28,000 RIUs, a level that would be characteristic of an average western diet, indicating that the study participants consumed suboptimal levels of colorful fruits and vegetables. Therefore, despite a suboptimal background diet, the supplement led to improvements in nearly all outcomes assessed. These data suggest that the formula delivers functional outcomes that parallel CR, regardless of dietary habits and without additional supplementation with essential vitamins and minerals.

Supplementation with the formula bolstered the DNA damage response as evidenced by an attenuation of UVR-induced apoptosis. The present study definitively demonstrates that the novel nutrient and phytonutrient blend dramatically impacts the DNA damage response ADM, protecting against UVR-induced cell death as evidenced by a 50% reduction in apoptosis after 8 weeks supplementation. It is assumed that protection against apoptosis, a DNA damage response, was modulated by several of the ingredients included in the novel nutritional and phytonutrient blend including d-limonene, resveratrol, quercetin, fish oil, alpha lipoic acid, coenzyme $Q_{10}$, and the carotenoids.

The protective effects and influences on ADMs (DNA damage response, inflammatory balance and antioxidant protection) in response to UVR-induced damage in the present study translated to improvements in facial skin appearance that were independent of the resistance to UVR-induced damage. Measurable improvements in facial skin attributes including increased elasticity (p<0.005) and more youthful transepidermal water loss (p<0.005) (Table 2) were observed. Remarkably, noticeable improvements in skin characteristics as determined by dermatologist's assessment (radiance, p<0.0001; texture, p<0.0001; and overall appearance, p<0.0001) as well as by self-assessments by participants (radiance, p<0.05 and firmness, p<0.05) following short-term, 8 weeks, oral supplementation were observed (Table 3). These data further support that it was the full blend of ingredients acting synergistically that led to improvements in facial skin attributes and characteristics, rather than one or two ingredients conferring these benefits.

In summary, this study used skin as a model to evaluate the effect of the supplement on ADMs that are believed to be influenced by CR and demonstrated that the novel nutritional and phytonutrient blend provided several cellular protection, inflammatory balance and skin specific benefits in a relatively short period of supplementation, 8 weeks. The novel nutritional and phytonutrient blend provided protection against UVR-induced cell injury (erythema), cell death (apoptosis), antioxidant protection (skin carotenoids), and influenced inflammation within and outside the area of UVR-exposure (erythema). Other improvements in several facial skin characteristics as assessed by dermatologist and participants' self-assessment and facial skin attributes were observed and are the outcomes from influences of the novel nutritional and phytonutrient blend on ADMs. Thus, this novel nutritional and phytonutrient blend conferred youth preservation benefits by bolstering ADMs in a manner similar to CR, protecting against UVR-induced cellular damage and death while at the same time, restoring a more youthful facial appearance, a benefit not observed with CR.

Example 3—Mimicking Caloric Restriction Gene Expression Profile in Skeletal Muscle Tissue Four groups of B6C3F1 strain male mice; N=7 per group, were studied as follows: Young Controls (Y) were fed AIN93 diet from 2-5 months of age, Old Controls (C) were fed AIN93 diet from 2-30 months of age, Calorie Restriction Group (CR) were fed AIN93 diet from 2-12 months of age and then fed a modified version of AIN93 diet with 25% energy restriction from 12-30 months of age, and the Old Supplemented Group (AL) were fed AIN93 diet from 2-12 months of age, then fed AIN93 diet plus a blend of natural ingredients from 12-30 months of age.

The blend of natural ingredients included EPA+DHA ultra-pure fish oil concentrate, resveratrol (from *Polygonum cuspidatum* root), quercetin (from *Dimorphandra mollis* fruit extract), purple corn (*Zea mays* L.) cob extract, rosemary (*Rosmarinus officinalis* L.) leaf extract, citrus bioflavonoids (naringin and hesperidin), coenzyme $Q_{10}$, alpha lipoic acid, astaxanthin (a carotenoid from *Haematococcus pluvialis* algae), lycopene (a carotenoid), lutein (a carotenoid from Marigold flower (*Targetes erecta*)), vitamin $D_3$ (as cholecalciferol), vitamin $K_2$ (as menaquinone-7), and d-limonene (from *Citrus sinensis* peel oil).

Total RNA from muscle tissue was extracted using Trizol; the quality and integrity of total RNA was assessed by using the Bioanalyzer 2100 (Agilent Technologies, Inc., Santa Clara, CA); all samples had an RNA integrity number (RIN) >6. The GeneChip Mouse Gene 2.0 ST Array containing over 698,000 total probes constituting over 33,000 gene-level probe sets (>26,500 RefSeq genes)(Affymetrix, Santa Clara, CA, USA) was used for microarray analysis; one array per mouse per group for a total of 28 gene arrays. GeneChip® Command Console@Software (AGCC) supplied by Affymetrix was used to perform GE analysis.

Initially, raw microarray data files (.CEL) were analyzed using software Partek Genomics Suite 6.6 to identify differentially modified genes with age and/or intervention. CEL data files were then analyzed using Pathway Studio v10 Software to identity biological processes and gene ontology pathways modulated by aging and/or the interventions. The Sub-Network Enrichment Analysis (SNEA) algorithm was used to identify the most significant set of entities (sub-networks) implicated by the data. A value of p<0.05 was regarded as statistically significant.

Figure 3:
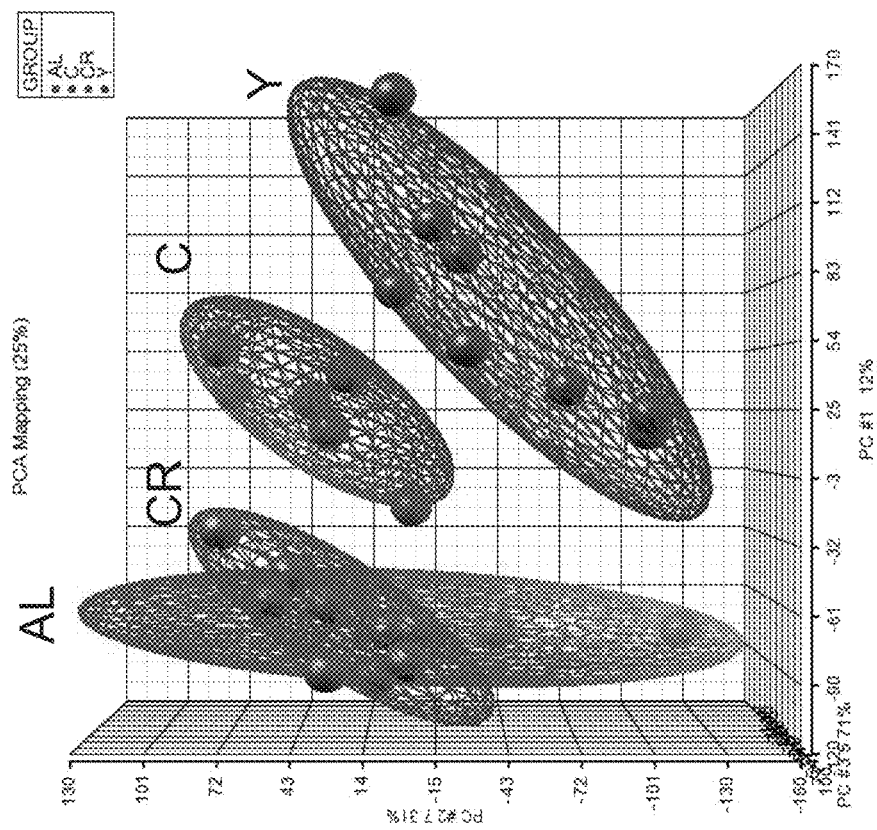
FIG. 3 illustrates an unsupervised PC4 (four component) Principal Component Analysis (PCA) of microarray data from muscle tissue for young control (Y), old control (C), calorically restricted (CR), and supplemented (AL) groups.

Global RNA expression levels of the >26,500 genes included in the array were profiled in muscle tissue from all four groups. Unsupervised PC4 (four component) Principal Component Analysis (PCA) of the microarray data are illustrated in FIG. 3 and show that Y (purple) and C (blue) groups displayed divergent trends in expression distributions, indicating an altered genetic expression (GE) profile with age. The CR (green) and AL (red) groups exhibited similar expression patterns to one another and a divergent pattern from C and Y, suggesting that CR and the nutrient blend produced similar, anti-aging GE profiles.

Figure 4:
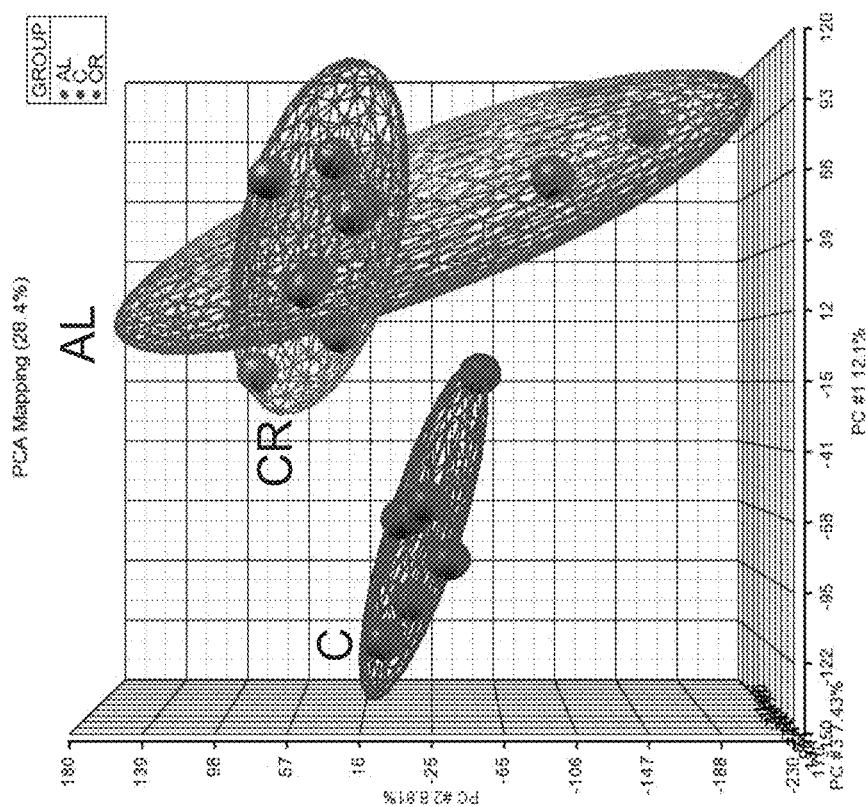
FIG. 4 illustrates an unsupervised PC3 (three component) PCA of microarray data from muscle tissue for C, CR, and AL groups.

Due to the complexity of making comparisons to two control groups (young and old), a second round of analysis was performed to compare the intervention groups to only the C group. In order to investigate specific age-related changes in GE, a simplified analysis using an unsupervised PC3 (three component) PCA of the microarray data was used. These results are illustrated in FIG. 4. As previously discussed, the CR (green) and AL (red) groups exhibited similar expression patterns to one another and a divergent pattern from C (blue) indicating that CR and the nutrient blend exhibited similar, anti-aging GE profiles.

Figure 5:
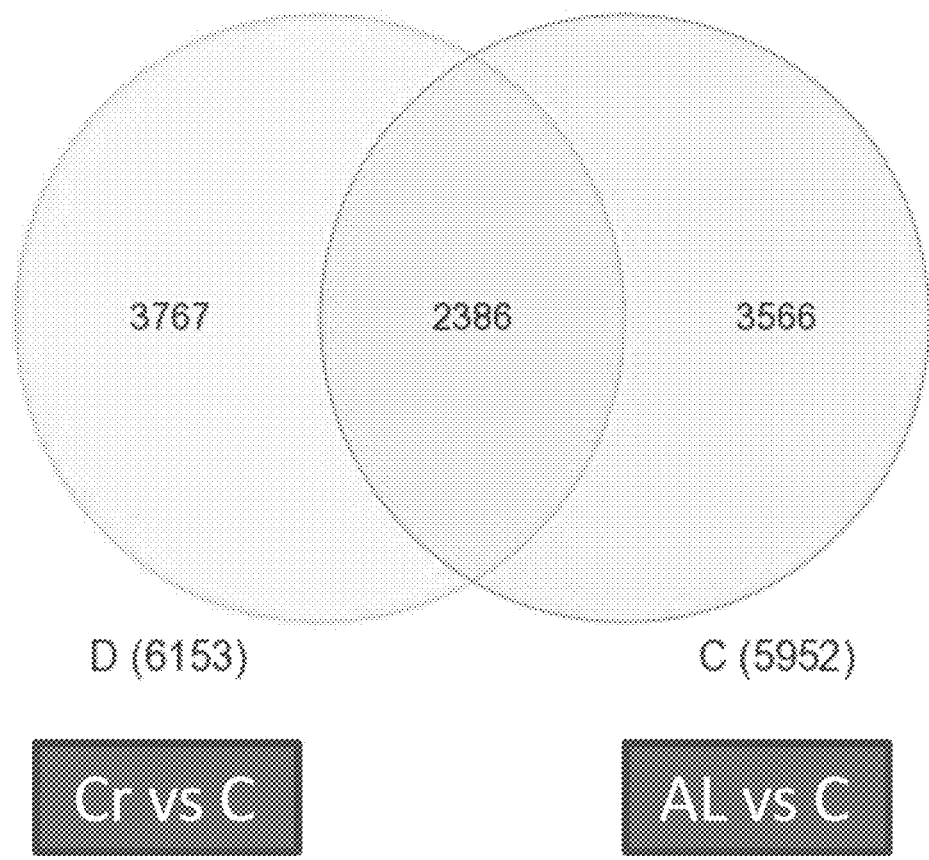
FIG. 5 depicts a Venn diagram of a differential analysis comparing AL versus C and CR versus C microarray data in muscle tissue.

FIG. 5 illustrates a differential analysis comparing the expression of the CR and AL groups to the C group, which revealed substantial differences in GE between the intervention groups and C group. Using differential analysis, 2386 genes commonly expressed in CR and AL groups as compared to the C group were identified. The majority of genes up-regulated by CR were also up-regulated by AL and vice versa. This is a major finding of the study: thousands of genes were similarly expressed in CR and with the nutrient blend compared to the old controls, indicating that in muscle tissue, the nutrient blend did mimic CR GE to a striking degree.

Figure 6:
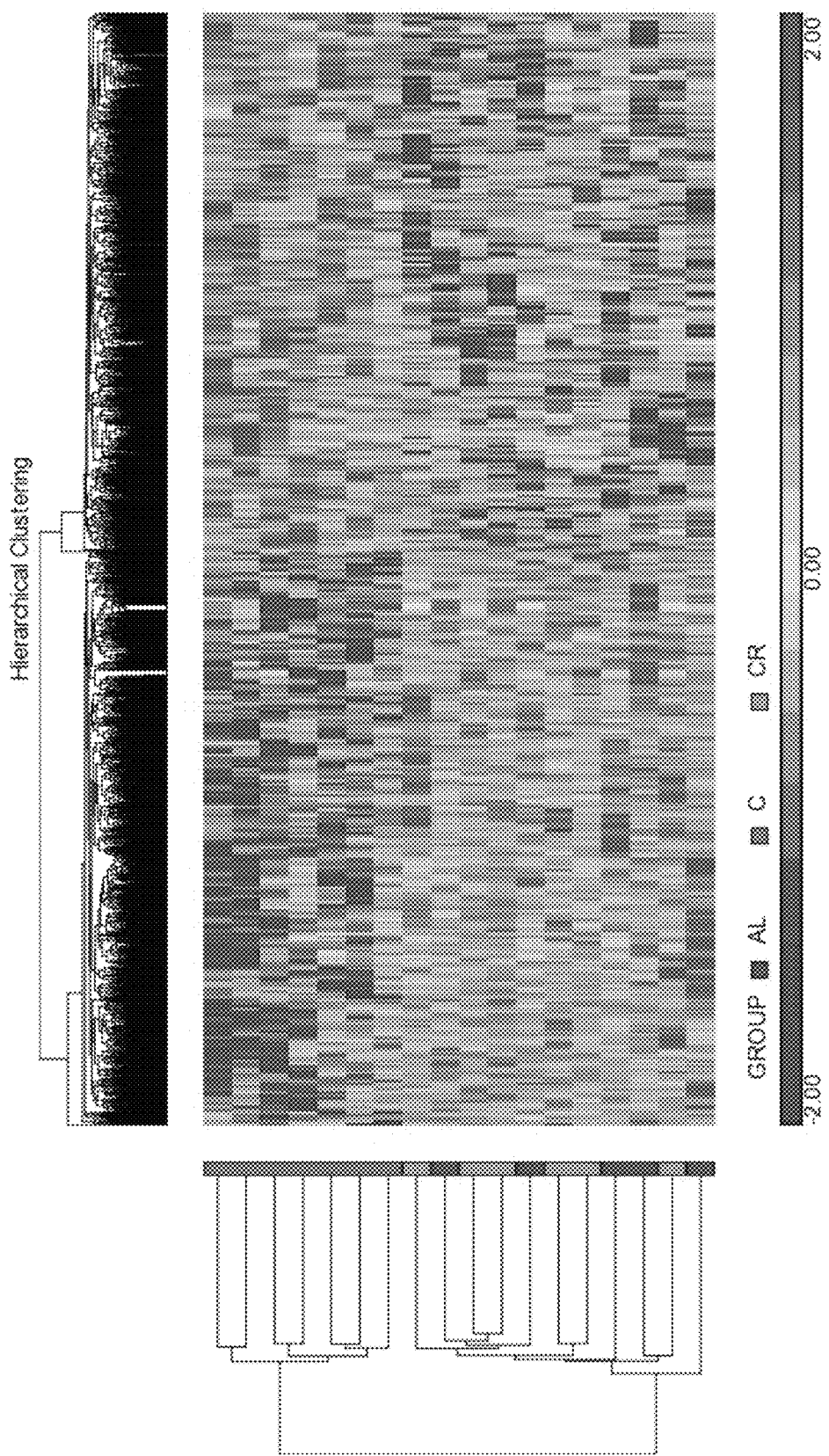
FIG. 6 illustrates a Hierarchical Clustering Analysis (HCA) of the 2386 genes commonly expressed in muscle tissue in CR and AL groups, compared to the C group.

This correlation is further illustrated in FIG. 6, which illustrates a hierarchical clustering analysis (HCA) of the 2386 genes identified above. This HCA clearly demonstrates that the patterns of global GE were distinct between C (green) and the two intervention groups. All of the individual AL (red) and CR (orange) animals clustered together, with a clear distinction from the C animals. The heat map indicates that the genes are not only grouped together in a similar fashion in both diets, but also that they change in a parallel way. It is noted that each row in the heat map represents GE data for an individual mouse and each column represents and individual gene. C (green), AL (red) and CR (orange).

Figure 7:
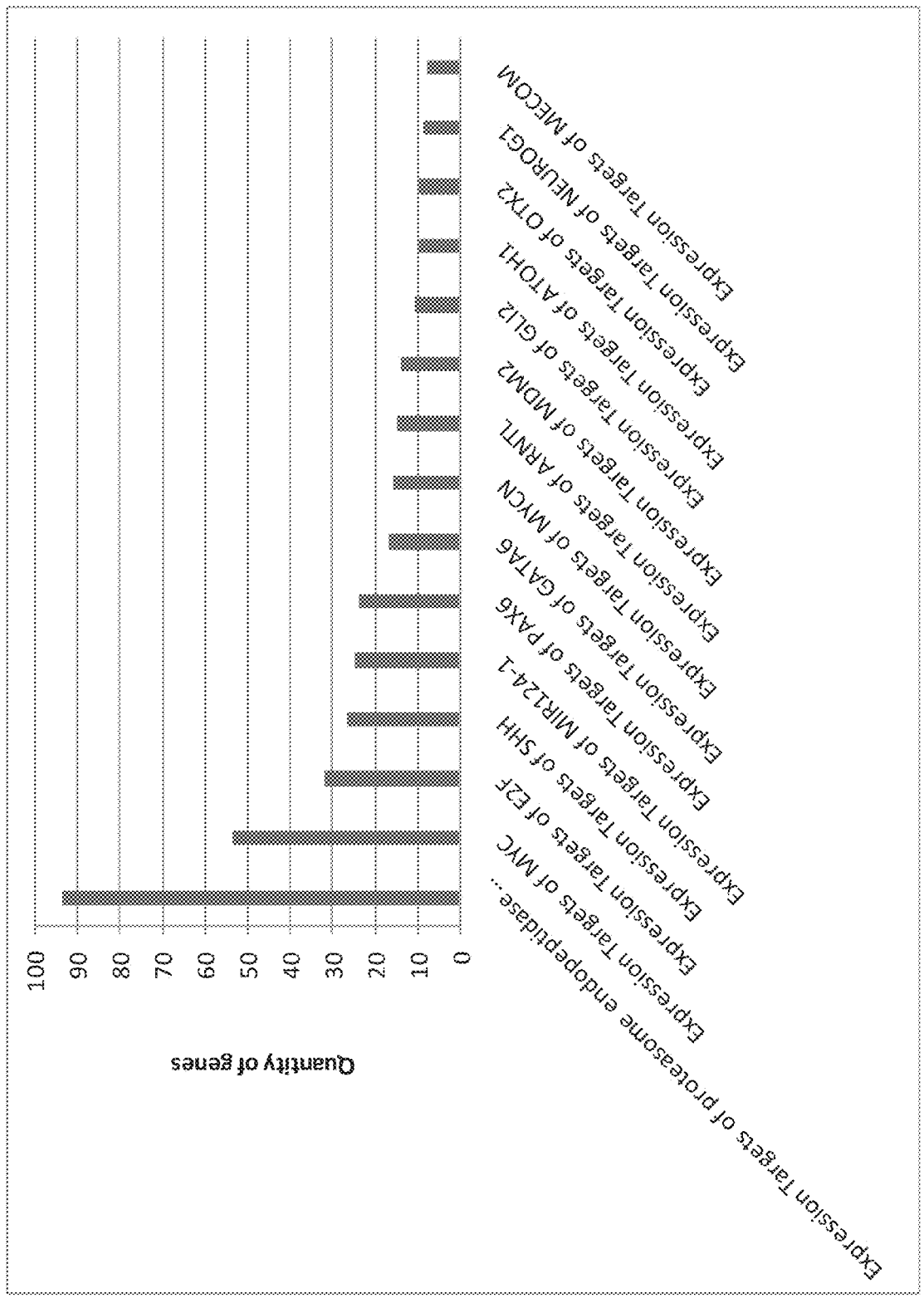
FIG. 7 illustrates a sub-network analysis of microarray data from muscle tissue based on the number of genes in a sub-network that overlapped between CR and the AL groups.
Figure 8:
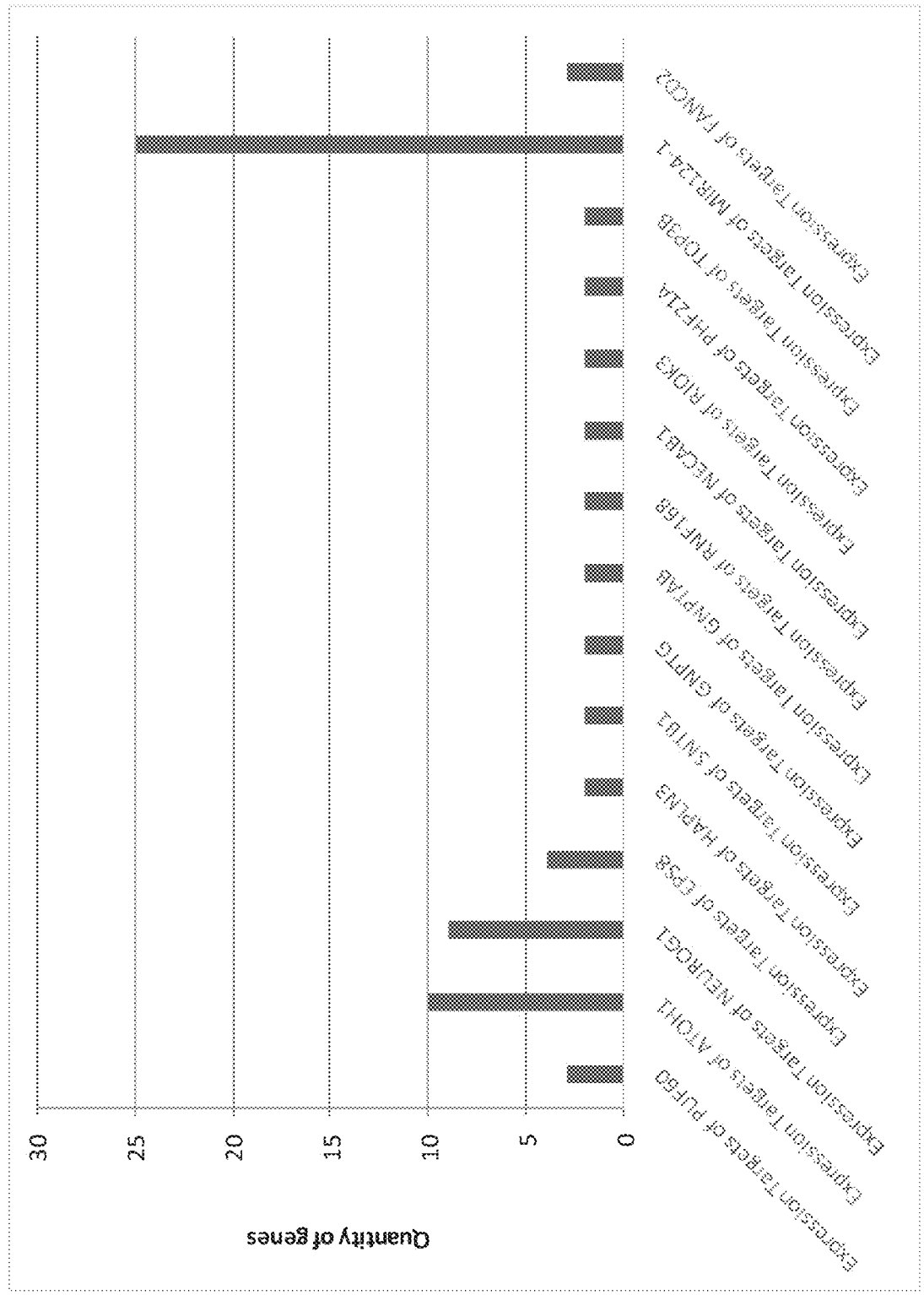
FIG. 8 illustrates a sub-network analysis of microarray data from muscle tissue based on the significance of the genes differentially expressed in the CR and AL groups (enriched p value ≤0.05).

FIGS. 7 and 8 illustrate a sub-network analysis of the data conducted in two different ways: 1) based on the number of genes in a sub-network that overlapped between CR and the AL groups (FIG. 7) and 2) based on the significance of the genes differentially expressed in the two groups (enriched p-value ≤0.05) (FIG. 8). Several sub-networks were identified as similarly influenced by the interventions.

Figure 9B:
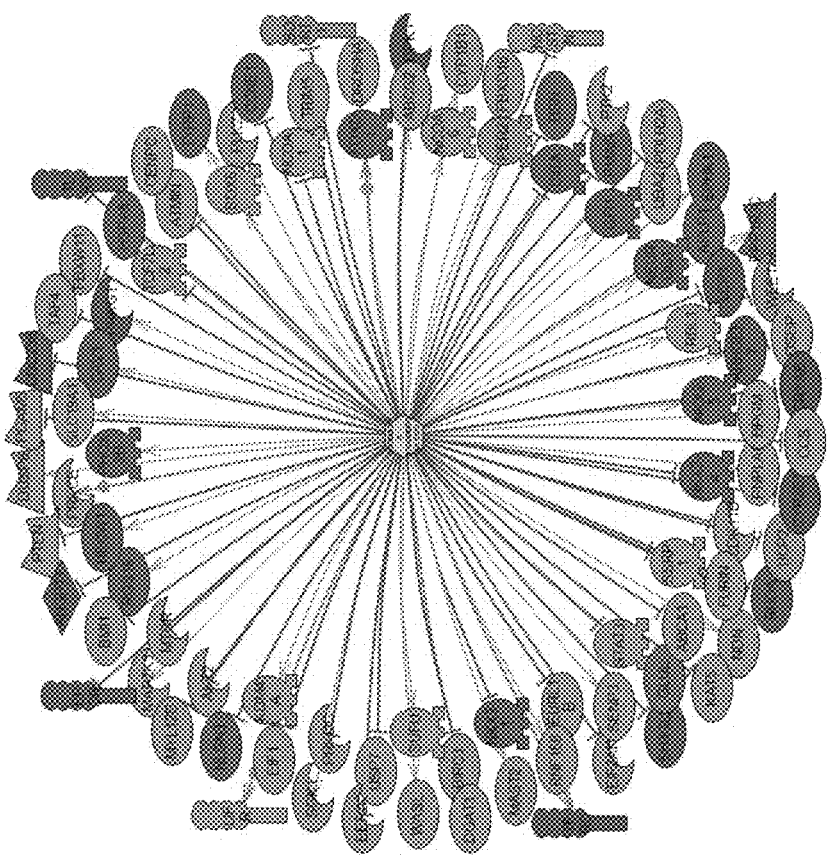
FIGS. 9A and 9B illustrate directional gene expression in the proteasome endopeptidase complex sub-network of genes in muscle tissue for both CR vs C and AL vs C groups, respectively.
Figure 9A:
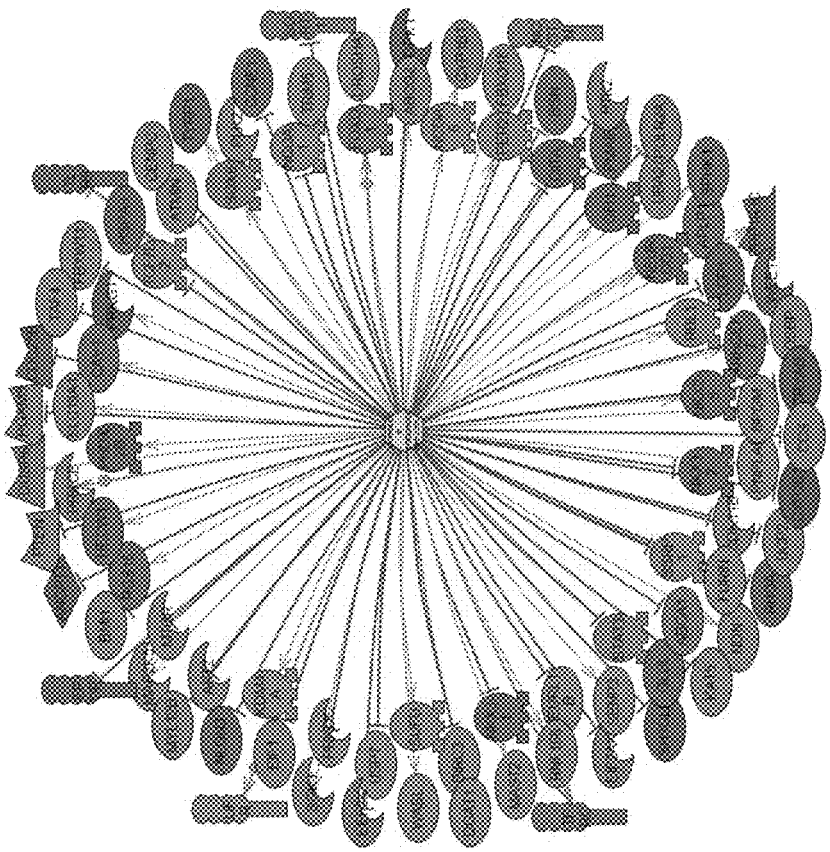

A further analysis of one representative sub-network, the proteasome endopeptidase complex sub-network, is illustrated in FIGS. 9A (CR vs C) and 9B (AL vs C). With very few exceptions, both CR and the nutrient blend led to parallel patterns of GE within this sub-network. During normal aging, a progressive loss of muscle mass, known as sarcopenia, occurs in both human and rodents. Sarcopenia can be attributable to an imbalance between protein synthesis and degradation or between apoptosis and regeneration processes, but usually both. The Proteasome endopeptidase complex, also known as the ubiquitin proteasome system (UPS), is a large ATP-dependent 700-kDa multi-subunit enzyme complex that can play an important role in the degradation of most of the cytosolic and nuclear proteins in eukaryotic cells. The multicatalytic endopeptidase complex, either by itself or as the catalytic core of the 26S proteinase complex, can play an important role in ubiquitin-dependent and ubiquitin independent nonlysosomal pathways of protein turnover, including the degradation of regulatory proteins. Furthermore, it is fundamental to the function of skeletal muscle cellular processes, including cell-cycle progression, stress response, and cell differentiation, degradation of damaged proteins and the recruitment of repair factors to DNA damage sites. With normal aging, factors such as increased oxidative stress, mitochondrial dysfunction, and dysregulation of apoptosis can lead to alterations in proteolysis, contributing to the development of sarcopenia. Examples of age-dependent alterations in muscle proteolysis can include a lack of responsiveness of the ubiquitin-proteasome-dependent proteolytic pathway to anabolic and catabolic stimuli and alterations in the regulation of autophagy and apoptosis. In addition, increased oxidative stress can lead to the accumulation of damaged proteins, which, if not properly eliminated, aggregate, and in turn can impair proteolytic activities and damage cell structures. Finally, the mitochondria-associated apoptotic pathway can be activated. These age-induced changes can contribute to sarcopenia and decreased ability of old individuals to recover from stress. CR has been demonstrated in non-human primates to delay and/or attenuate sarcopenia, most likely via the optimization of the function of the proteasome endopeptidase pathway. The fact that the supplement modulated expression of the proteasome endopeptidase subnetwork in a manner similar to that of CR suggests that the supplement elicits gene expression that would oppose sarcopenia, mimicking CR.

Figure 10:
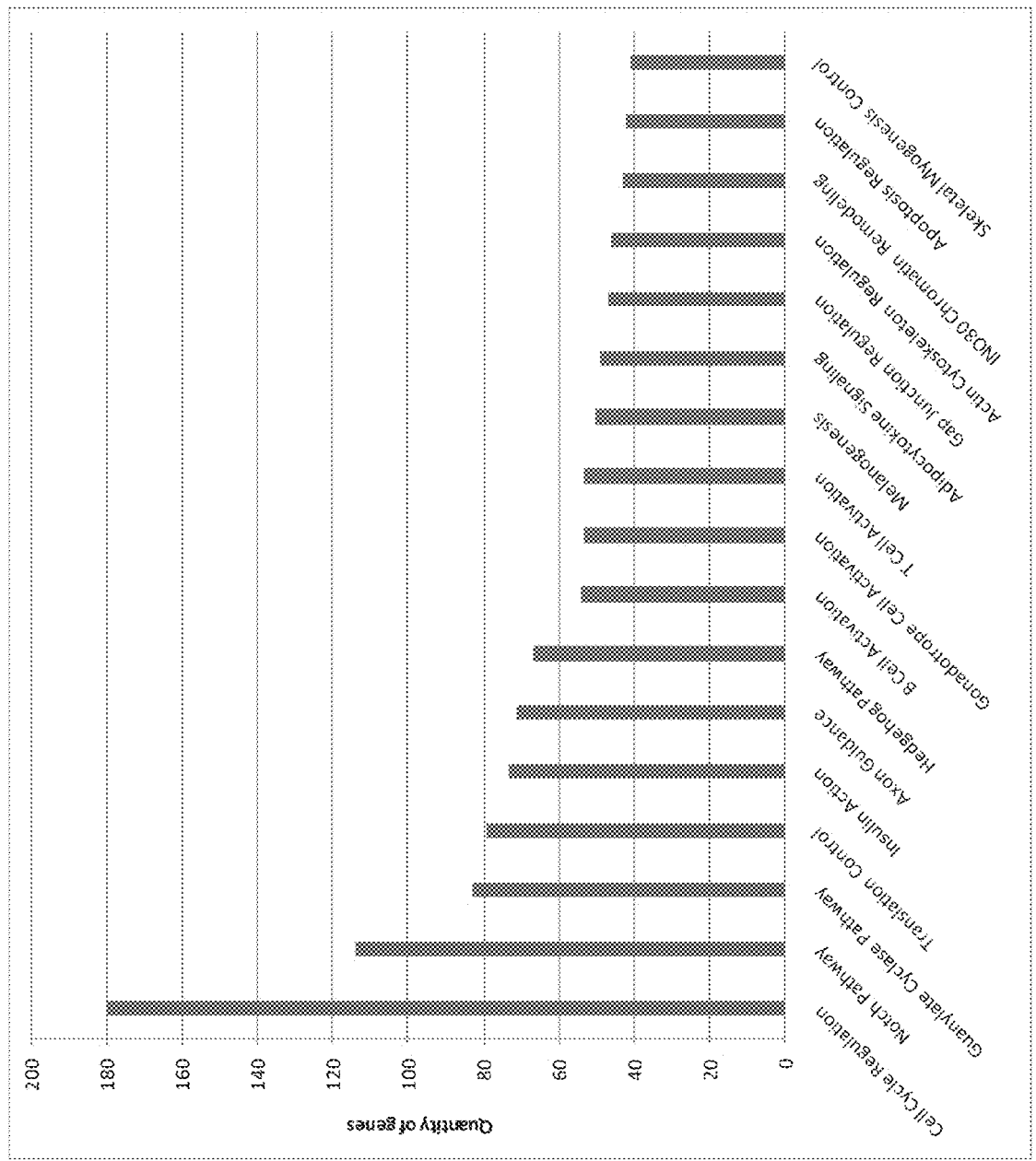
FIG. 10 illustrates a gene ontology pathway analysis of microarray data from muscle tissue based on the number of genes in a gene ontology pathway that overlap between the CR and AL groups.
Figure 11:
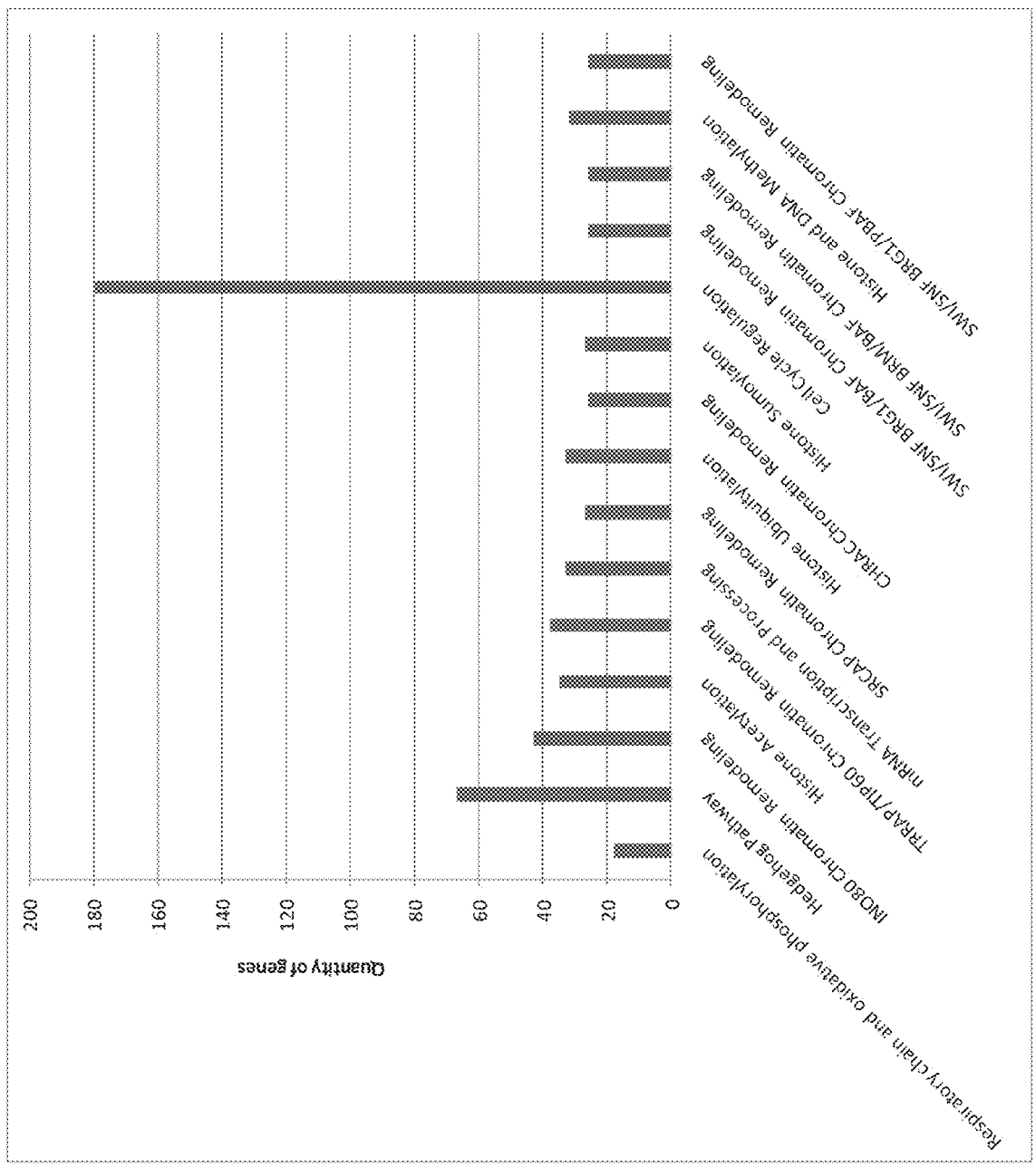
FIG. 11 illustrates a gene ontology pathway analysis of microarray data from muscle tissue based on the significance of the genes differentially expressed in the CR and AL groups (enriched p value ≤0.05).

The transcriptomic data was further analyzed in order to identify gene ontology pathways influenced by the interventions. This data is illustrated in FIGS. 10 and 11. This particular analysis of the data was also conducted in two ways: 1) based on the number of genes in a gene ontology pathway that overlap between CR and the AL groups (FIG. 10) and 2) based on the significance of the genes differentially expressed in the two groups (enriched p-value ≤0.05) (FIG. 11). Several pathways similarly influenced by the interventions were identified, including those involved in neural cell signaling and metabolic reprogramming, a hallmark of CR.

The Respiratory Chain and Oxidative Phosphorylation Gene Ontology Pathway is illustrated as a representative pathway that was further investigated. As can be seen in FIGS. 12A (CR vs C) and 12B (AL vs C), this pathway was similarly regulated by both CR and AL groups compared to the C group. This indicates that the respiratory chain is an important pathway that was modulated by both calorie restriction and by the nutrient blend. These findings provide evidence that the nutrient blend leads to GE characteristic of metabolic reprogramming similar to that brought about by CR. Red generally represents up-regulation, blue generally represents down-regulation, and grey indicates that the gene was not included in our differential analysis as it was not changed with age.

Figure 13:
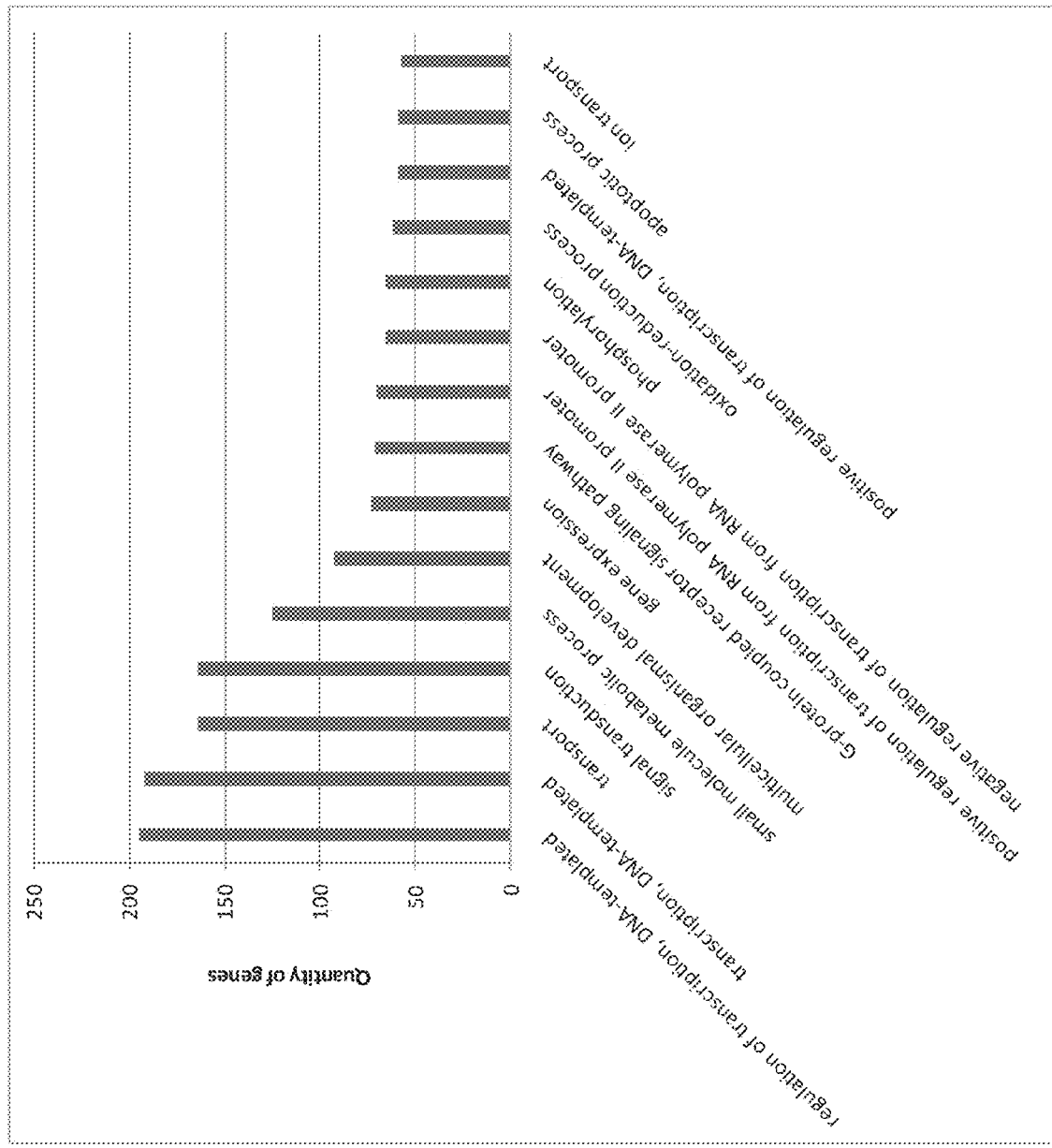
FIG. 13 illustrates a biological processes pathway analysis for muscle tissue based on the number of genes in a pathway that overlap between the CR and AL groups.
Figure 14:
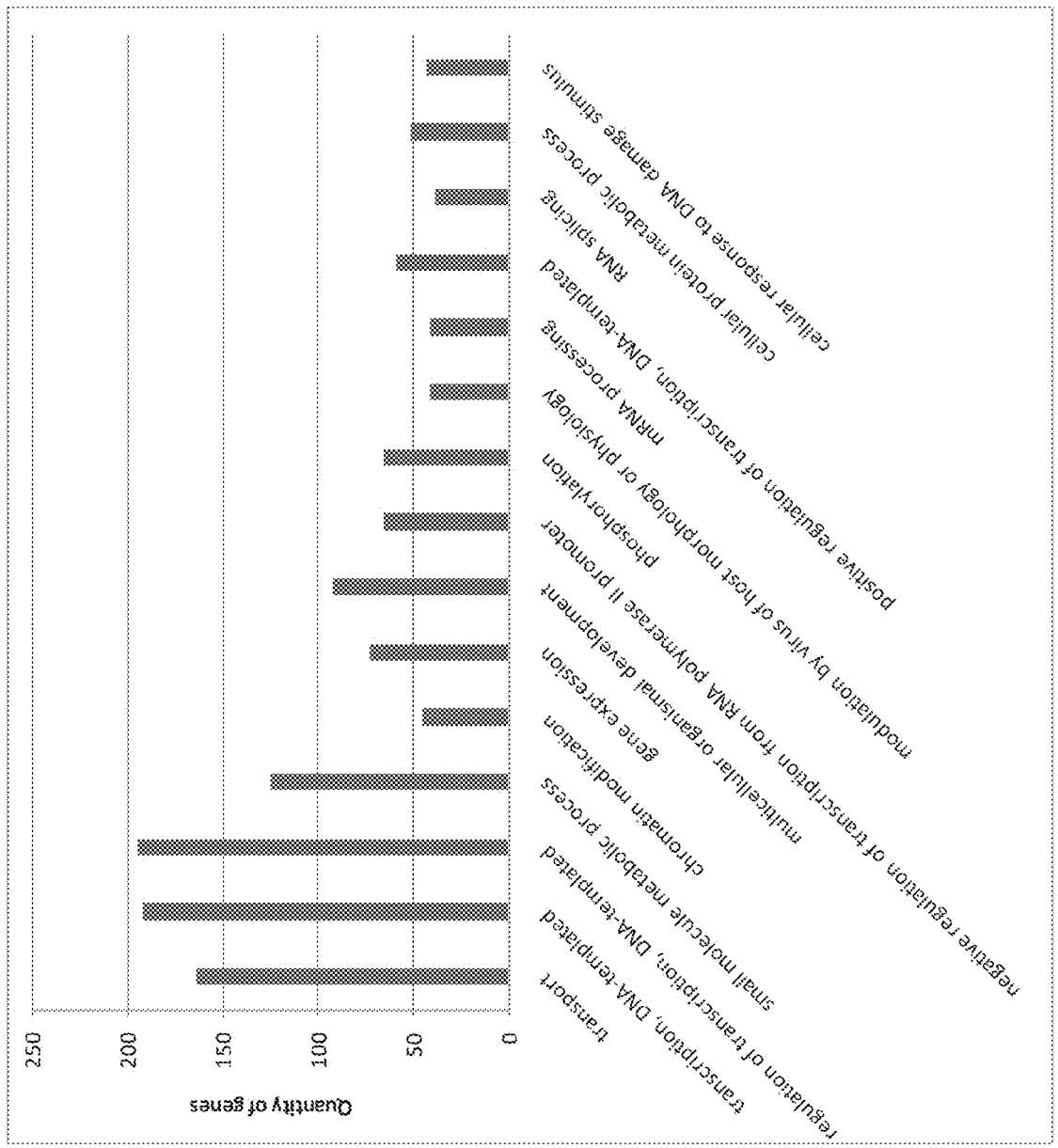
FIG. 14 illustrates a biological processes pathway analysis for muscle tissue based on the significance of the genes differentially expressed in the CR and AL groups (enriched p value ≤0.05).

A biological processes pathway analysis revealed that CR and the nutrient blend similarly modulated a number of biological processes pathways compared to the OC group. Analysis of the data was conducted in two ways: 1) based on the number of genes in a pathway that overlap between CR and the AL groups (FIG. 13) and 2) based on the significance of the genes differentially expressed in the two groups (enriched p value ≤0.05) (FIG. 14). Pathways involved in signal transduction processes, regulation of transcription and cell cycle regulation, as well as those related to metabolic reprogramming, were similarly influenced by the interventions.

In summary, these data provide support for a number of conclusions. For example, one major finding of the study was that both CR and the nutrient blend modulated global patterns of GE toward a more youthful profile, indicating that the nutrient blend did, in fact, mimic CR GE to a striking degree in muscle tissue. A second major finding of the study was that both CR and the nutrient blend modified the expression of thousands of genes closely in parallel.

Additionally, one of the reasons that skeletal muscle was selected for investigation is because it is a tissue that is negatively influenced by aging, but positively affected by CR. The fact that the regulation of genes was in the same direction with CR as with the nutrient blend indicates that the mechanisms are in common, offering additional evidence that the nutrient blend mimicked CR in skeletal muscle and that the nutrient blend modulated sub-networks, gene ontology pathways, and biological pathways in a manner similar to CR in skeletal muscle.

Example 4—Mimicking Caloric Restriction Gene Expression Profile in Brain Tissue

Four groups of B6C3F1 strain male mice; N=7 per group, were studied as follows: Young Controls (Y) were fed AIN93 diet from 2-5 months of age, Old Controls (C) were fed AIN93 diet from 2-30 months of age, Calorie Restriction Group (CR) were fed AIN93 diet from 2-12 months of age and then fed a modified version of AIN93 diet with 25% energy restriction from 12-30 months of age, and the Old Supplemented Group (AL) were fed AIN93 diet from 2-12 months of age, then fed AIN93 diet plus a blend of natural ingredients from 12-30 months of age.

The blend of natural ingredients included EPA+DHA ultra-pure fish oil concentrate, resveratrol (from *Polygonum cuspidatum* root), quercetin (from *Dimorphandra mollis* fruit extract), purple corn (*Zea mays* L.) cob extract, rosemary (*Rosmarinus officinalis* L.) leaf extract, citrus bioflavonoids (naringin and hesperidin), coenzyme $Q_{10}$, alpha lipoic acid, astaxanthin (a carotenoid from *Haematococcus pluvialis* algae), lycopene (a carotenoid), lutein (a carotenoid from Marigold flower (*Targetes erecta*)), vitamin $D_3$ (as cholecalciferol), vitamin $K_2$ (as menaquinone-7), and d-limonene (from *Citrus sinensis* peel oil).

Total RNA from cerebral cortex was extracted using Trizol; the quality and integrity of total RNA was assessed by using the Bioanalyzer 2100 (Agilent Technologies, Inc., Santa Clara, CA); all samples had an RNA integrity number (RIN) >6. The GeneChip Mouse Gene 2.0 ST Array containing over 698,000 total probes constituting over 33,000 gene-level probe sets (>26,500 RefSeq genes)(Affymetrix, Santa Clara, CA, USA) was used for microarray analysis; one array per mouse per group for a total of 28 gene arrays. GeneChip® Command Console@Software (AGCC) supplied by Affymetrix was used to perform GE analysis.

Initially, raw microarray data files (.CEL) were analyzed using software Partek Genomics Suite 6.6 to identify differentially modified genes with age and/or intervention. CEL data files were then analyzed using Pathway Studio v10 Software to identity biological processes and gene ontology pathways modulated by aging and/or the interventions. The Sub-Network Enrichment Analysis (SNEA) algorithm was used to identify the most significant set of entities (sub-networks) implicated by the data. A value of p<0.05 was regarded as statistically significant.

Figure 15:
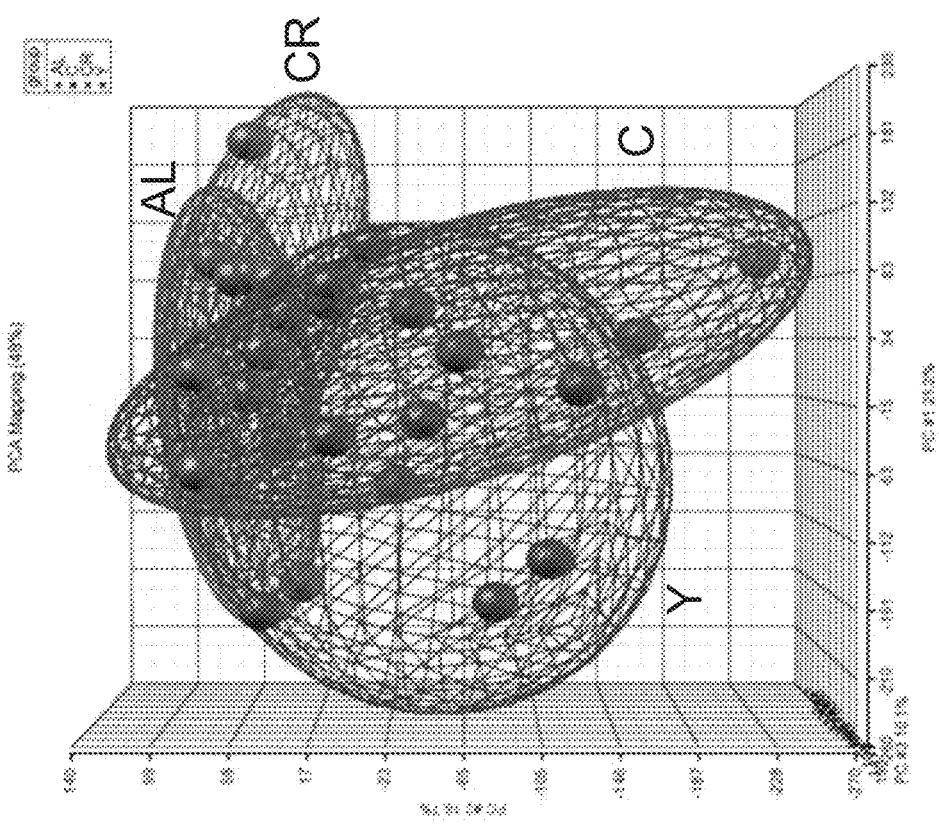
FIG. 15 illustrates an unsupervised PC4 (four component) Principal Component Analysis (PCA) of microarray data from brain tissue for young control (Y), old control (C), calorically restricted (CR), and supplemented (AL) groups.

Global RNA expression levels of the >26,500 genes included in the array were profiled in cerebral cortex tissue from all four groups. Unsupervised PC4 (four component) Principal Component Analysis (PCA) of the microarray data are illustrated in FIG. 15 and show that Y (purple) and C (blue) groups displayed divergent trends in expression distributions, indicating an altered genetic expression (GE) profile with age. The CR (green) and AL (red) groups exhibited similar expression patterns to one another and a divergent pattern from C that was more similar, though not identical to, the Y group, suggesting that CR and the nutrient blend produced similar, anti-aging GE profiles.

Figure 16:
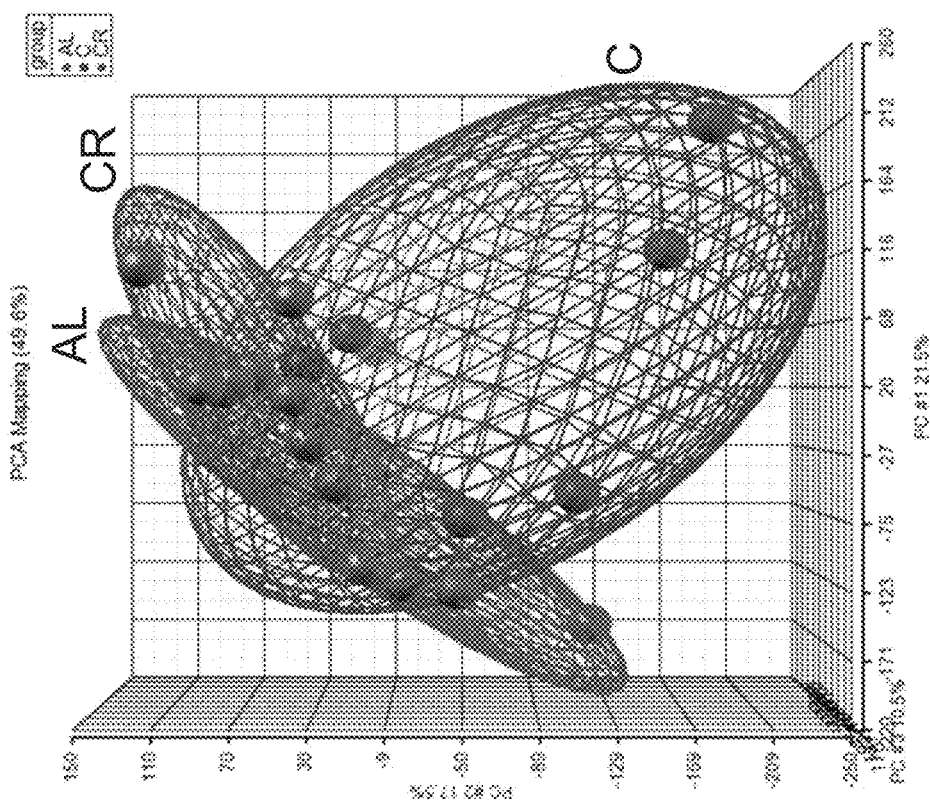
FIG. 16 illustrates an unsupervised PC3 (three component) PCA of microarray data from brain tissue for C, CR, and AL groups.

In order to investigate specific age-related changes in GE, a simplified analysis using an unsupervised PC3 (three component) PCA of the microarray data was used. These results are illustrated in FIG. 16. As previously discussed, the CR (green) and AL (red) groups exhibited similar expression patterns to one another and a divergent pattern from C indicating that CR and the nutrient blend exhibited similar, anti-aging GE profiles.

Figure 18:
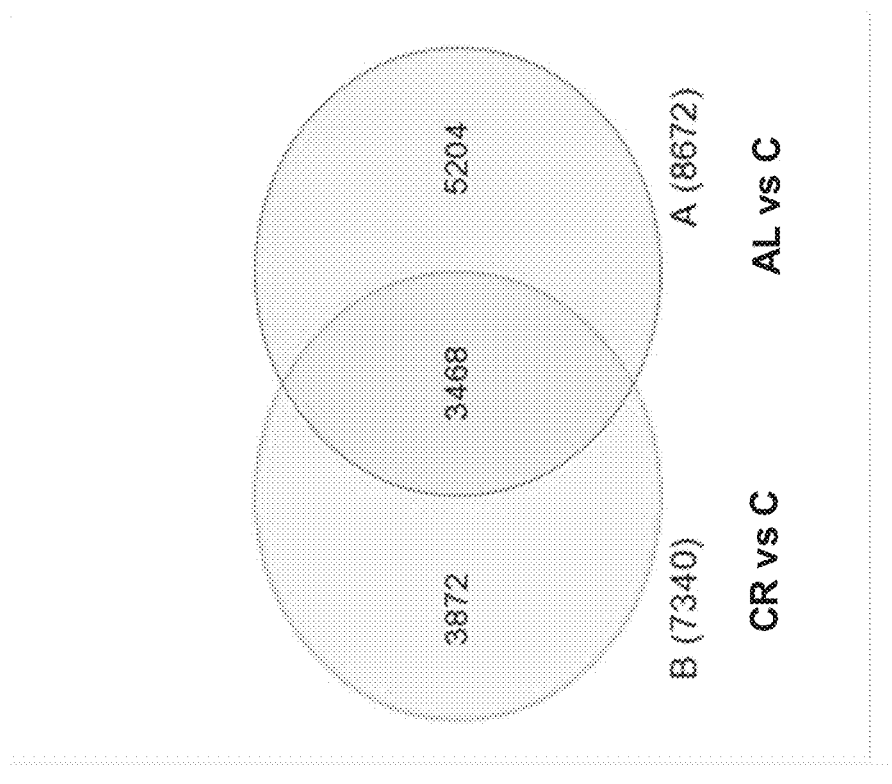
FIG. 18 depicts a Venn diagram of a differential analysis comparing AL versus C and CR versus C microarray data in brain tissue.
Figure 17:
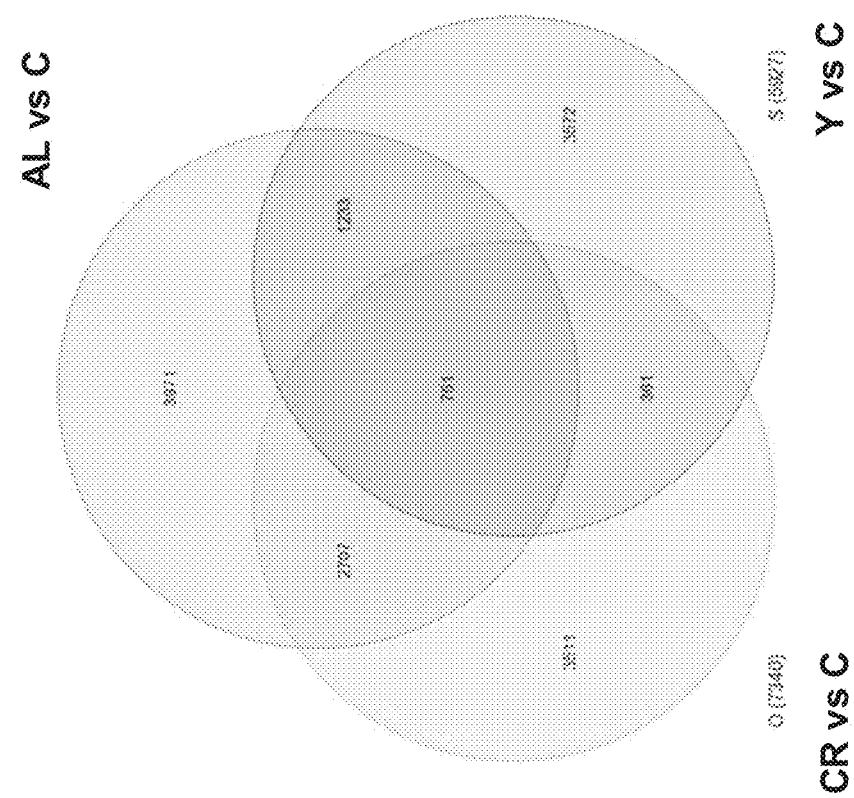
FIG. 17 depicts a Venn diagram of a differential analysis comparing AL versus C, Y vs C, and CR versus C microarray data in brain tissue.

FIG. 17 illustrates a differential analysis comparing the expression of the CR and AL groups to the C group, which revealed substantial differences in GE between the intervention groups and C group. However, due to the complexity of making comparisons to two control groups (young and old), a second round of analysis was performed to compare the intervention groups to only the C group. This data is represented in FIG. 18. Therefore, a differential analysis was performed comparing AL versus C and CR versus C. Using the differential analysis, 3,468 genes commonly expressed in CR and AL groups as compared to the C group were identified; 1,222 were up-regulated and 2,246 were down-regulated. The majority of genes up-regulated by CR were also up-regulated by AL and vice versa. This is a major finding of the study: thousands of genes were similarly expressed in CR and with the nutrient blend compared to the old controls, indicating that in cerebral cortex tissue, the nutrient blend did mimic CR GE to a striking degree.

Figure 19:
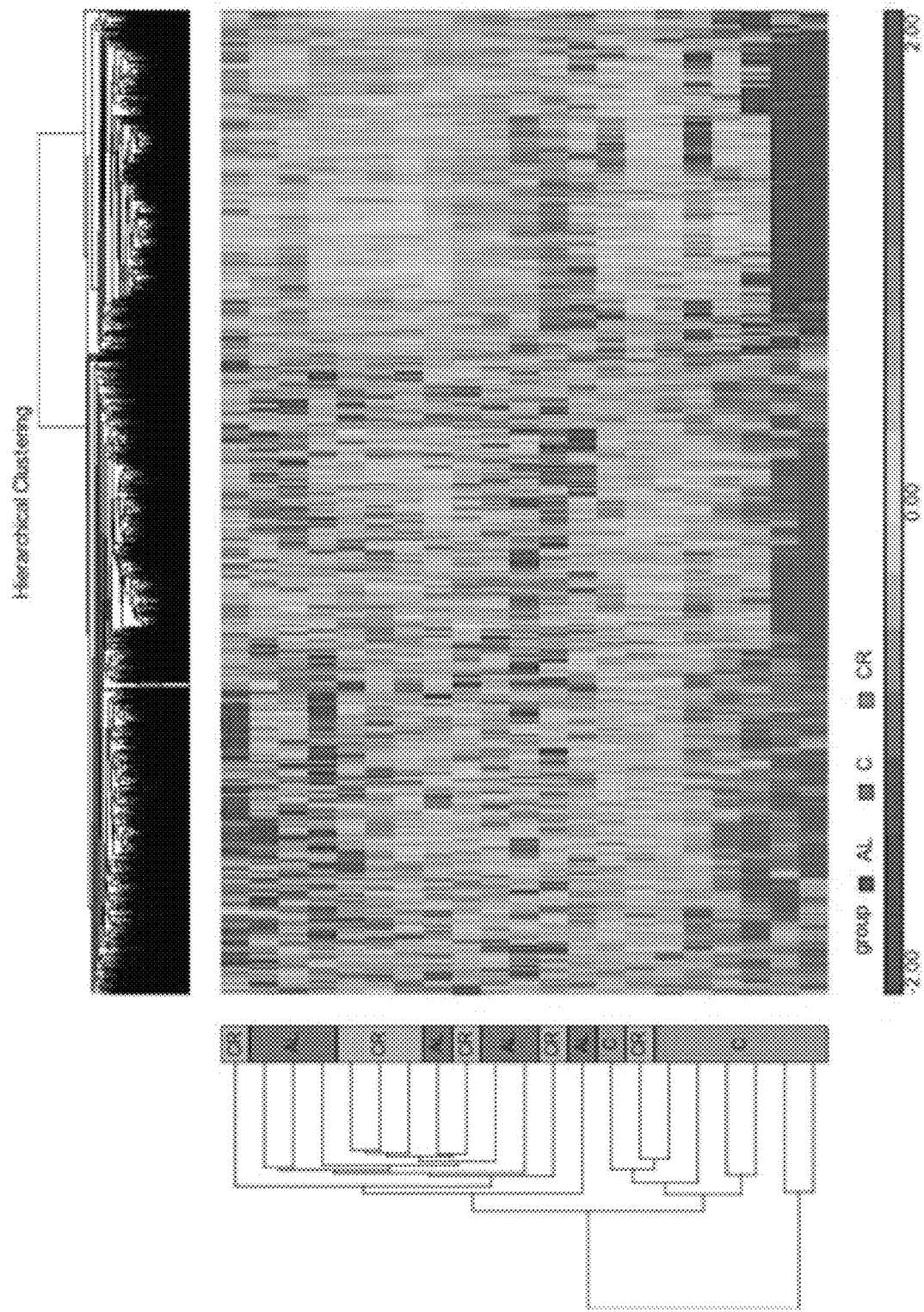
FIG. 19 illustrates a Hierarchical Clustering Analysis (HCA) of the 3468 genes commonly expressed in brain tissue in CR and AL groups, compared to the C group.

This correlation is further illustrated in FIG. 19, which illustrates a hierarchical clustering analysis (HCA) of the 3,468 genes identified above. This HCA clearly demonstrates that the patterns of global GE were distinct between C (green) and the two intervention groups. With only one exception in the CR group, all of the individual AL (red) and CR (orange) animals clustered together, with a clear distinction from the C animals. The heat map indicates that the genes are not only grouped together in a similar fashion in both diets, but also that they change in a parallel way. It is noted that each row in the heat map represents GE data for an individual mouse and each column represents and individual gene. C (green), AL (red) and CR (orange).

Figure 20:
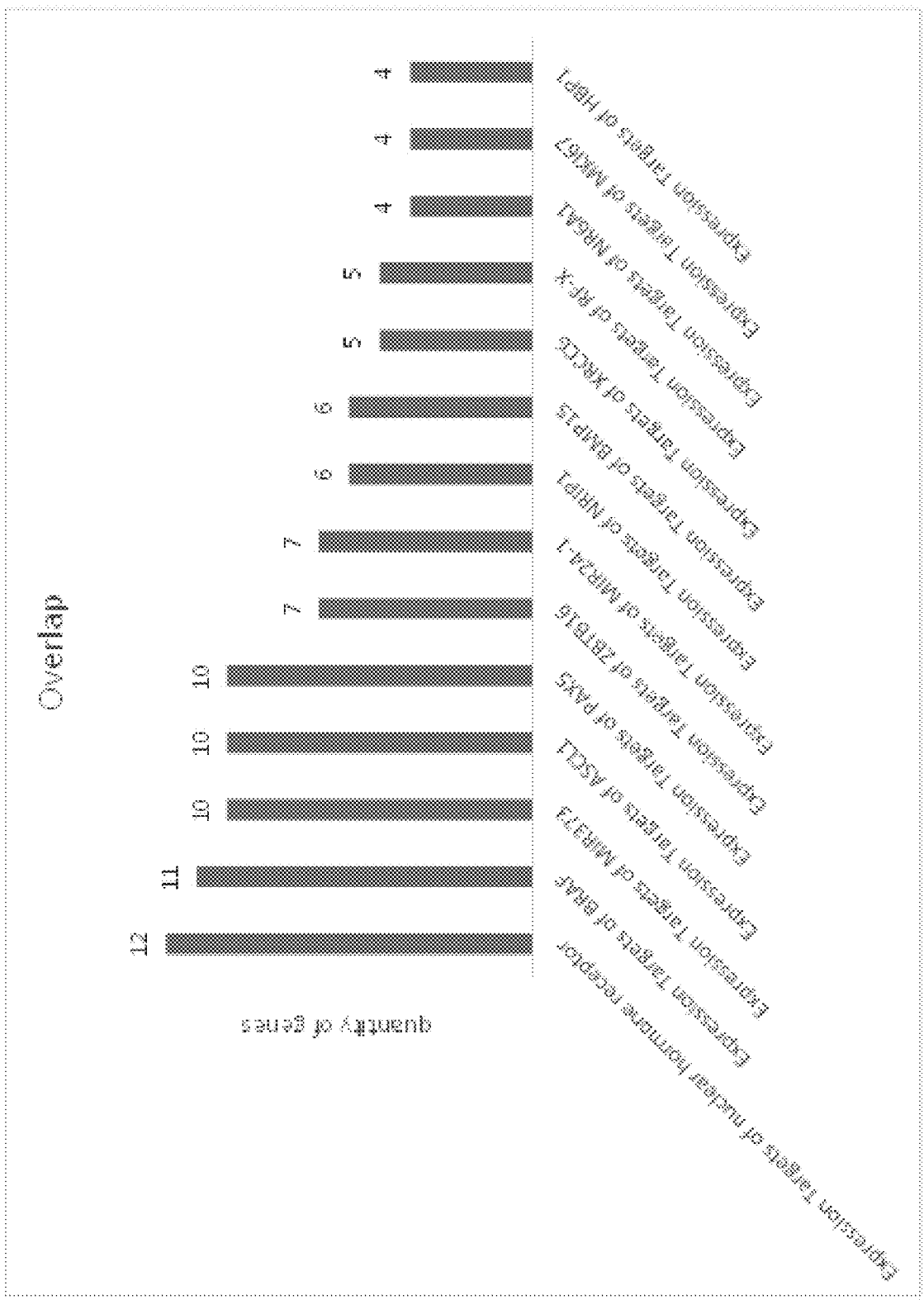
FIG. 20 illustrates a sub-network analysis of microarray data from brain tissue based on the number of genes in a sub-network that overlapped between CR and the AL groups.
Figure 21:
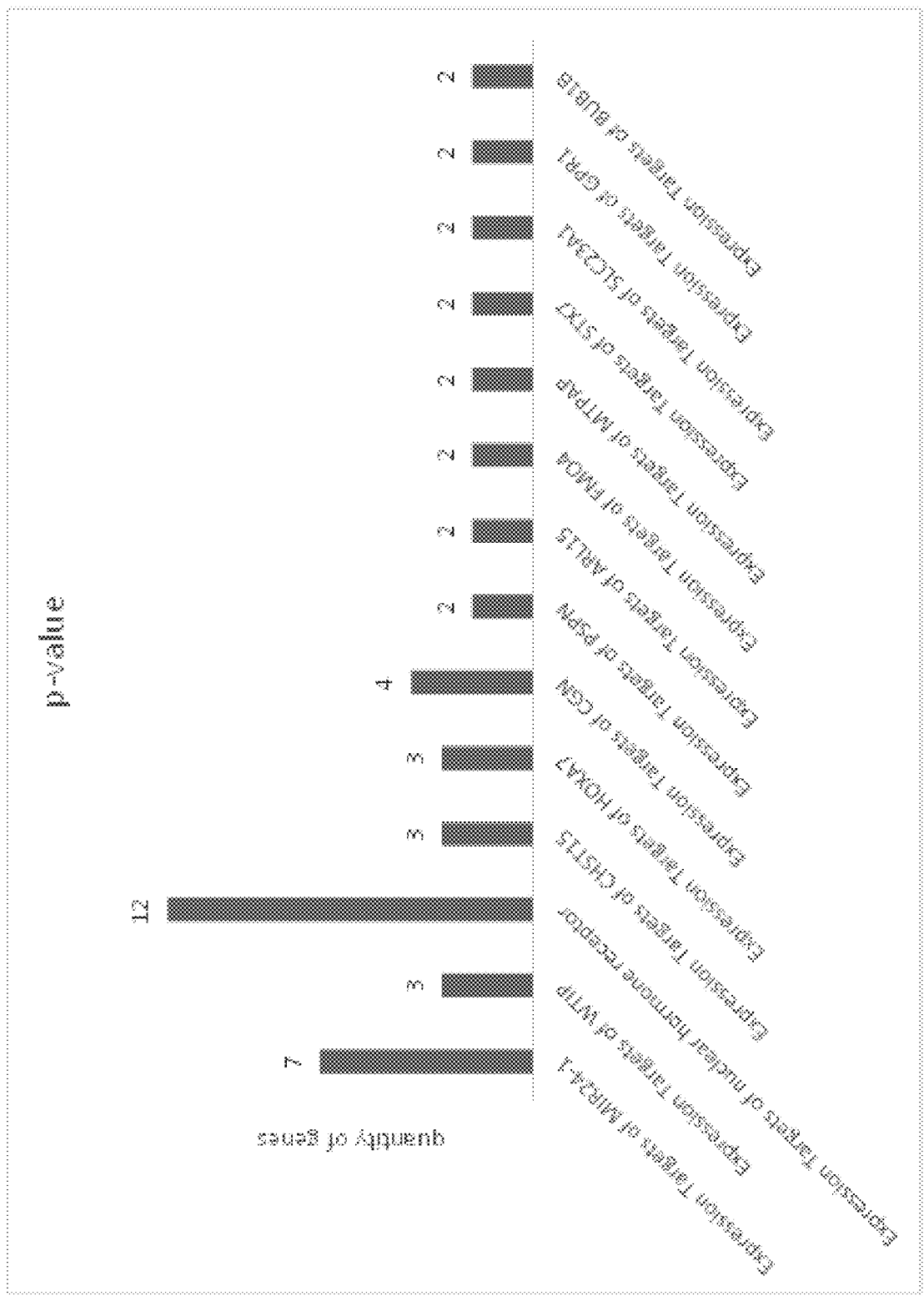
FIG. 21 illustrates a sub-network analysis of microarray data from brain tissue based on the significance of the genes differentially expressed in the CR and AL groups (enriched p-value ≤0.05).

FIGS. 20 and 21 illustrate a sub-network analysis of the data conducted in two different ways: 1) based on the number of genes in a sub-network that overlapped between CR and the AL groups (FIG. 20) and 2) based on the significance of the genes differentially expressed in the two groups (enriched p-value ≤0.05) (FIG. 21). Several sub-networks were identified as similarly influenced by the interventions. Three representative sub-networks were identified for further analysis: expression targets of the proto-oncogene B-Raf (BRAF), expression targets of nuclear hormone, and expression targets of the microRNA miR-24-1.

Figure 22A:
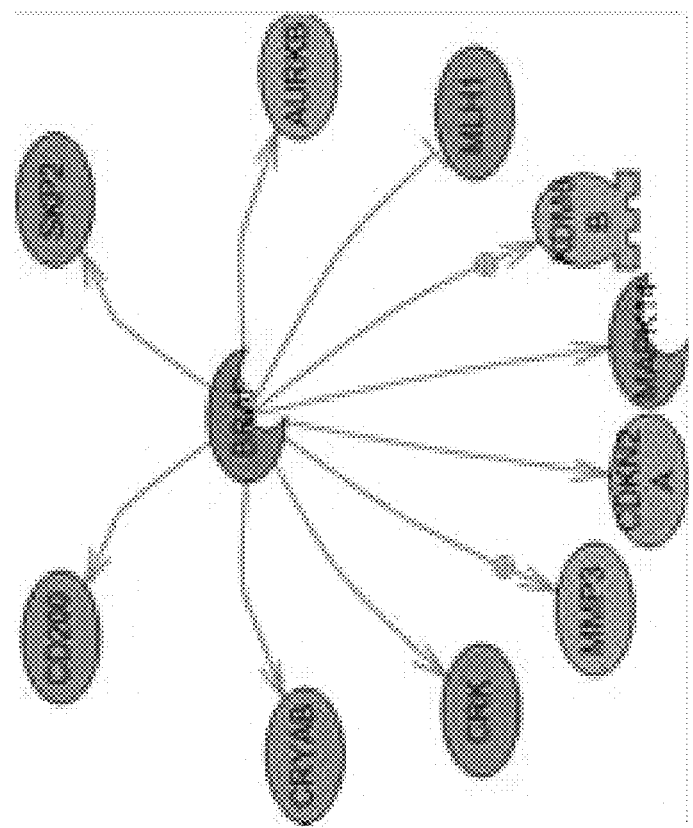
FIGS. 22A and 22B illustrate directional gene expression in the BRAF sub-network of genes in brain tissue for both CR vs C and AL vs C groups, respectively.
Figure 22B:
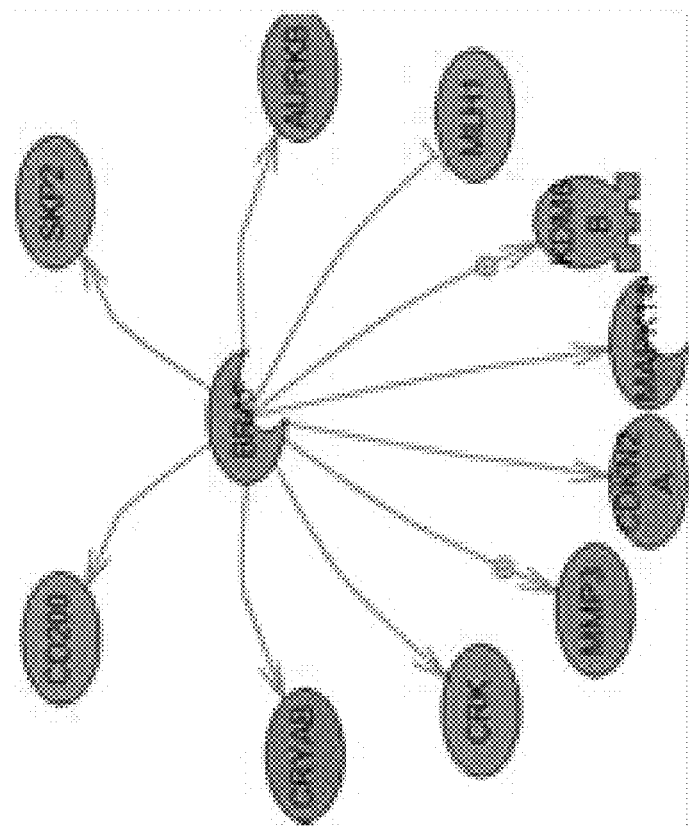

The B-raf proto-oncogene is highly expressed in the nervous system and exerts essential functions in the brain, is required for adult learning and memory, and is highly involved in processes such as long-term potentiation, spatial learning, contextual discrimination, and synaptic plasticity. This oncogene was down-regulated in C, but up-regulated by both AL and CR. Furthermore, as illustrated in FIGS. 22A (CR vs C) and 22B (AL vs C), the entire sub-network was differentially expressed between the C and intervention groups such that both CR and the nutrient blend brought about parallel patterns of expression of key genes within this sub-network. As one specific example, MAPK14, which is activated by Braf and is essential for oligodendrocyte differentiation and myelination, was up-regulated in both CR and AL. It is noted that red represents up-regulation, blue represents down-regulation, and grey indicates a functional class/superfamily.

Figure 23B:
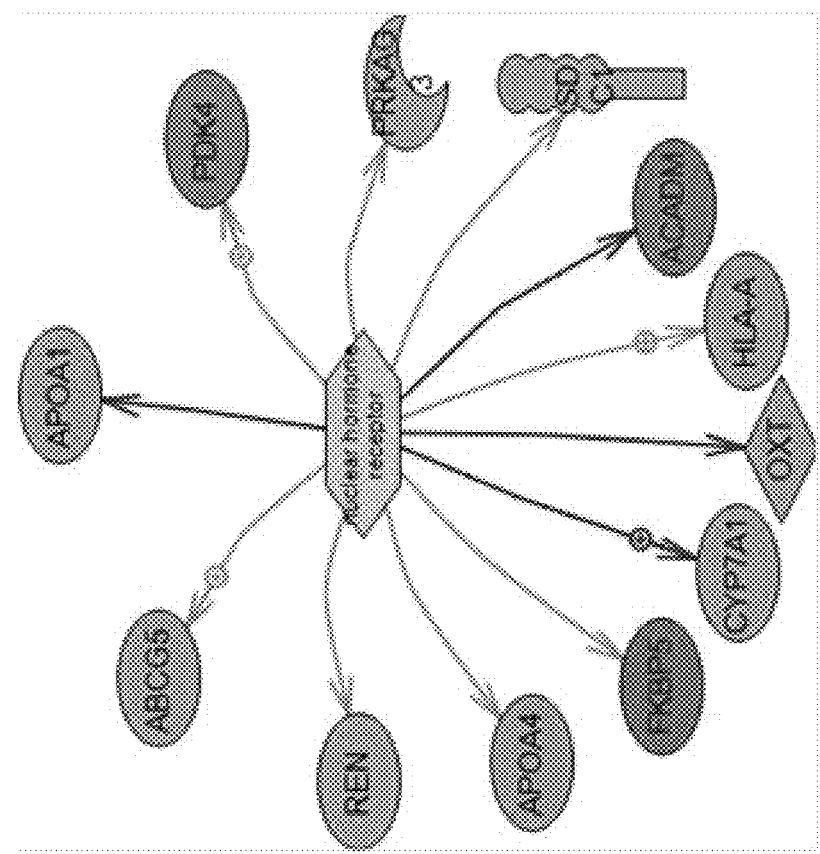
FIGS. 23A and 23B illustrate directional gene expression in the nuclear hormone receptor sub-network of genes in brain tissue for both CR vs C and AL vs C groups, respectively.
Figure 23A:
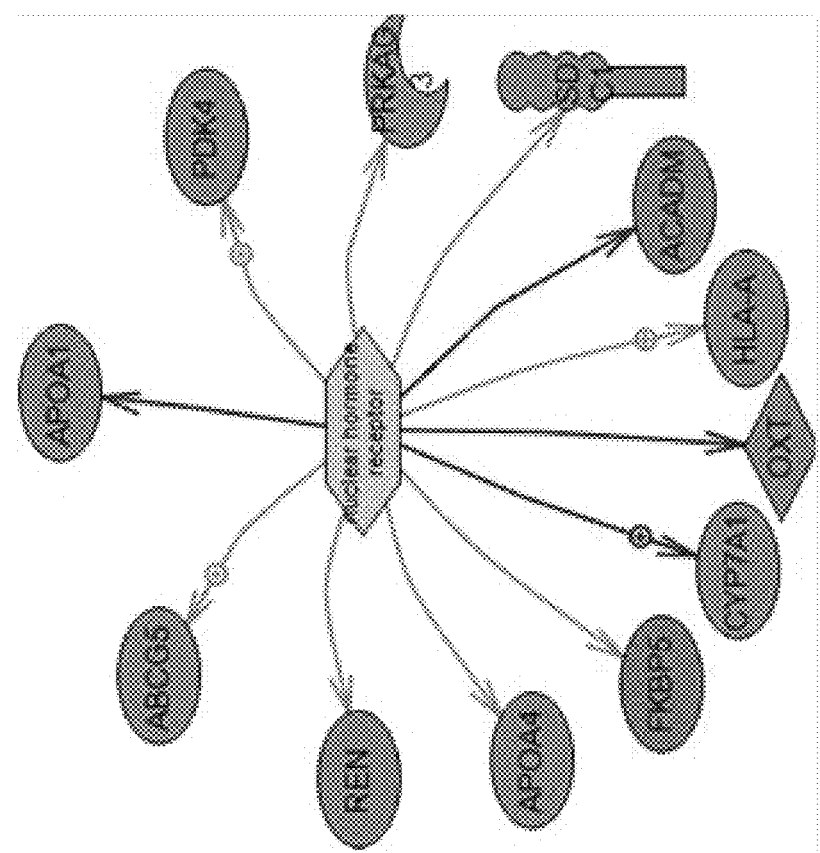

As illustrated in FIGS. 23A (CR vs C) and 23B (AL vs C), the nuclear hormone receptor is a functional class sub-network that was also differentially modulated between the C and intervention groups such that both CR and the nutrient blend led to parallel patterns of expression of genes within this sub-network. This particular sub-network of genes is related to energy metabolism, metabolic balance, and mitochondrial function (Abcg5, Acadm, Apoa1, Apoa4, Pdk4, Prkag3). This offers additional evidence that both CR and the nutrient blend similarly modulated GE related to metabolic reprogramming. Furthermore, they influenced genes related to immune function (HIa-a, Sdc1) and cognition (Oxt) in a similar fashion in the cerebral cortex. Again, red represents up-regulation, blue represents down-regulation, and grey indicates a functional class/superfamily.

Figure 24B:
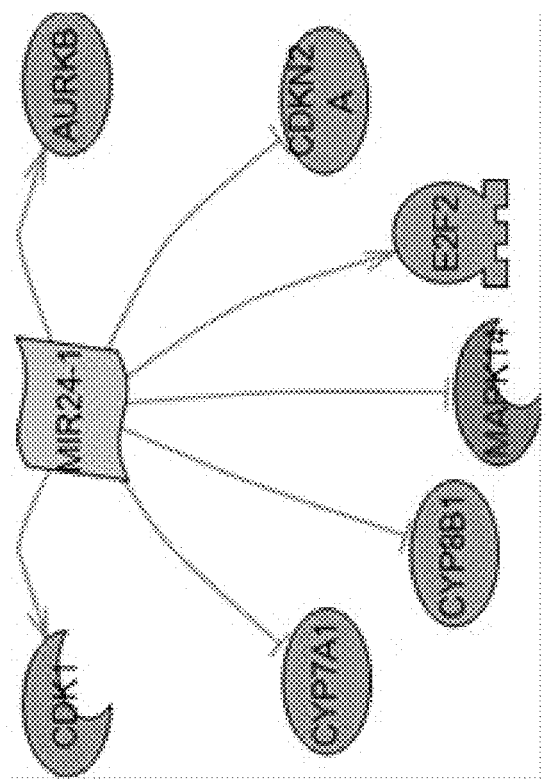
FIGS. 24A and 24B illustrate directional gene expression in the MIR24-1 sub-network of genes in brain tissue for both CR vs C and AL vs C groups, respectively.
Figure 24A:
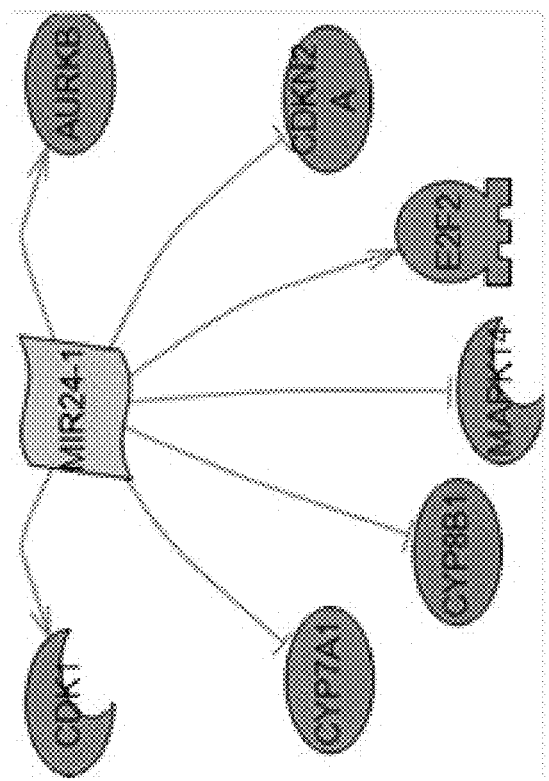

The microRNA 24-1 precursor (miR-24-1) is a small, non-coding RNA molecule that regulates GE. As illustrated in FIGS. 24A (CR vs C) and 24B (AL vs C), the miR-24-1 sub-network was differentially expressed between the C and intervention groups; both CR and the nutrient blend elicited parallel patterns of expression of genes within this sub-network, which is related to cell cycle regulation (Aurkb, Cdk1, Cdkn2a, E2f1), tumor suppression (Cdkn2a, E2f2, Mapk14), and drug metabolism/steroid synthesis (Cyp7a1, Cyp8b1). Notably, Aurkb plays a critical role in the regulation of adult neuroprogenitor cell proliferation and neural differentiation via the NOTCH signaling pathway (see FIG. 25). This suggests that both CR and the nutrient blend modulated GE related to adult neurogenesis. Again, red represents up-regulation, blue represents down-regulation, and grey indicates a functional class/superfamily.

Figure 25:
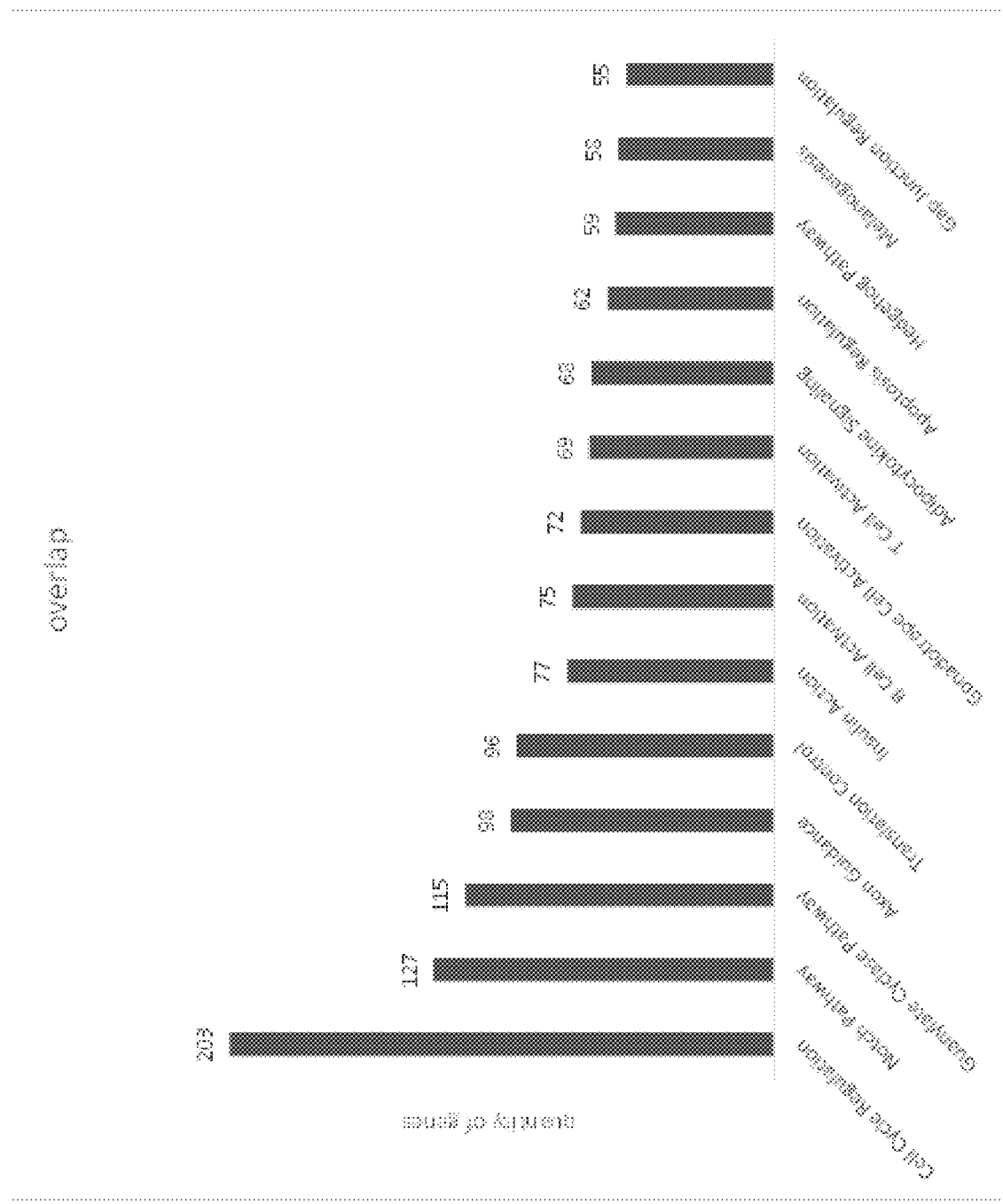
FIG. 25 illustrates a gene ontology pathway analysis of microarray data from brain tissue based on the number of genes in a gene ontology pathway that overlap between the CR and AL groups.
Figure 26:
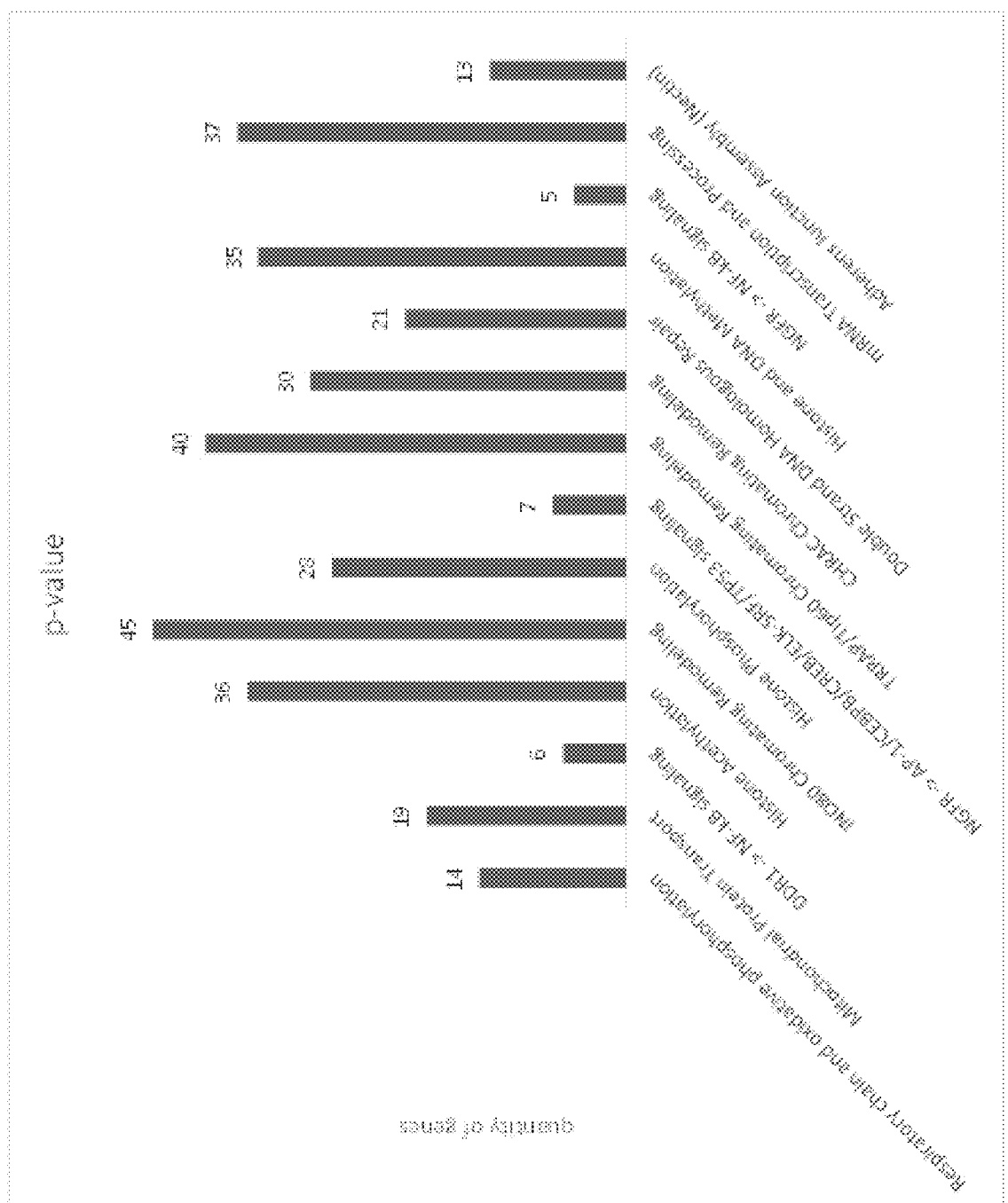
FIG. 26 illustrates a gene ontology pathway analysis of microarray data from brain tissue based on the significance of the genes differentially expressed in the CR and AL groups (enriched p value ≤0.05).

The transcriptomic data was further analyzed in order to identify gene ontology pathways influenced by the interventions. This data is illustrated in FIGS. 25 and 26. This particular analysis of the data was also conducted in two ways: 1) based on the number of genes in a gene ontology pathway that overlap between CR and the AL groups (FIG. 25) and 2) based on the significance of the genes differentially expressed in the two groups (enriched p-value ≤0.05) (FIG. 26). Several pathways similarly influenced by the interventions were identified, including those involved in neural cell signaling and metabolic reprogramming.

Figure 27A:
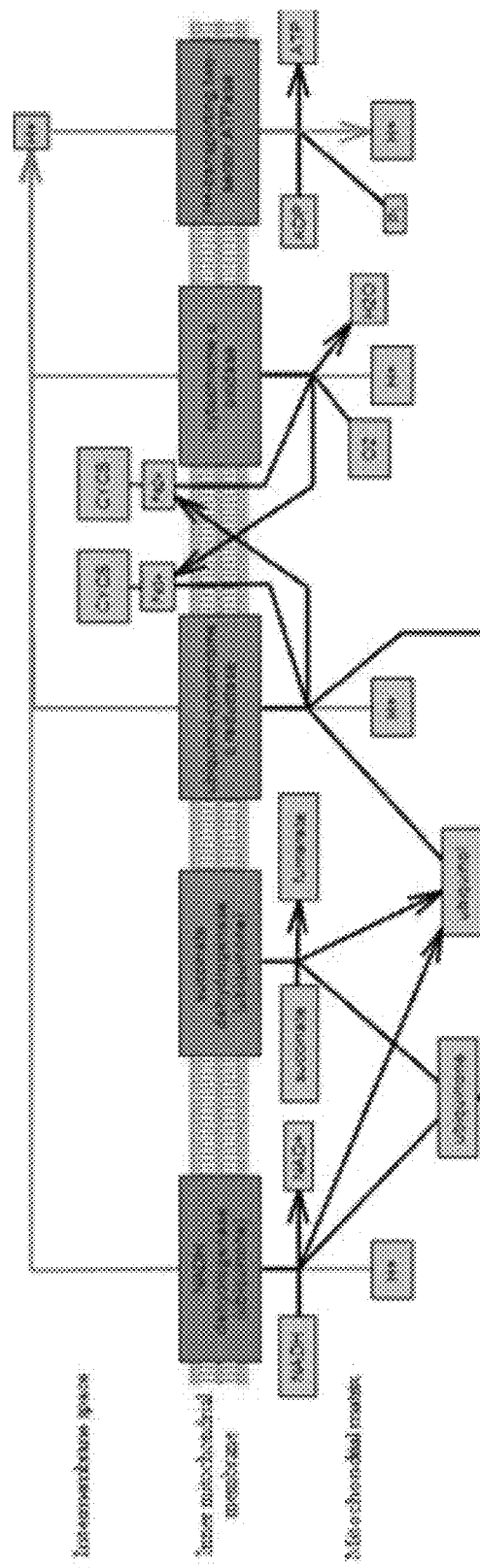
FIGS. 27A and 27B illustrate the Respiratory Chain and Oxidative Phosphorylation Gene Ontology Pathway in brain tissue as regulated by both CR and AL groups, respectively, as compared to the C group.
Figure 27B:
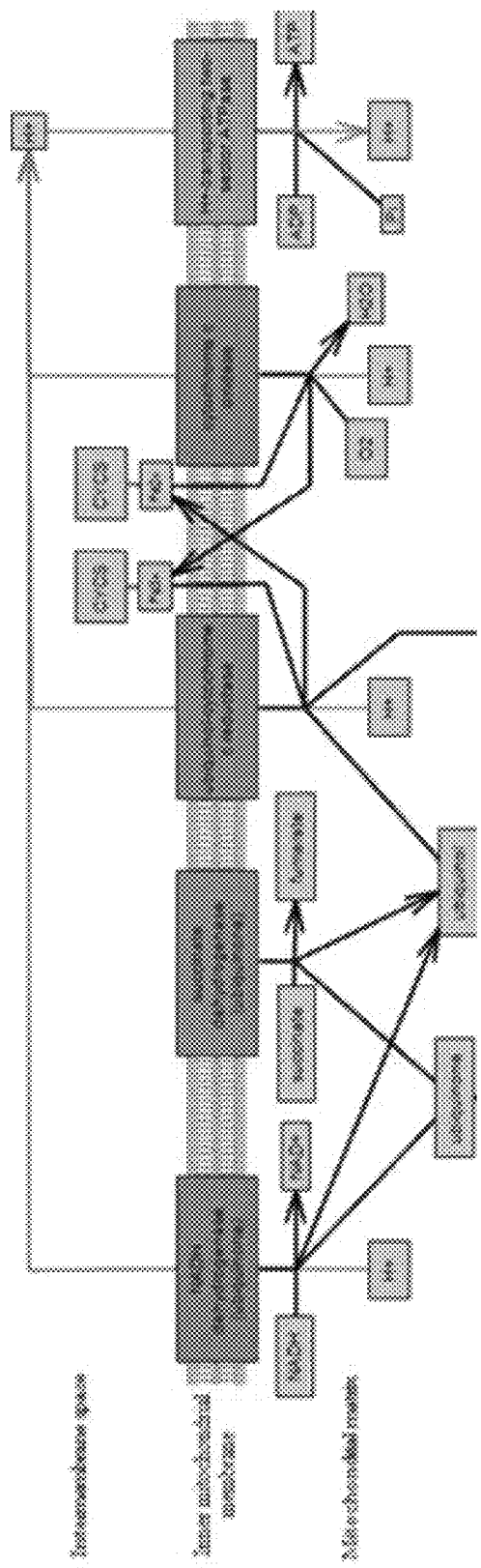

The Respiratory Chain and Oxidative Phosphorylation Gene Ontology Pathway is illustrated as a representative pathway that was further investigated. As can be seen in FIGS. 27A (CR vs C) and FIG. 27B (AL vs C), this pathway was similarly regulated by both CR and AL groups compared to the C group. Only one protein, in protein transport, is regulated in a different manner between CR and AL. All other genes changed in the same direction to a similar degree in both the CR and AL groups, indicating that the respiratory chain is an important pathway that was modulated by both calorie restriction and by the nutrient blend. These findings provide evidence that the nutrient blend leads to GE characteristic of metabolic reprogramming similar to that brought about by CR. Red generally represents up-regulation, blue generally represents down-regulation, and grey indicates that the gene was not included in our differential analysis as it was not changed with age.

Figure 28:
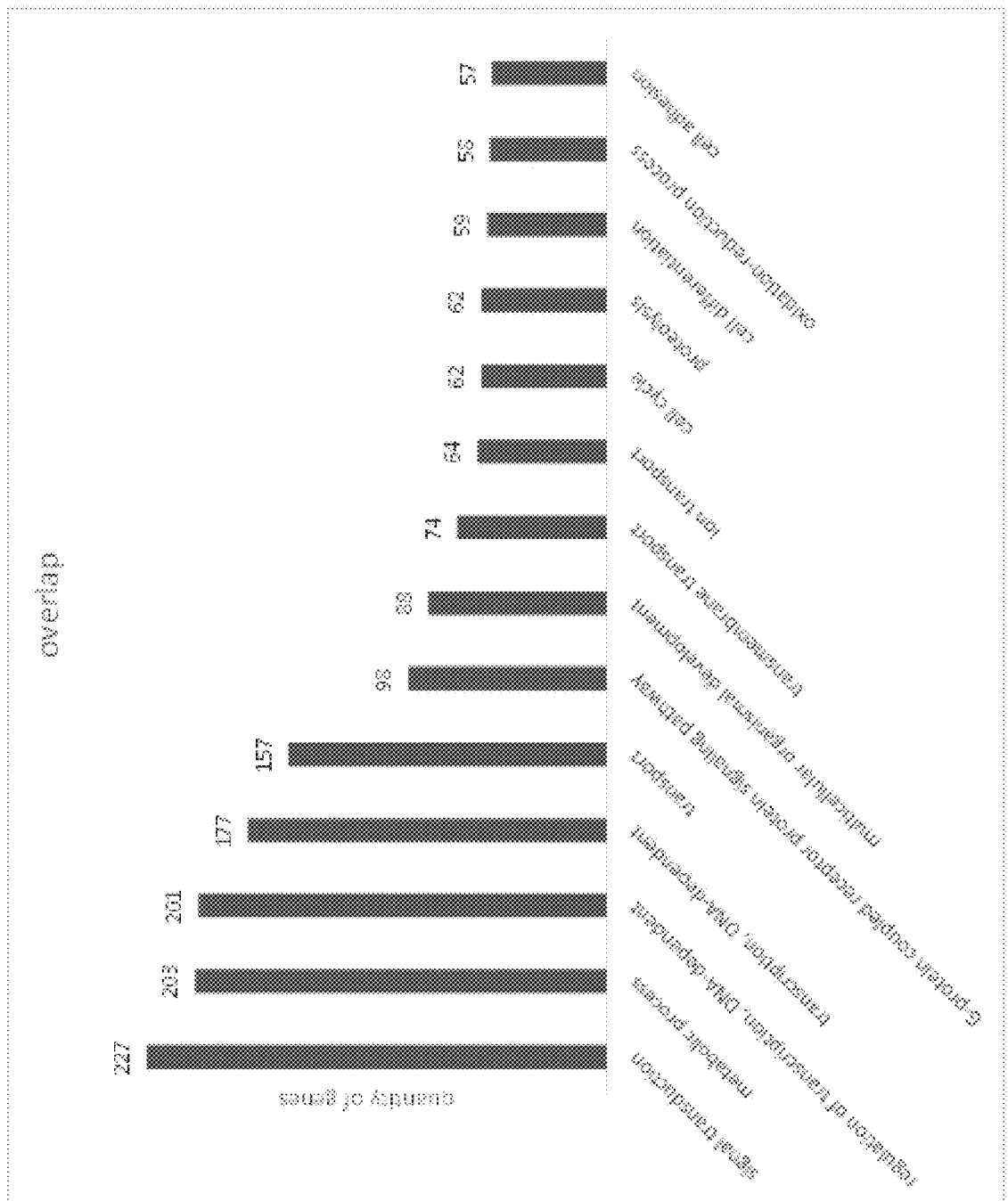
FIG. 28 illustrates a biological processes pathway analysis for brain tissue based on the number of genes in a pathway that overlap between the CR and AL groups.
Figure 29:
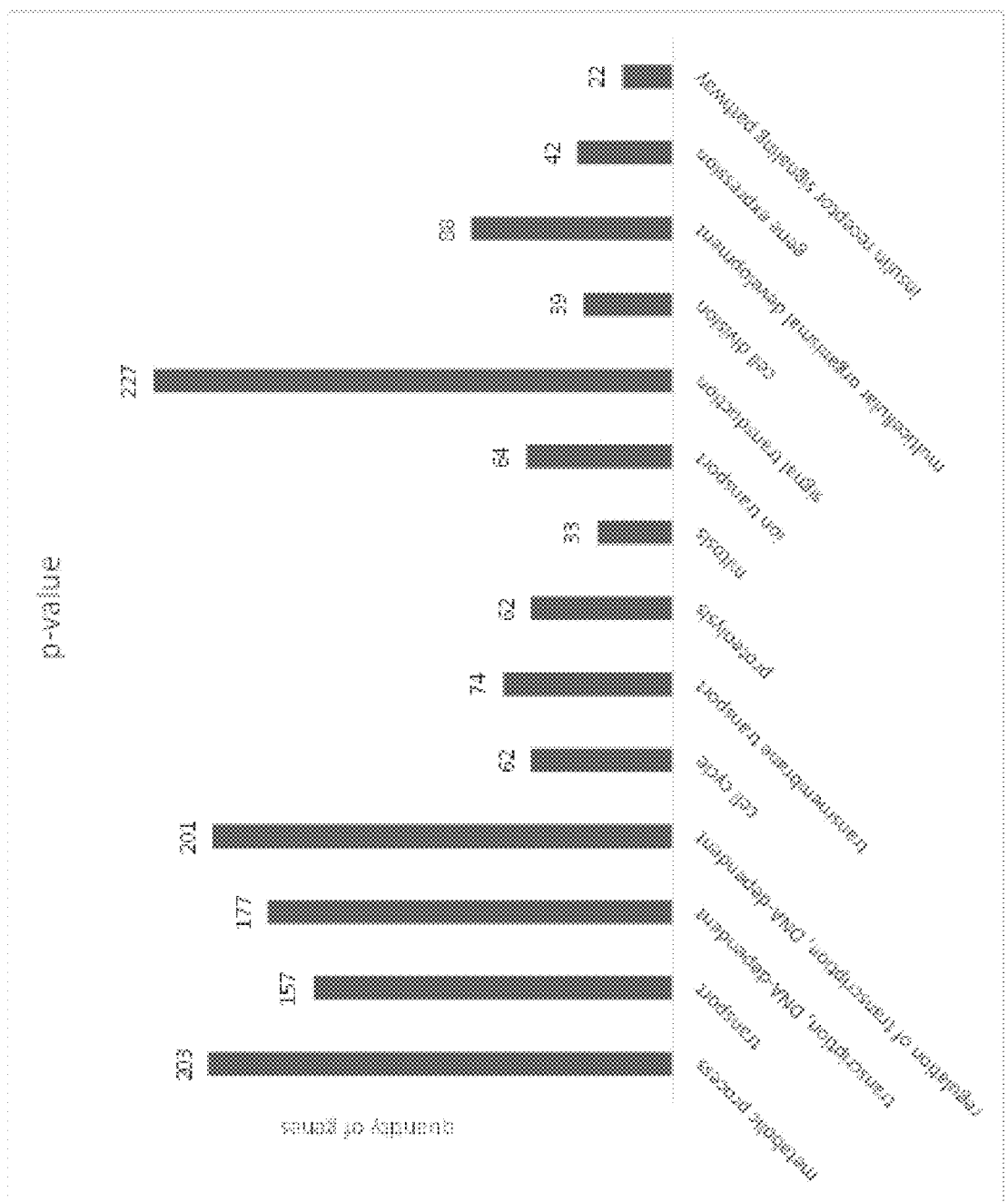
FIG. 29 illustrates a biological processes pathway analysis for brain tissue based on the significance of the genes differentially expressed in the CR and AL groups (enriched p value ≤0.05).

A biological processes pathway analysis revealed that CR and the nutrient blend similarly modulated a number of other pathways compared to the C group. Analysis of the data was conducted in two ways: 1) based on the number of genes in a pathway that overlap between CR and the AL groups (FIG. 28) and 2) based on the significance of the genes differentially expressed in the two groups (enriched p value ≤0.05) (FIG. 29). Pathways involved in signal transduction processes, regulation of transcription and cell cycle regulation, as well as those related to metabolic reprogramming, were similarly influenced by the interventions.

Cerebral cortex was selected for investigation because it is a tissue that is negatively influenced by aging, but positively affected by CR. Normal aging in both human and rodents is characterized by progressive deficits in cognition and brain structure. CR has been demonstrated in non-human primates to delay and/or attenuate age-related declines in cognition and brain structure. The brain is a highly metabolically active tissue and is vulnerable to impairments in metabolic control, including elevated glucose levels. CR has been demonstrated in non-human primates to maintain glucose control and mitochondrial function with age, two mechanisms by which CR may preserve brain health with age. The parallel regulation of the Respiratory Chain and Oxidative Phosphorylation and Insulin Action Gene Ontology Pathways by the supplement and CR suggest similar, positive regulation of the two interventions on metabolic control that can be important for healthy brain aging.

In summary, these data provide support for a number of conclusions. For example, one major finding of the study was that both CR and the nutrient blend modulated global patterns of GE toward a more youthful profile, indicating that the nutrient blend did, in fact, mimic CR GE to a striking degree in the cerebral cortex. A second major finding of the study was that both CR and the nutrient blend modified the expression of thousands of genes closely in parallel. The fact that the regulation of genes was in the same direction with CR as with the nutrient blend indicates that the mechanisms are in common. Offering additional evidence that the nutrient blend mimicked CR, the nutrient blend modulated sub-networks, gene ontology pathways, and biological pathways in a manner similar to CR. Moreover, the fact that several of the transcriptomics patterns in the cerebral cortex of the brain were related to cognition, learning and memory, adult neurogenesis and nervous system function suggest functional relevance. Further, both CR and the nutrient blend produced parallel patterns of transcriptomics related to energy metabolism, metabolic balance and mitochondrial function, indicative of metabolic reprogramming, a hallmark of CR.

Example 5—Effect of Nutritional Blend on Brain Integrity

A randomized, double-blind, placebo-controlled study was performed to investigate the effects of a novel nutritional blend on brain integrity in healthy middle-aged adult humans. The study was designed to evaluate the effects of the nutritional blend on cognition, mood, brain imaging, and brain function parameters. Further, the study looked to determine whether there was a demonstrated association between measures of attention and memory, metabolite concentrations, and brain structure with subjects who received the nutritional supplement as compared to subjects who only received the placebo.

Each daily dose (4 capsules) of the novel nutrient blend contained: 1,000 mg EPA+DHA from ultra-pure fish oil concentrate (2,110 mg), 30 mg resveratrol (from *Polygonum cuspidatum* root), 75 mg quercetin (from *Dimorphandra*

*mollis* fruit extract), 140 mg purple corn (*Zea mays* L.) cob extract (delivering 10 mg anthocyanins), 37.5 mg rosemary (*Rosmarinus officinalis* L.) leaf extract (delivering 1.5 mg carnosic acid), 200 mg citrus bioflavonoids (which contains 100 mg naringin and 100 mg hesperidin), 30 mg Coenzyme $Q_{10}$, 100 mg alpha lipoic acid, 1 mg astaxanthin (a carotenoid from *Haematococcus pluvialis* algae), 5 mg lycopene (a carotenoid), 4 mg lutein (a carotenoid from Marigold flower (*Targetes erecta*)), 1,000 IU vitamin $D_3$ (as cholecalciferol), 40 g vitamin $K_2$ (as menaquinone-7), and 50 mg d-limonene (from *Citrus sinensis* peel oil).

The placebo product was matched for color and capsule size. The placebo contained: 690 mg olive oil, 10 mg paprika, with gelatin and water as excipients.

Each study participant received a daily dose of 4 capsules, 2 capsules with breakfast and 2 capsules with dinner. Subjects were given guidelines to consume the supplements/placebos with meals and containing at least 5 g of fat. Subjects received the proprietary nutritional supplement or placebo for 42 days.

The overall design included 4 study visits. A comprehensive imaging protocol was administered at baseline and after 6 weeks of supplementation. The initial visit was a screening visit that included informed consent, a medical history and exam, blood draw, pregnancy and drug screen, and clinical measurements. The second visit was the baseline visit (day 0), which included medical history and exam, blood draw, pregnancy and drug screen, skin carotenoid scan, clinical measurements, neuropsychological measurements, MRI protocol, and randomization and dispensing of supplement or placebo. The third visit (day 21±3 days) included measurement of vital signs, clinical measurements, skin carotenoid scan, and dispensing of additional supplement or placebo. The final visit (day 42±3 days) included medical history and exam, blood draw, pregnancy and drug screen, skin carotenoid scan, clinical measurements, neuropsychological measures, and MRI protocol.

63 participants (33 females) were enrolled in the study ranging from 40 to 60 years of age. Participants were enrolled if they had no current or past neurological illness, substance abuse or dependence in the past 60 days, current depression or anxiety disorder, current or past psychiatric disorder, history of head trauma with loss of consciousness, contraindication to MRI scanning. Further, subjects with omega 3, fish oil or multivitamin supplements for the past 3 months, and any known allergies to any ingredients in the proprietary nutritional supplement were excluded from the study. Of the 63 enrolled participants, 61 participants (31 females) completed the study protocol. 31 participants were in the supplement group and 30 participants were in the placebo group.

Figure 30A:
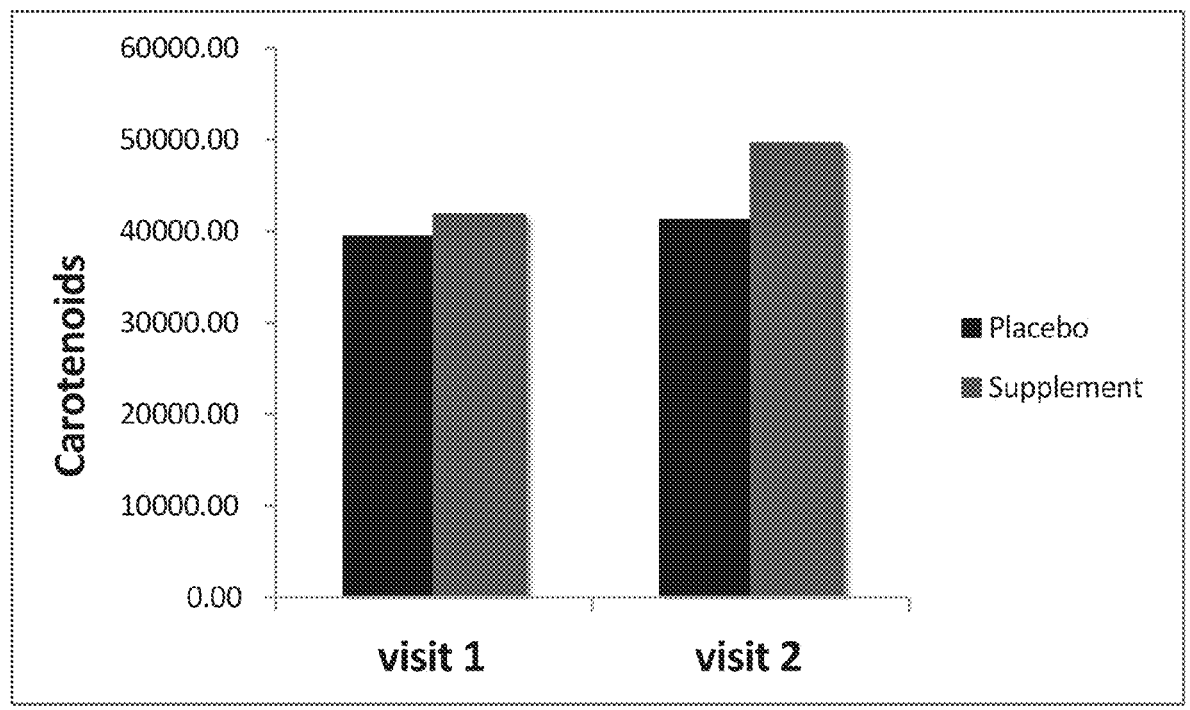
FIG. 30A illustrates skin carotenoid levels at baseline (visit 1) and after 6 weeks (visit 2) for placebo and supplemented groups.
Figure 30B:
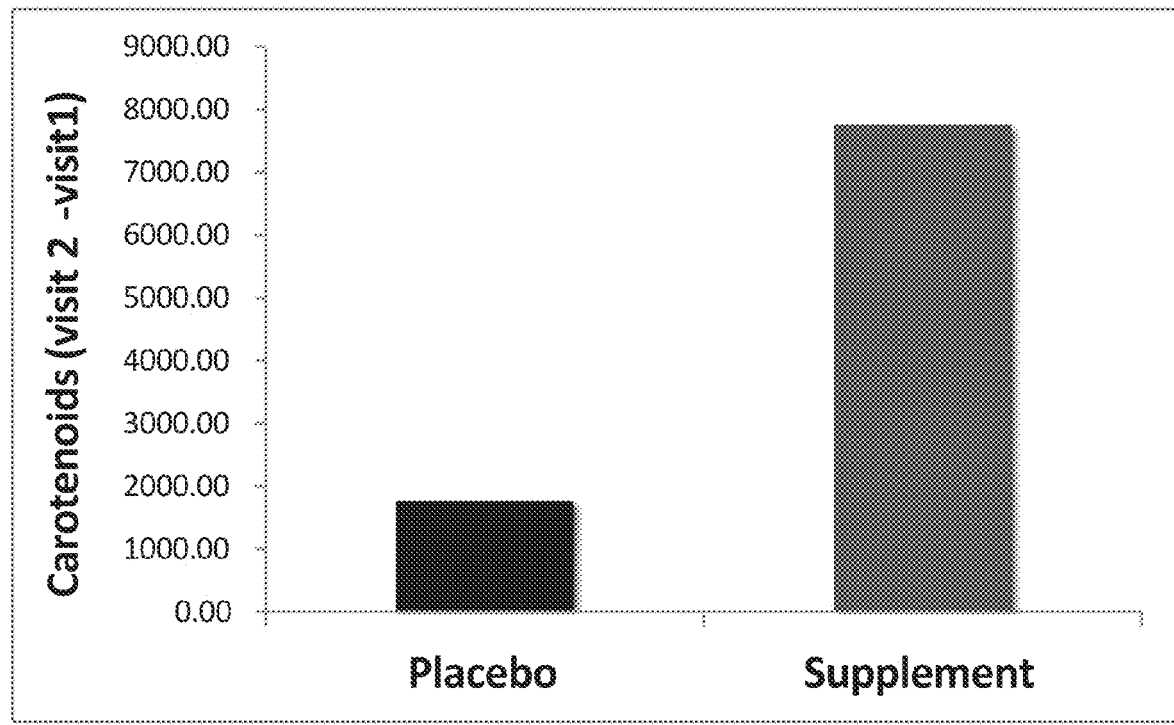
FIG. 30B illustrates a difference analysis for skin carotenoid levels between visit 1 and visit 2 for placebo and supplemented groups as represented in FIG. 30A.

Skin Carotenoids. It is noted that carotenoids are pigments that are responsible for many of the bright colors (reds, oranges, yellows, etc.) in fruits and vegetables. Skin carotenoids are an excellent biomarker of fruit and vegetable intake. The supplement contains at least approximately 10 mg of carotenoids (lutein, lycopene, and astaxanthin). As can be seen in FIG. 30A, the study participants started out with an average skin carotenoid level of approximately 40,000 RIUs. This indicates that the study participants already had very healthy diets rich in colorful fruits and vegetables. However, despite the high baseline value, skin carotenoid levels still increased in the supplement group as compared to baseline (p=0.06). Further, as can be seen in FIG. 30B, the difference score for the supplement group is significantly higher than the placebo group (p=0.015). In contrast, the skin carotenoid levels in the placebo group did not significantly change compared to baseline. It is emphasized that these improvements are detectable in a group of individuals that were already considered very healthy and habitually consuming a good diet at baseline.

Magnetic Resonance Spectroscopy (proton MRS). Acquisition and Analysis Proton (1H) magnetic resonance spectroscopic (MRSI) measurements were performed using a 3.0 Tesla Siemens (Erlangen, Germany) Verio™ whole-body MRI scanner. A single voxel measuring 19 mL was positioned bilaterally over the anterior cingulate cortex (ACC) and contained predominantly gray matter by tissue type. Two-dimensional (2D) J-resolved 1H MRS spectra were recorded from all ACC voxels using the following measurement parameters: TR/TE range=2000/31-229 ms; signal averages per TE=4; deltaTE=2 ms; 3-pulse WET water suppression. An additional water unsuppressed 2D J-resolved 1H MRS dataset was recorded from each voxel, and used to apply a post-hoc eddy current correction to the corresponding metabolite data. To control for within-voxel tissue variability, skull-stripping and brain tissue-type segmentation was applied to all MP-RAGE images using the Brain Extraction Tools and Fast tools provided with the freely-available FMRIB software library.

All 2D J-resolved 1H MRS data were quantified using the prior knowledge fitting (ProFit) algorithm, which fits basis spectra from a total of nineteen metabolites to the raw 2D spectral surface. The basis functions included N-acetyl aspartate (NAA), choline (Cho), total creatine (tCr), glutamate (Glu), glutamine (Gln), myo-inositol (Ins), and glutathione (GSH). All metabolite levels were expressed as metabolite/water ratios and corrected for the within-voxel CSF fraction using segmented MRI data. Metabolite/water ratios thus are expressed as institutional units (I.u) and presented as the mean±standard deviation (SD).

Proton MRS is a biochemical measure that allows for the measurement of at least 20 different metabolites in the brain. This was a single voxel study of the anterior cingulate region of the brain where each metabolite was measured independently per voxel, rather than simultaneously. A few representative examples of non-limiting changes in metabolite concentration include N-acetyl-aspartate (NAA), glutathione (GSH), and glutamate (Glu).

Figure 31A:
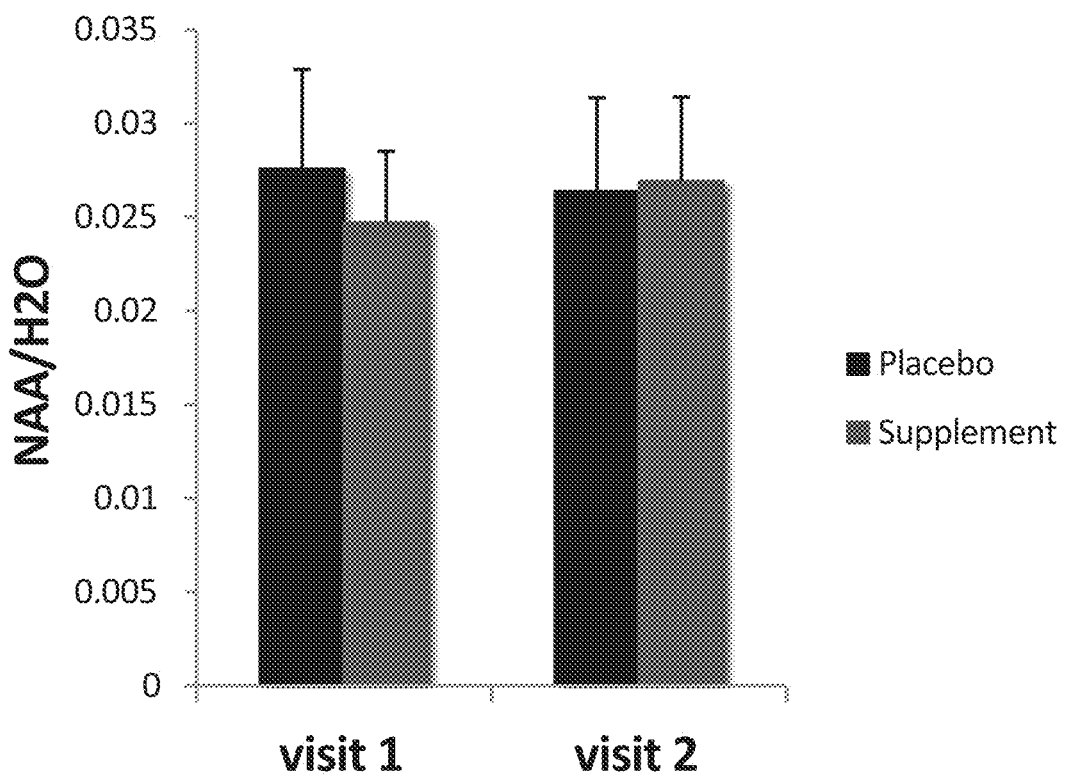
FIG. 31A illustrates N-acetyl-aspartate (NAA) levels in females at baseline (visit 1) and after 6 weeks (visit 2) for placebo and supplemented groups.
Figure 31B:
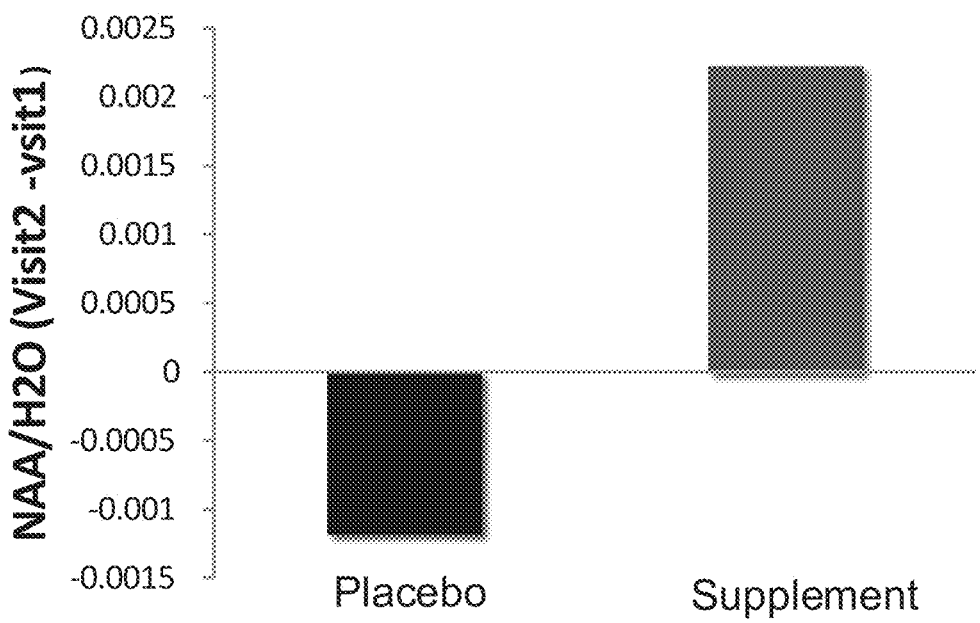
FIG. 31B illustrates a difference analysis for NAA levels in females between visit 1 and visit 2 for placebo and supplemented groups as represented in FIG. 31A.

NAA is, among other things, a marker of mitochondrial activity and of neuronal health. In particular, NAA levels increased in the female participants rather than men. This distinction might be related to fact that mitochondrial activity is heavily influenced by hormones. FIG. 31A illustrates the changes in NAA levels in female participants for both supplement and placebo groups. A paired t-test shows that the supplement group at visit 1 and 2 are different (p=0.03, one tails, and p=0.07, two tailed), but that the placebo is not different. Further, FIG. 31B illustrates that the difference score for the supplement group is significantly higher than the placebo group (p=0.05). This data reflects a 5% increase in NAA in women in response to the supplement, which represents increased brain metabolism in women and is an indicator of improved neuronal health in women. Further, it is remarkable that this change occurred within 6 weeks of supplementation.

Figure 32A:
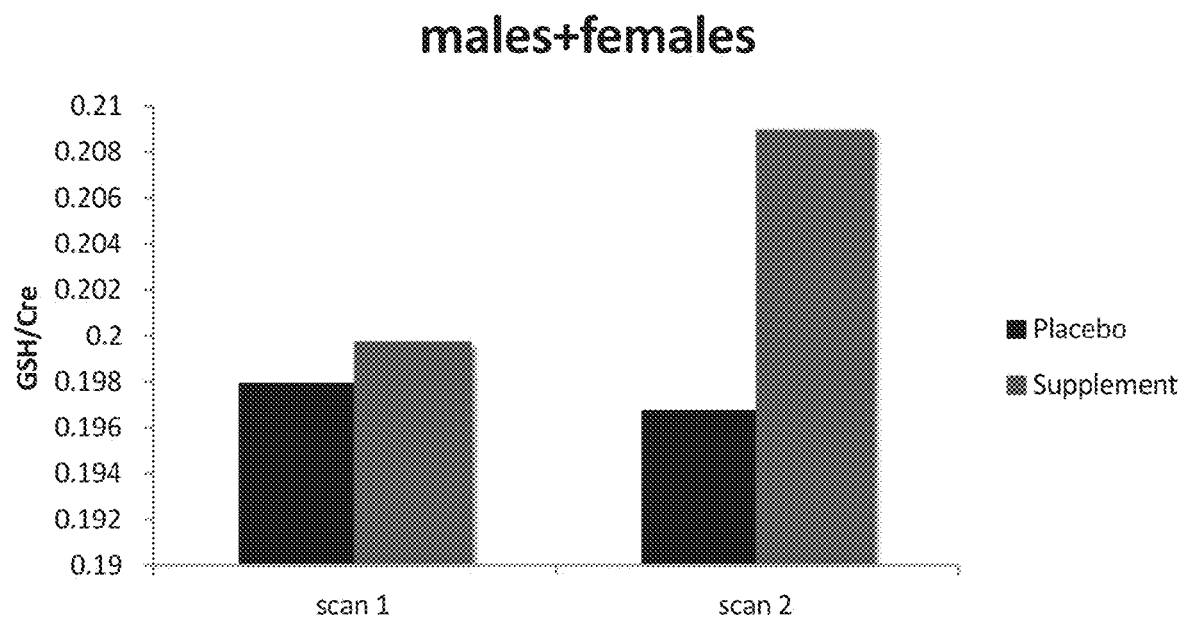
FIG. 32A illustrates glutathione (GSH) levels at baseline (visit 1) and after 6 weeks (visit 2) for placebo and supplemented groups.
Figure 32B:
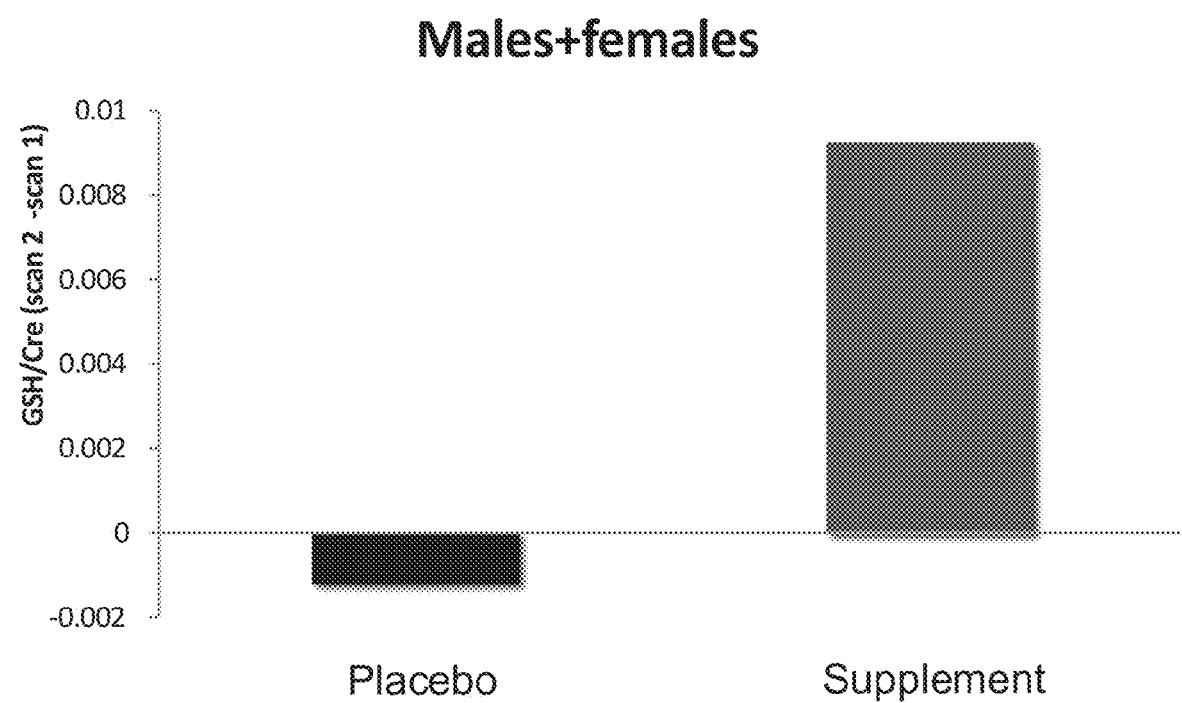
FIG. 32B illustrates a difference analysis for GSH levels between visit 1 and visit 2 for placebo and supplemented groups as represented in FIG. 32A.

GSH is an intrinsic antioxidant and is the most abundant water-soluble antioxidant in the human body. It is important for both antioxidant protection and detoxification. GSH generally declines in synthesis and concentration with age. However, as can be seen in FIGS. 32A and 32B, supplementation increased GSH levels across both men and women. More specifically, a one-tailed t-test shows that the supplement increases GSH levels over time (p=0.066), but that the placebo does not. This data illustrates that the supplement can provide neuroprotection, antioxidant protection, and detoxification via increased GSH levels.

Glu is a neurotransporter and is involved in many aspects of normal brain function including cognition, memory and learning, etc. The Glu/glutamine (Gln) ratio is a proxy for Glu uptake. Based on this ratio, there was a 15.4% increase in Glu uptake across all supplemented participants as compared to a 6.3% uptake in the placebo group. However, once again, the increase was even more significant in the female group (18.2%) than in the male group (9.7%).

Figure 33A:
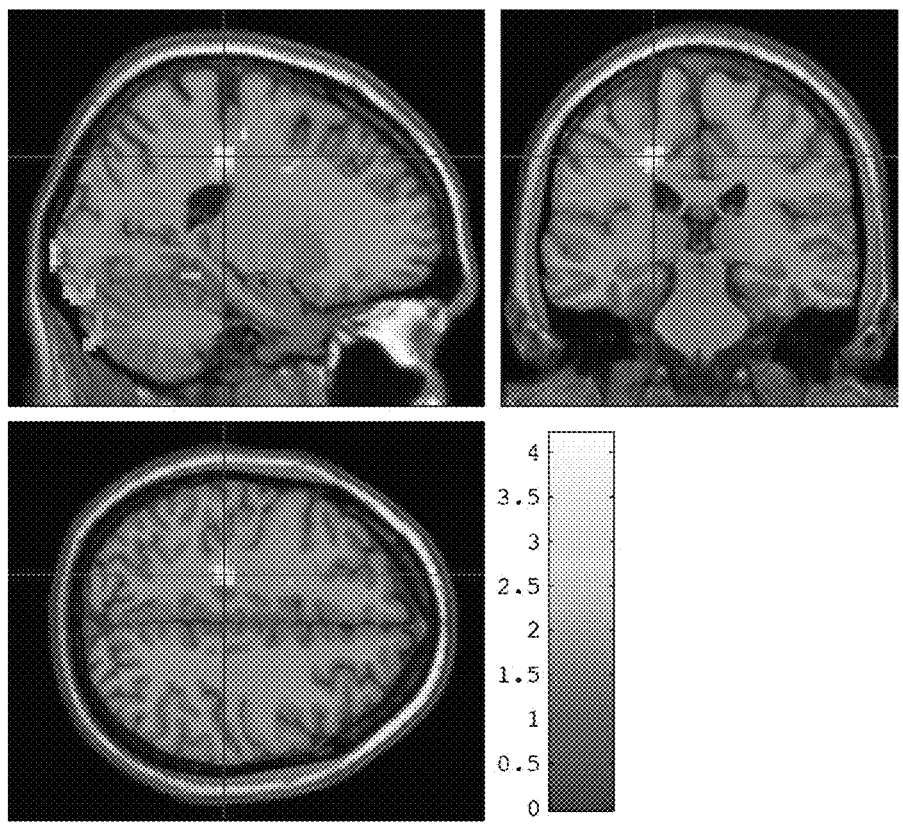
FIGS. 33A and 33B illustrate functional magnetic resonance imaging (fMRI) images of the anterior cingulate cortex (ACC) seed region.
Figure 33B:
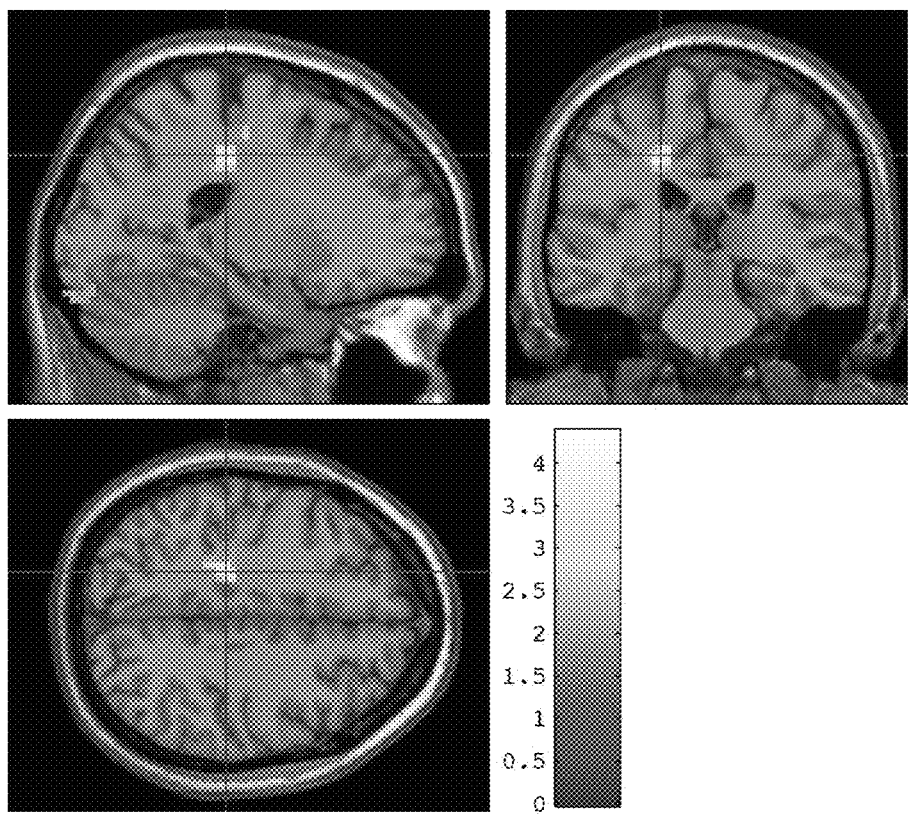
Figure 34:
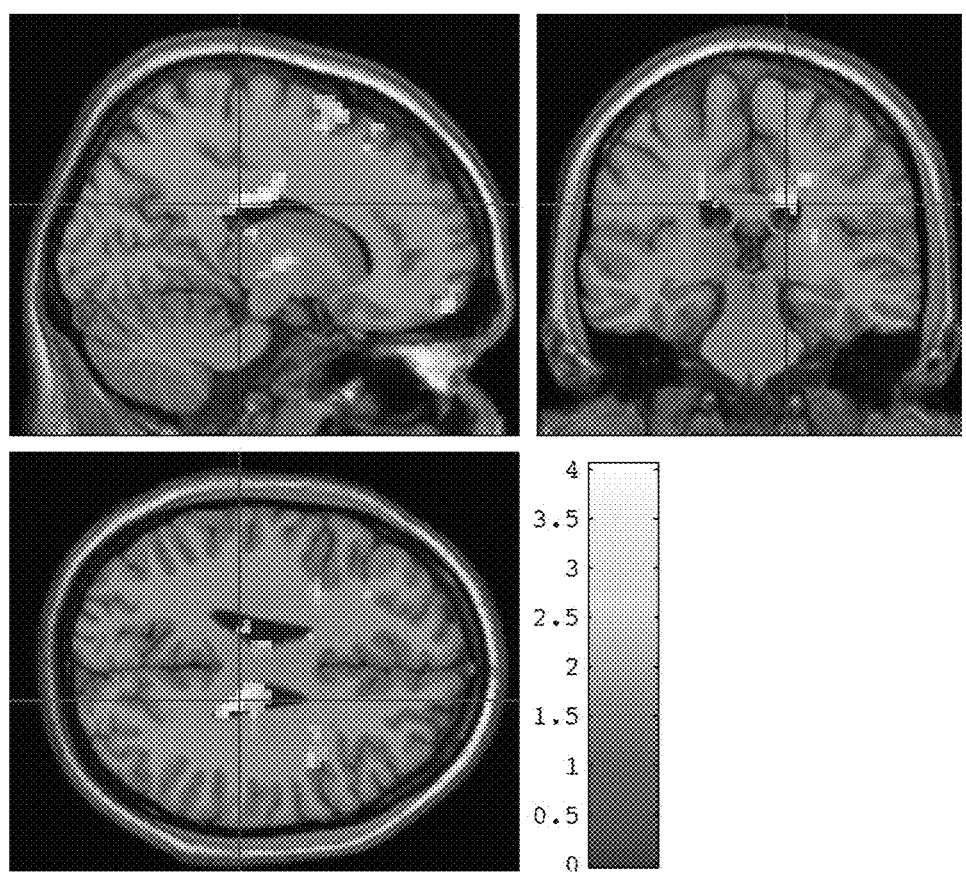
FIG. 34 illustrates an fMRI image of the posterior cingulate cortex (PCC) seed region. This figure represents group averages for changes in connectivity at 6 weeks post treatment for the supplement group relative to the connectivity in the placebo treated group at 6 weeks.
Figure 35A:
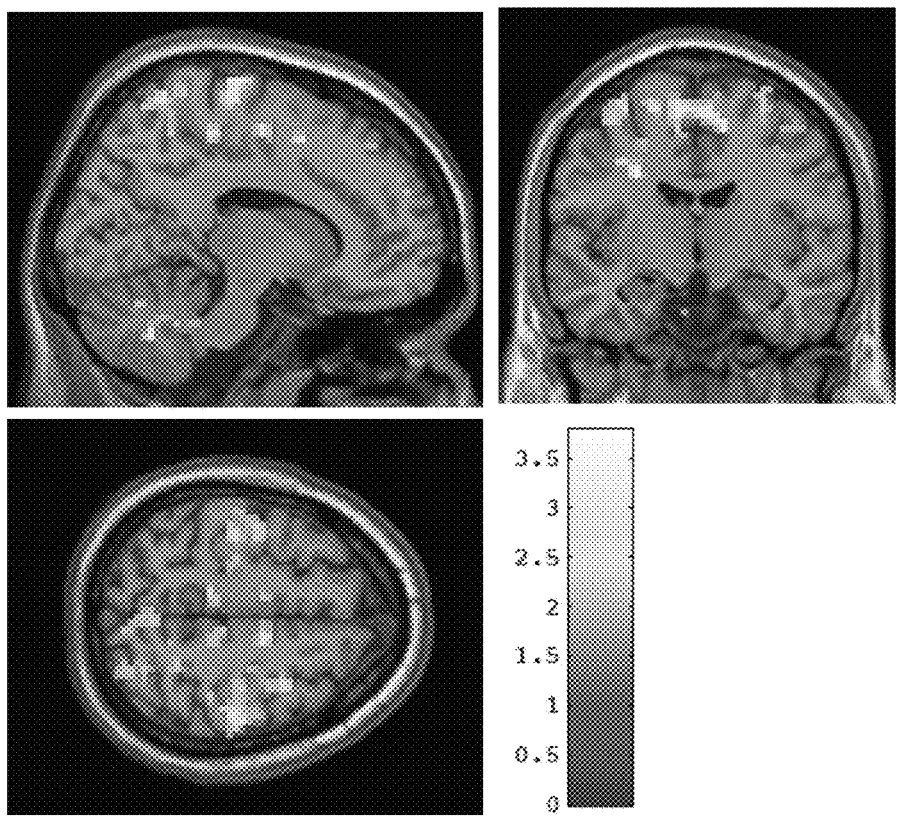
FIGS. 35A and 35B illustrate fMRI images of the right orbitofrontal cortex (OFC) seed region.
Figure 35B:
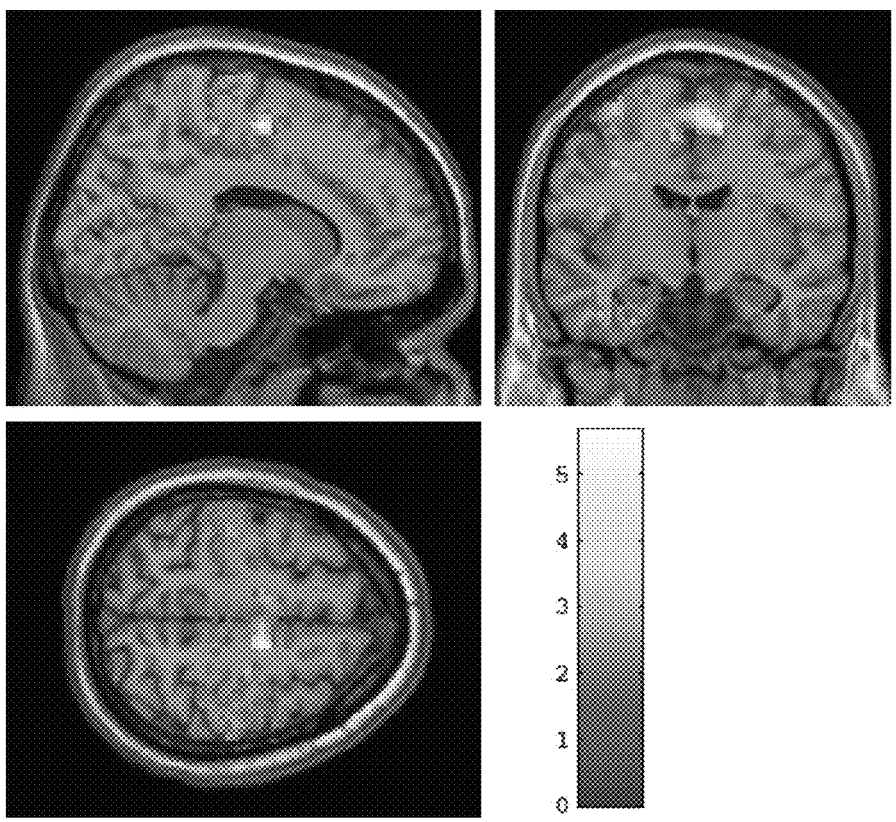

Magnetic Resonance Imaging (functional MRI). Functional MRI (fMRI) examines the connectivity between brain regions. In particular, resting state connectivity can be a valuable tool to examine parameters of connectivity due to the stability of the connectivity during the resting state. FIGS. 33A and 33B illustrate the connectivity in the anterior cingulate cortex (ACC) seed region. As can be seen in FIGS. 33A and 33B the connectivity between the ACC and parietal and cerebellar regions increase with supplementation (prior to Family-Wise Error Rate (FEW) Correction). FIG. 34 illustrates the connectivity in the posterior cingulate cortex (PCC) seed region of the supplemented group relative to placebo. This is a key region of the attention network. Attention is generally influenced by age and diminished attention can be directly related to diminished memory. Thus, an increase in connectivity in this seed region can be suggestive of memory improvements and more "youthful" cognition. In this seed region there was a significant increase in connectivity with the middle and superior frontal regions (FWE correction=0.066). FIGS. 35A and 35B illustrate the right orbitofrontal cortex (OFC) seed region. As illustrated in FIGS. 35A and 35B, there was a decrease in connectivity relative to baseline and relative to placebo, respectively. This reduction in connectivity allows for additional channels to exist for increased intake of new data.

These findings show a significant reduced intrinsic coupling between the right OFC brain region and the clusters in precentral, paracentral, parietal, supplementary motor, precuneus, and frontal cortical regions. Further, these findings also reveal increased connectivity between the PCC and medial and superior frontal areas.

Magnetic Resonance Imaging (morphometry). Changes in brain volume and the regional thickness of the outer 3 mm of the cortex were monitored. Of all regions monitored, only the pars orbitalis cortex showed a trend for increased volume (p=0.076) within the six week testing period. The trend was even more pronounced in the female population (p=0.007). In females only, there was a trend toward decreased volume in the superior frontal cortex (p=0.05).

Cognitive Measures. A variety of cognitive measures were performed. Some observations and results from a few of the tests administered are reported below.

Figure 36:
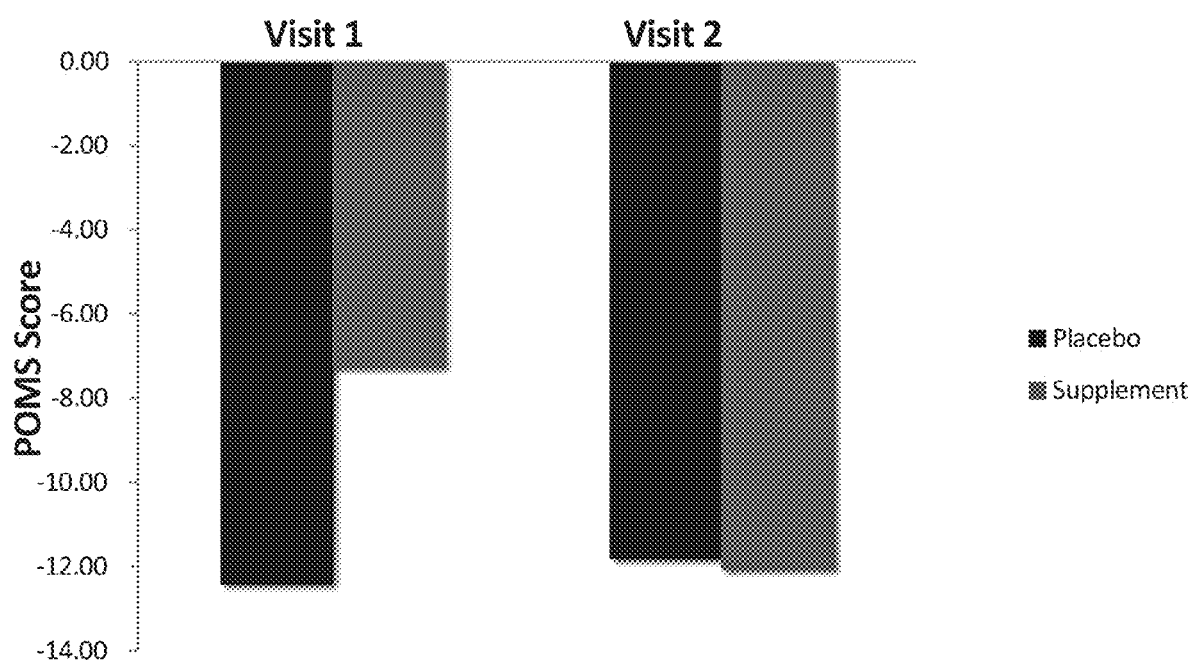
FIG. 36 illustrates Profile of Mood State (POMS) data at baseline (visit 1) and 6 weeks (visit 2) for females from placebo and supplement groups.

One such measure was the Profile of Mood State (POMS) test. This is a self-reported general screening of mood. As illustrated in FIG. 36, there was an improvement in mood in supplemented females from baseline over the course of the study (p=0.02). There was no improvement in the placebo group.

Figure 37A:
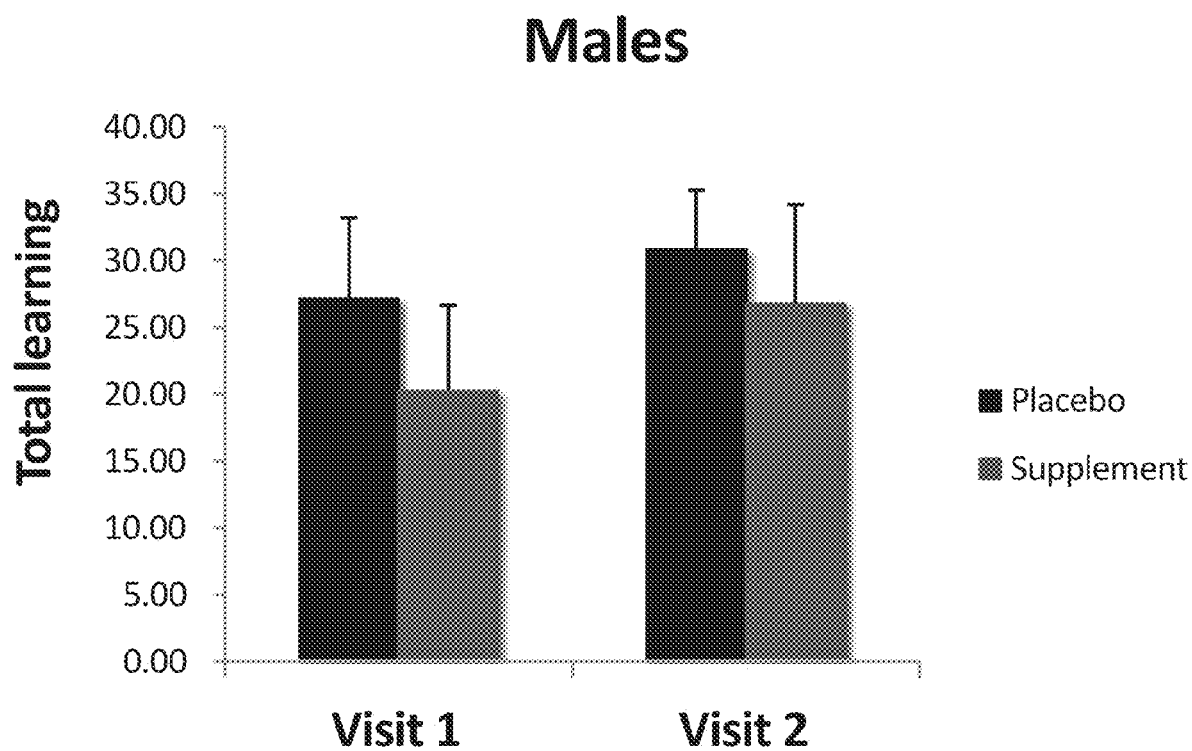
FIG. 37A illustrates Logical Memory data at baseline (visit 1) and 6 weeks (visit 2) for males from placebo and supplement groups.
Figure 37B:
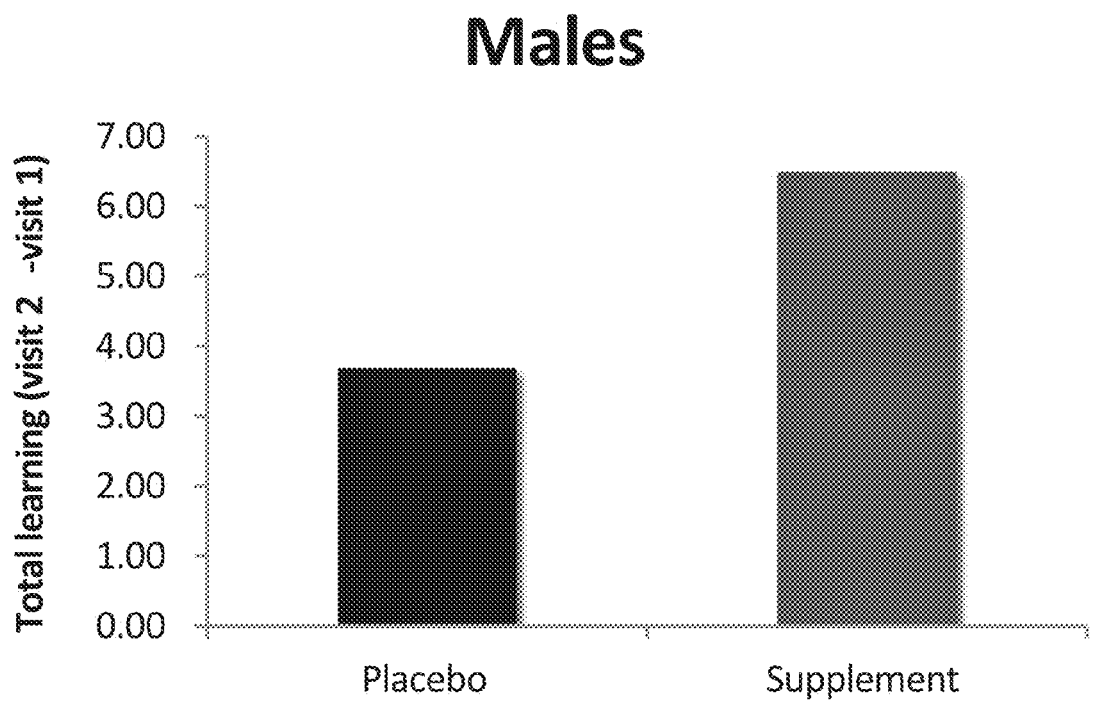
FIG. 37B illustrates a difference analysis between visit 1 and visit 2 for the Logical Memory data illustrated in FIG. 37A.

Logical Memory I and Logical Memory II subtests from the Wechsler Memory Scale-IV were performed to assess narrative memory under free recall and recognition conditions. More specifically, each participant was told a story and the subject was then asked to how much information he or she could recall from the story. There was an improvement seen with males in this test, but not females. As is illustrated in FIGS. 37A and 37B, there was a slight increase in both the supplement group and the placebo group, but the increase was greater in the supplement group relative to the placebo group (p=0.03). It is noted that, when controlled for age, the effect was even more robust.

Figure 38A:
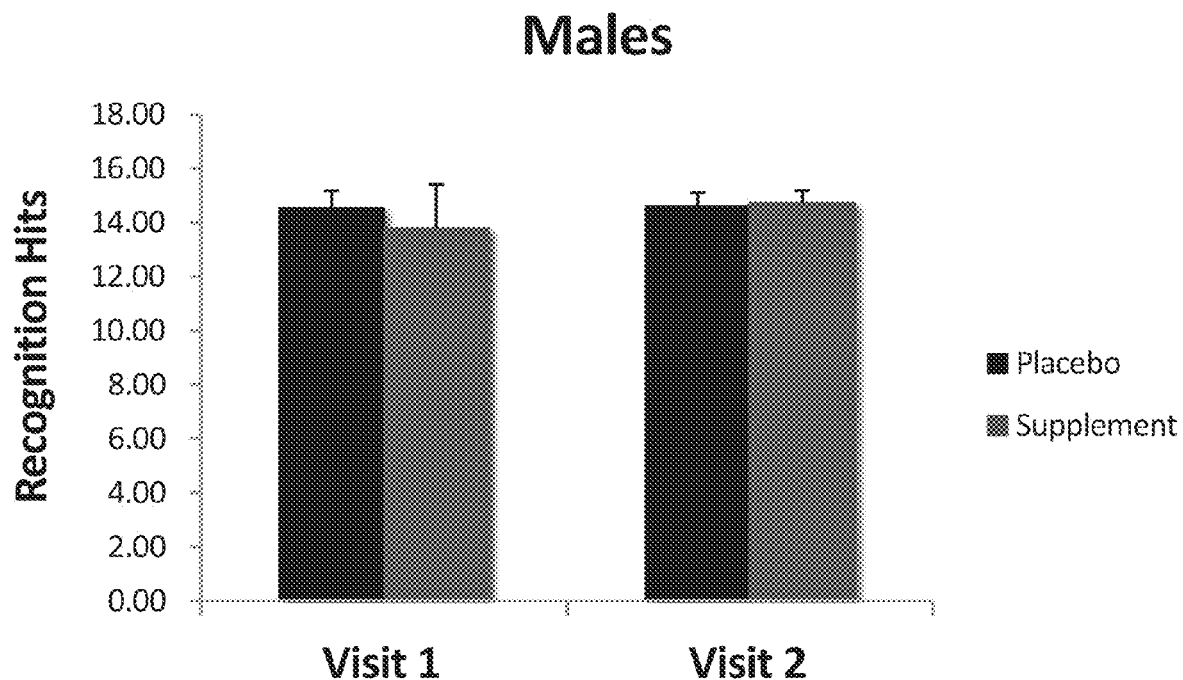
FIG. 38A illustrates Rey Auditory Verbal Learning Test (RAVLT) data at baseline (visit 1) and 6 weeks (visit 2) for males from placebo and supplement groups.
Figure 38B:
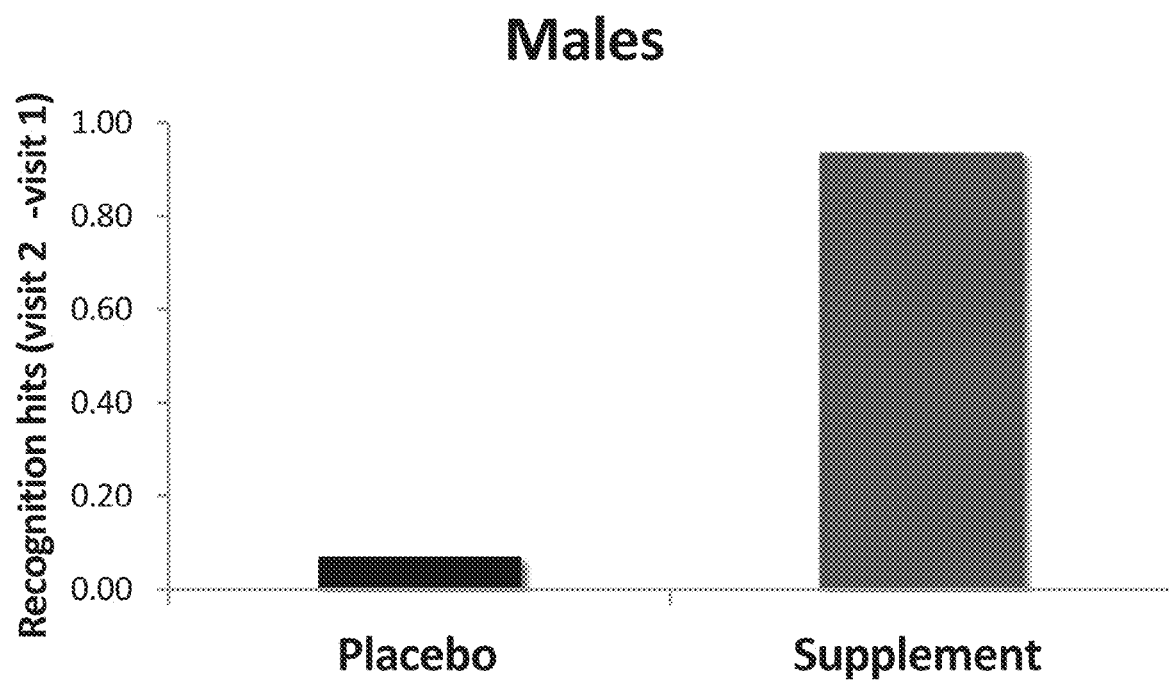
FIG. 38B illustrates a difference analysis between visit 1 and visit 2 for the RAVLT data illustrated in FIG. 38A.

The Rey Auditory Verbal Learning Test (RAVLT) was also administered to each participant. This test measures verbal memory and can identify memory deficits, including immediate word span under overload conditions, final acquisition level, total acquisition, amount learned in five trials, proactive interference, retroactive interference, delayed recall, recognition, number of repetitions, and number and types of intrusions, for example. The subjects were asked to remember a series of words, analogous to trying to remember a grocery list. Again, this parameter was improved in males in the supplement group compared to the placebo (p=0.05), but was unchanged in females. These results are illustrated in FIGS. 38A and 38B.

Figure 39A:
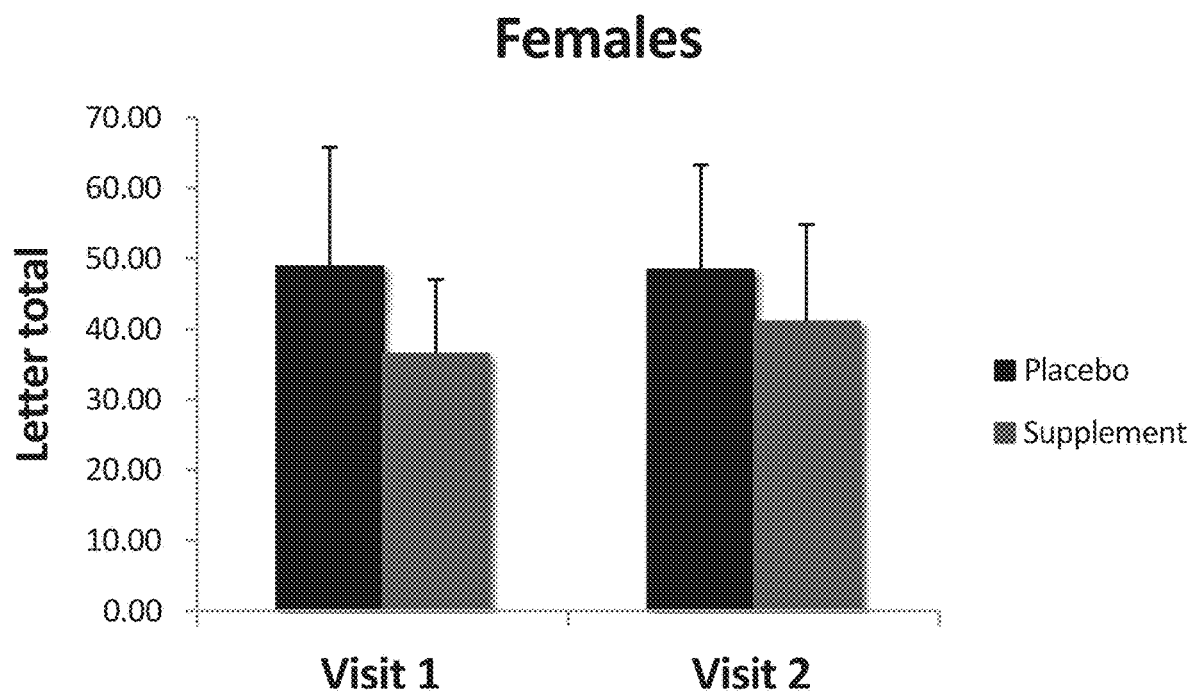
FIG. 39A illustrates verbal fluency data at baseline (visit 1) and 6 weeks (visit 2) for females from placebo and supplement groups.
Figure 39B:
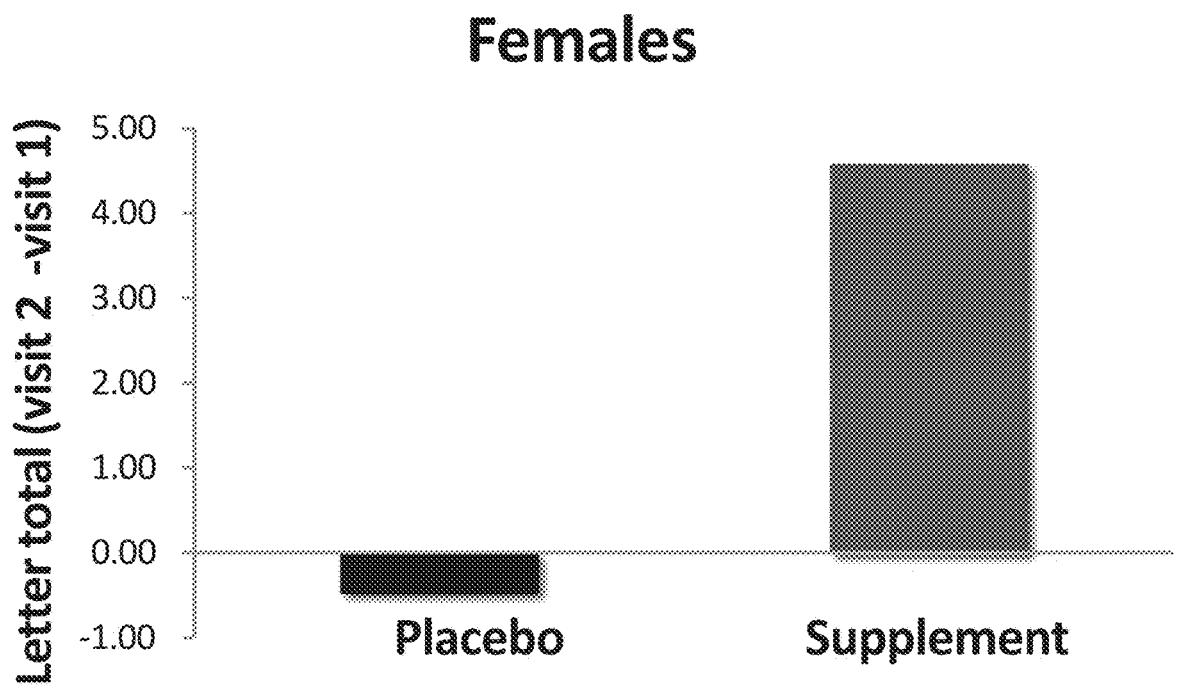
FIG. 39B illustrates a difference analysis between visit 1 and visit 2 for the verbal fluency data illustrated in FIG. 39A.

A Letter and Category Fluency test was administered to evaluate the spontaneous production of words under restricted search conditions. Category fluency generally declines with age. Verbal fluency was improved in females in the supplement group as compared to placebo (p=0.03), but was unchanged in males in either group. These results are illustrated in FIGS. 39A and 39B.

Brain and cognition were selected for investigation because it is a tissue that is negatively influenced by aging, but positively affected by CR. Normal aging in humans is characterized by progressive deficits in cognition and brain structure. CR has been demonstrated in non-human primates to delay and/or attenuate age-related declines in cognition and brain structure. The positive effects of the supplement on brain health and cognition combined with the transcriptomics data in mouse cerebral cortex offer evidence that the formulation positively influences gene expression that is manifested as positive cognitive functional outcomes, effects that would be characteristic of CR and of healthy brain aging.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An oral formulation, comprising:
   from 8 wt % to 48 wt % of polyunsaturated fatty acids including EPA and DHA,
   additional polyunsaturated fatty acids including alpha lipoic acid (ALA),
   from 0.1 wt % to 4 wt % stilbenoid including a member selected from the group consisting of resveratrol, vitisin A, pterostilbene, piceatannolin, astringin, piceid, and combinations thereof,
   from 3 wt % to 15 wt % flavonoid including a member selected from the group consisting of flavonol, flavanone, anthocyanin, quercetin, and combinations thereof,
   from 0.005 wt % to 2 wt % carotenoid,
   from 0.1 wt % to 5 wt % D-limonene, and
   from 100 IU to 2,000 IU vitamin D,
   wherein the polyunsaturated fatty acids including EPA and DHA, the stilbenoid, the flavonoid, and the vitamin D are present in an amount and at a weight ratio that causes the oral formulation to induce a gene expression profile containing at least 20% of the genes in a gene expression profile of caloric restriction in a muscle tissue of a subject and protects skin cells against ultraviolet radiation when administered to the subject in a therapeutically effective amount, and wherein the stilbenoid and the polyunsaturated fatty acids including EPA and DHA are present in the oral formulation at a weight ratio of from 1:50 to 1:20 of the stilbenoid to the polyunsaturated fatty acids including EPA and DHA.

2. The oral formulation of claim 1, wherein the stilbenoid is resveratrol.

3. The oral formulation of claim 1, wherein the stilbenoid and the flavonoid are present at a weight ratio of from 10:1 to 1:15.

4. The oral formulation of claim 1, wherein the quercetin and the stilbenoid are present at a weight ratio of from 4:1 to 1:2.

5. The oral formulation of claim 1, wherein the vitamin D comprises vitamin $D_3$.

6. The oral formulation of claim 1, wherein the vitamin D and the polyunsaturated fatty acids including EPA and DHA are present at a ratio of from 0.5 international units (IU) of the vitamin D per milligram of the polyunsaturated fatty acids including EPA and DHA to 2 IU of the vitamin D per mg of the polyunsaturated fatty acids including EPA and DHA.

7. The oral formulation of claim 1, further comprising rosemary leaf extract, coenzyme $Q_{10}$, vitamin K, or a combination thereof.

8. The oral formulation of claim 1, configured as an oral dosage form, wherein the oral dosage form is a member selected from the group consisting of: a capsule, a gel capsule, a tablet, a powder, a beverage, a wafer, a confectionary, a chewable, a gel, a paste, an elixir, a syrup, a drop, a lozenge, and a combination thereof.

9. The oral dosage form of claim 8, comprising from 100 mg to 1,500 mg of the polyunsaturated fatty acids including EPA and DHA.

10. The oral dosage form of claim 8, wherein the stilbenoid is present in an amount of from 3 mg to 50 mg.

11. The oral dosage form of claim 8, wherein the flavonoid is present in an amount of from 2 mg to 120 mg.

12. The oral formulation of claim 1, wherein the composition is formulated as an oral dosage form comprising:
1,000 mg collectively of the EPA and the DHA,
100 mg of the alpha lipoic acid,
wherein the stilbenoid is 30 mg the of resveratrol,
wherein the flavonoid consists of
  a flavanol and the flavanol is provided by 75 mg quercetin,
  an anthocyanins and the anthocyanins is provided by 140 mg purple corn cob extract,
  200 mg citrus bioflavonoids including 100 mg naringin and 100 mg hesperidin,
wherein the carotenoid consists of 1 mg astaxanthin, 5 mg lycopene,
and 4 mg lutein,
50 mg of the D-limonene, and
1,000 IU of the Vitamin D3.

13. The oral formulation of claim 12, wherein the oral dosage form further comprises 37.5 mg rosemary leaf extract, 30 mg coenzyme Q10, and 40 µg vitamin K2.

14. A method of mimicking a caloric restriction gene expression profile in a tissue of a subject, comprising:
administering a therapeutically effective amount of an oral formulation according to claim 1 to the subject.

15. The method of claim 14, wherein the tissue is a member selected from the group consisting of: brain tissue, muscle tissue, and a combination thereof.

16. The method of claim 14, wherein the therapeutically effective amount comprises a daily amount of from 700 mg to 1,500 mg of omega-3 fatty acids.

17. The method of claim 14, wherein the therapeutically effective amount comprises a daily amount of from 20 mg to 50 mg of stilbenoid.

18. The method of claim 14, wherein the therapeutically effective amount comprises a daily amount of vitamin D of from 800 IU to 2,000 IU.

19. The method of claim 14, wherein at least 2,000 genes that are up-regulated or down-regulated in the tissue in response to caloric restriction are up-regulated or down-regulated in response to administering a therapeutically effective amount of the oral formulation.

20. The oral formulation of claim 1, wherein the
EPA and the DHA are present in the oral formulation at a weight ratio of from 1:1 to 3:1 of the EPA to the DHA.

* * * * *